US 12,497,919 B2

(12) United States Patent
Uechi et al.

(10) Patent No.: US 12,497,919 B2
(45) Date of Patent: Dec. 16, 2025

(54) RAW MATERIAL FLUID TREATMENT PLANT AND RAW MATERIAL FLUID TREATMENT METHOD

(71) Applicant: MITSUBISHI HEAVY INDUSTRIES, LTD., Tokyo (JP)

(72) Inventors: Hideyuki Uechi, Tokyo (JP); Hidefumi Araki, Tokyo (JP); Satoshi Tanimura, Tokyo (JP); Masakazu Nose, Tokyo (JP); Jun Sasahara, Tokyo (JP); Yukio Tanaka, Tokyo (JP); Atsushi Yuasa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/440,466

(22) Filed: Feb. 13, 2024

(65) Prior Publication Data

US 2024/0183310 A1    Jun. 6, 2024

Related U.S. Application Data

(62) Division of application No. 17/422,528, filed as application No. PCT/JP2020/009904 on Mar. 9, 2020, now Pat. No. 11,939,915.

(30) Foreign Application Priority Data

Mar. 15, 2019   (JP) ................................ 2019-048890

(51) Int. Cl.
*B01J 19/00*     (2006.01)
*C01B 3/04*      (2006.01)
(Continued)

(52) U.S. Cl.
CPC ............. *F02C 6/18* (2013.01); *B01J 19/0013* (2013.01); *B01J 19/0053* (2013.01); *F01K 25/103* (2013.01)

(58) Field of Classification Search
CPC . F02C 6/18; F02C 6/00; B01J 19/0013; B01J 19/0053; B01J 2219/00159;
(Continued)

(56) References Cited

U.S. PATENT DOCUMENTS 2,209,346 A * 7/1940 Mccausland ......... B01J 19/2425
                                                  208/143
4,699,773 A * 10/1987 Ulrichs ................... C01C 1/185
                                                  423/396
(Continued)

FOREIGN PATENT DOCUMENTS

CA       2 606 319      11/2006
CA       2 995 186       8/2018
(Continued)

OTHER PUBLICATIONS

International Search Report issued Jun. 2, 2020 in International Application No. PCT/JP2020/009904.
(Continued)

*Primary Examiner* — Frank M Lawrence, Jr.
(74) *Attorney, Agent, or Firm* — Wenderoth, Lind & Ponack, L.L.P.

(57) ABSTRACT

A raw material fluid treatment plant is provided with a raw material reaction apparatus for reacting a raw material fluid to form a reaction gas. The raw material reaction apparatus includes preheaters and a reactor. The preheaters are heat exchangers that perform heat exchange between a second heat transfer medium and the raw material fluid to heat the raw material fluid. The reactor is a heat exchanger that performs heat exchange between a first heat transfer medium differing from the second heat transfer medium and the raw material fluid having been heated by the preheaters to heat and react the raw material fluid.

7 Claims, 14 Drawing Sheets

(51) Int. Cl.
    *F01K 25/10*     (2006.01)
    *F02C 6/00*     (2006.01)
    *F02C 6/18*     (2006.01)

(58) Field of Classification Search
    CPC .......... B01J 19/32; F01K 25/103; F01K 7/18;
                F01K 23/10; F01K 25/10; Y02E 20/16;
                Y02E 60/36; C01B 3/04
    USPC .......................... 422/129, 198, 200, 201, 600
    See application file for complete search history.

(56) References Cited

U.S. PATENT DOCUMENTS

| | | | |
|---|---|---|---|
| 6,286,297 B1 | 9/2001 | Wakazono et al. | |
| 6,448,448 B1 * | 9/2002 | Schweers | C01B 3/22 |
| | | | 568/426 |
| 6,610,260 B1 | 8/2003 | Fairchok et al. | |
| 8,956,587 B1 | 2/2015 | Peng | |
| 11,939,915 B2 * | 3/2024 | Uechi | B01J 19/0013 |
| 2006/0080960 A1 | 4/2006 | Rajendran | |
| 2007/0049781 A1 * | 3/2007 | Brown | C10G 50/00 |
| | | | 422/138 |
| 2008/0118413 A1 * | 5/2008 | Lomax | C01B 3/384 |
| | | | 431/11 |
| 2009/0032464 A1 | 2/2009 | Noguchi et al. | |
| 2009/0058089 A1 | 3/2009 | Foucault et al. | |
| 2009/0084035 A1 | 4/2009 | Wei | |
| 2009/0133400 A1 | 5/2009 | Callas | |
| 2009/0155156 A1 * | 6/2009 | Sonnenschein | B01J 8/0426 |
| | | | 422/187 |
| 2010/0015039 A1 | 1/2010 | Doshi | |
| 2011/0107737 A1 | 5/2011 | Mishima et al. | |
| 2012/0195817 A1 | 8/2012 | Singh et al. | |
| 2013/0039841 A1 * | 2/2013 | Nester | C09C 1/50 |
| | | | 422/151 |
| 2015/0308297 A1 | 10/2015 | Nakamoto et al. | |
| 2015/0360191 A1 * | 12/2015 | Hammon | C07C 51/16 |
| | | | 562/532 |
| 2016/0017802 A1 | 1/2016 | Saloway et al. | |
| 2018/0058267 A1 | 3/2018 | Uechi et al. | |
| 2018/0241057 A1 | 8/2018 | Schuerer et al. | |
| 2020/0032676 A1 | 1/2020 | Nose | |

FOREIGN PATENT DOCUMENTS

| | | |
|---|---|---|
| CN | 10-2008-0011163 | 1/2008 |
| CN | 101189190 | 5/2008 |
| CN | 101816880 | 9/2010 |
| CN | 102183152 | 9/2011 |
| CN | 104712432 | 6/2015 |
| CN | 108461781 | 8/2018 |
| DE | 101 05 249 | 8/2001 |
| DE | 600 22 182 | 6/2006 |
| DE | 602 14 879 | 5/2007 |
| DE | 10 2017 001 564 | 8/2018 |
| EP | 1894893 | 3/2008 |
| EP | 3 540 197 | 9/2019 |
| JP | 04-342829 | 11/1992 |
| JP | 05-25423 | 2/1993 |
| JP | 1061413 | 3/1998 |
| JP | 11-90494 | 4/1999 |
| JP | 2948351 | 9/1999 |
| JP | 2002-069234 | 3/2002 |
| JP | 2006-232904 | 9/2006 |
| JP | 2008-007356 | 1/2008 |
| JP | 2009-85210 | 4/2009 |
| JP | 2009-097466 | 5/2009 |
| JP | 2011-102538 | 5/2011 |
| JP | 2011-127786 | 6/2011 |
| JP | 2012-255420 | 12/2012 |
| JP | 2013-199925 | 10/2013 |
| JP | 2014-99297 | 5/2014 |
| JP | 2014-190194 | 10/2014 |
| JP | 2014-190195 | 10/2014 |
| JP | 2015-183594 | 10/2015 |
| JP | 2017-96667 | 6/2017 |
| JP | 2018-76794 | 5/2018 |
| JP | 2018-095512 | 6/2018 |
| WO | 00/66487 | 11/2000 |
| WO | 03/040618 | 5/2003 |
| WO | 2006/117934 | 11/2006 |
| WO | 2016/158561 | 10/2016 |
| WO | 2017/160154 | 9/2017 |
| WO | 2017/187619 | 11/2017 |
| WO | 2018/088184 | 5/2018 |

OTHER PUBLICATIONS

Written Opinion of the International Searching Authority issued Jun. 2, 2020 in International Application No. PCT/JP2020/009904.

* cited by examiner

RAW MATERIAL FLUID TREATMENT PLANT AND RAW MATERIAL FLUID TREATMENT METHOD

This application is a divisional of U.S. application Ser. No. 17/422,528, filed Jul. 13, 2021, which was the National Stage of International Application No. PCT/JP2020/009904, filed Mar. 9, 2020, which claims the benefit of priority to Japanese Patent Application No. 2019-048890 filed Mar. 15, 2019, the entire contents of which are hereby incorporated by reference.

TECHNICAL FIELD

The present invention relates to a technique including a treatment for generating a reaction gas by heating and reacting a raw material fluid.

Priority is claimed on Japanese Patent Application No. 2019-048890, filed on Mar. 15, 2019, the content of which is incorporated herein by reference.

BACKGROUND ART

In order to protect a global environment by reducing $CO_2$ emissions, it is an effective option that hydrogen which does not emit $CO_2$ even when the hydrogen is combusted is utilized as a fuel. However, it is not easy to transport or store the hydrogen, for example, compared to other fuels such as a liquefied natural gas widely used as a fuel for a gas turbine. Therefore, as the fuel, it is conceivable to utilize ammonia which can be converted into the hydrogen. In addition, for example, as the fuel, it is conceivable to utilize methanol.

PTLs 1 and 2 below disclose a gas turbine plant. The gas turbine plant includes a raw material reaction apparatus that heats the ammonia and performs thermal decomposition reaction on the ammonia to be converted into the hydrogen and nitrogen. The raw material reaction apparatus has one heat exchange device. The one heat exchange device has a gas frame through which an exhaust gas from a gas turbine flows, and a heat transfer tube disposed in the gas frame. In the one heat exchange device, liquid ammonia flowing into the heat transfer tube and the exhaust gas flowing inside the gas frame are subjected to heat exchange to heat the ammonia. The thermal decomposition reaction is performed on the ammonia to generate a reaction gas including the hydrogen and the nitrogen. The reaction gas is guided to a combustor of the gas turbine.

CITATION LIST

Patent Literature

[PTL 1] Japanese Unexamined Patent Application Publication No. 4-342829
[PTL 2] Japanese Unexamined Patent Application Publication No. 2018-076794

SUMMARY OF INVENTION

Technical Problem

In techniques disclosed in PTLs 1 and 2, one heat exchange device exchanges heat between the liquid ammonia and the exhaust gas to heat the ammonia, and the thermal decomposition reaction is performed on the ammonia. Consequently, a thermal energy loss of the exhaust gas increases. In addition, in the techniques disclosed in PTLs 1 and 2, the heat of the reaction gas after the reaction is not effectively utilized. Therefore, in the techniques disclosed in PTLs 1 and 2, thermal efficiency of the plant is lowered.

Therefore, an object of the present invention is to provide a technique capable of improving thermal efficiency of a plant by suppressing a thermal energy loss of a heat source such as an exhaust gas when reacting a raw material fluid such as ammonia.

Solution to Problem

According to an aspect of the invention, in order to achieve the above-described object, there is provided a raw material fluid treatment plant.

The raw material fluid treatment plant includes a raw material reaction apparatus that generates a reaction gas by heating and reacting a raw material fluid. The raw material reaction apparatus preheater that preheats the raw material fluid, a reactor that generates the reaction gas by further heating and reacting the raw material fluid preheated by the preheater, a first heating medium line through which a first heating medium flows, and a second heating medium line through which a second heating medium different from the first heating medium flows. The reactor is a heat exchanger that heats and reacts the raw material fluid by exchanging heat between the raw material fluid and the first heating medium. The preheater is a heat exchanger that heats the raw material fluid by exchanging heat between the raw material fluid and the second heating medium. The first heating medium line guides the first heating medium to the reactor. The second heating medium line guides the second heating medium to the preheater.

In the present aspect, when the raw material fluid is heated and reacted, first, the raw material fluid is preheated by exchanging heat between the second heating medium different from the first heating medium and the raw material fluid. Thereafter, in the present aspect, the raw material fluid is heated and reacted by exchanging heat between the first heating medium and the preheated raw material fluid. Therefore, in the present aspect, a calorific value for heating the first heating medium can be reduced, compared to a case where the raw material fluid is preheated and reacted by using one heating medium. Therefore, in the present aspect, it is possible to suppress a thermal energy loss of the heat source such as the exhaust gas for heating the first heating medium.

Here, in the raw material fluid treatment plant of the above-described aspect, a product of constant pressure specific heat and a flow rate of the first heating medium flowing in the first heating medium line may be larger than a product of constant pressure specific heat and a flow rate of the second heating medium flowing in the second heating medium line.

In the present aspect, a great calorific value can be input to a temperature level of the reactor requiring a large amount of the heat to react the raw material fluid, and a small calorific value can be input to a temperature level of the preheater in which the small calorific value is sufficient. Therefore, the calorific value required for each temperature level can be input without any excess or insufficiency, and the heat can be effectively utilized in accordance with the temperature level.

The raw material fluid treatment plant according to any one of the above-described aspects may further include an exhaust heat utilization equipment having an exhaust heat utilization heat cycle in which a heat cycle medium circulates, heating the heat cycle medium by utilizing heat of a heat source, and utilizing the heated heat cycle medium. In this case, the exhaust heat utilization equipment heats the first heating medium by utilizing the heat of the heat source. The first heating medium line guides the first heating medium heated by the heat of the heat source to the reactor.

In the present aspect, a portion in the heat of the heat source which is not used for generating the reaction gas can be utilized in the heat cycle, and an output and efficiency of a plant can be improved.

The raw material fluid treatment plant of the above-described aspect including the exhaust heat utilization equipment may further include an exhaust gas generation equipment that generates an exhaust gas. In this case, the heat source is the exhaust gas from the exhaust gas generation equipment. The exhaust heat utilization equipment heats the heat cycle medium by exchanging heat with the exhaust gas. The exhaust heat utilization equipment has a gas frame through which the exhaust gas flows, and a first heating medium heater provided inside the gas frame, and heating the first heating medium by exchanging heat between the first heating medium and the exhaust gas. The first heating medium line is connected to the first heating medium heater of the exhaust heat utilization equipment, and guides the first heating medium heated by the heat of the exhaust gas to the reactor.

In the present aspect, the efficiency of the plant can be improved by effectively utilizing the heat of the exhaust gas from the exhaust gas generation equipment.

In the raw material fluid treatment plant of the above-described aspect including the exhaust gas generation equipment, the exhaust gas generation equipment may be a reaction gas utilization equipment that utilizes the reaction gas as a fuel.

In the present aspect, the reaction gas utilization equipment different from the exhaust heat utilization equipment can be provided. The exhaust heat after the reaction gas is utilized in the reaction gas utilization equipment can be further utilized in the exhaust heat utilization equipment. Accordingly, energy held by the reaction gas can be repeatedly recovered, and the energy can be highly efficiently utilized.

In the raw material fluid treatment plant of the above-described aspect having the first heating medium heater, the raw material reaction apparatus may have a first heating medium recovery line that causes the first heating medium after heat exchange with the raw material fluid to return from the reactor to the first heating medium heater.

In the present aspect, the first heating medium circulates between the reactor and the first heating medium heater. Therefore, in the present aspect, a difference between the temperature of the first heating medium flowing out from the first heating medium heater and the temperature of the first heating medium flowing into the first heating medium heater can be minimized. Therefore, in the present aspect, the calorific value for heating the first heating medium can also be reduced from this viewpoint.

In the raw material fluid treatment plant of the above-described aspect having the first heating medium recovery line, the reactor may be configured so that the first heating medium before heat exchange with the raw material fluid and the first heating medium after heat exchange with the raw material fluid do not have a phase change.

In the present aspect, the first heating medium does not have a phase change in a process of circulating between the reactor and the first heating medium heater. Therefore, in the present aspect, the calorific value for heating the first heating medium can be reduced, compared to a case where the first heating medium has a phase change.

In the raw material fluid treatment plant according to any one of the above-described aspects having the exhaust heat utilization heat cycle, at least one heating medium of the first heating medium and the second heating medium may be a substance the same as the heat cycle medium.

In the present aspect, the first heating medium or the second heating medium is the substance the same as the heat cycle medium. Accordingly, quality of the first heating medium or the second heating medium can be easily controlled.

In the raw material fluid treatment plant of the above-described aspect in which the first heating medium or the second heating medium is the substance the same as the heat cycle medium, a pressure of the one heating medium may be lower than a maximum pressure of the heat cycle medium inside the exhaust heat utilization heat cycle.

In the present aspect, the first heating medium can be easily supplied to the reactor, or the second heating medium can be easily supplied to the preheater without providing a separate supply equipment. In particular, the first heating medium can be easily supplied to the reactor, or the second heating medium can be easily supplied to the preheater, when actuated or when the pressure of the first heating medium is lowered due to a seal leakage.

In the raw material fluid treatment plant according to any one of the above-described aspects, the reactor may have a pre-reactor that generates the reaction gas by further heating and reacting the raw material fluid preheated by the preheater, and a post-reactor that reacts the raw material fluid contained in the gas from the pre-reactor by further heating the gas from the pre-reactor. In this case, the pre-reactor heats the raw material fluid by exchanging heat between a first low-temperature heating medium which is a type of the first heating medium and the raw material fluid. The post-reactor heats the gas from the pre-reactor by exchanging heat between a first high-temperature heating medium which is a type of the first heating medium and is different from the first low-temperature heating medium and the gas from the pre-reactor. The first heating medium line has a first low-temperature heating medium line through which the first low-temperature heating medium flows and a first high-temperature heating medium line through which the first high-temperature heating medium flows. The first low-temperature heating medium line is connected to the pre-reactor, and guides the first low-temperature heating medium to the pre-reactor. The first high-temperature heating medium line is connected to the post-reactor, and guides the first high-temperature heating medium to the post-reactor.

In the present aspect, the reaction of the raw material fluid is performed in two stages of the reaction in the pre-reactor and the reaction in the post-reactor. Accordingly, it is possible to lower concentration of the residual raw material contained in the reaction gas flowing out from the post-reactor. Moreover, in the present aspect, the temperature of the first heating medium that exchanges the heat with the reaction gas in the post-reactor is higher than the temperature of the first heating medium that exchanges the heat with the raw material fluid in the pre-reactor. Accordingly, the heat for the reaction can be efficiently utilized. In addition, the reactor is divided into the pre-reactor and the post-reactor so that the heating medium is supplied to each of the pre-reactor and the post-reactor. In this manner, the calorific value required for each temperature level can be input without any excess or insufficiency, and the heat can be effectively used in accordance with the temperature level.

In the raw material fluid treatment plant according to any one of the above-described aspects including the exhaust heat utilization equipment and the exhaust gas generation equipment, the reactor may have a pre-reactor that generates the reaction gas by further heating and reacting the raw material fluid preheated by the preheater, and a post-reactor that reacts the raw material fluid contained in the gas from the pre-reactor by further heating the gas from the pre-reactor. In this case, the first heating medium heater has a first low-temperature heating medium heater that heats the first low-temperature heating medium by exchanging heat between a first low-temperature heating medium which is a type of the first heating medium and the exhaust gas, and a first high-temperature heating medium heater that heats the first high-temperature heating medium by exchanging heat between a first high-temperature heating medium which is a type of the first heating medium and the exhaust gas. The first high-temperature heating medium heater is disposed on an upstream side of a flow of the exhaust gas from the first low-temperature heating medium heater inside the gas frame. The first heating medium line has a first low-temperature heating medium line through which the first low-temperature heating medium flows and a first high-temperature heating medium line through which the first high-temperature heating medium flows. The first low-temperature heating medium line is connected to the first low-temperature heating medium heater, and guides the first low-temperature heating medium heated by the exhaust gas to the pre-reactor. The first high-temperature heating medium line is connected to the first high-temperature heating medium heater, and guides the first high-temperature heating medium heated by the exhaust gas to the post-reactor.

In the present aspect, the reaction of the raw material fluid is performed in two stages of the reaction in the pre-reactor and the reaction in the post-reactor. Accordingly, it is possible to lower concentration of the residual raw material contained in the reaction gas flowing out from the post-reactor. Moreover, in the present aspect, the temperature of the first heating medium that exchanges the heat with the reaction gas in the post-reactor is higher than the temperature of the first heating medium that exchanges the heat with the raw material fluid in the pre-reactor. Accordingly, the heat for the reaction can be efficiently utilized. In addition, the reactor is divided into the pre-reactor and the post-reactor so that the heating medium is supplied to each of the pre-reactor and the post-reactor. In this manner, the calorific value required for each temperature level can be input without any excess or insufficiency, and the heat can be effectively used in accordance with the temperature level.

In the raw material fluid treatment plant of the above-described aspect having the pre-reactor and the post-reactor, the exhaust heat utilization equipment may have a heat recovery steam generator that converts water into steam by utilizing the heat of the exhaust gas. The heat recovery steam generator may have the gas frame. Both the first low-temperature heating medium and the first high-temperature heating medium may be the water or the steam.

In the raw material fluid treatment plant according to any one of the above-described aspects having the pre-reactor and the post-reactor, the exhaust heat utilization equipment may have a burner that combusts a fuel by injecting the fuel into the exhaust gas flowing inside the gas frame. In this case, the burner is disposed on an upstream side of a flow of the exhaust gas from the first high-temperature heating medium heater inside the gas frame. The first high-temperature heating medium heater heats the first high-temperature heating medium by exchanging heat between a combustion gas generated by combusting the fuel injected from the burner and the first high-temperature heating medium.

In the present aspect, the first heating medium having a higher temperature can be obtained, compared to a case where the first heating medium is heated only by the exhaust gas. Accordingly, the reaction of the raw material fluid can be promoted, and it is possible to lower the concentration of the raw material fluid contained in the reaction gas.

In addition, in the raw material fluid treatment plant according to any one of the above-described aspects including the exhaust heat utilization equipment having the gas frame, the exhaust heat utilization equipment may have a burner that combusts a fuel by injecting the fuel into the exhaust gas flowing inside the gas frame. In this case, the burner is disposed on an upstream side of a flow of the exhaust gas from the first heating medium heater inside the gas frame. The first heating medium heater heats the first heating medium by exchanging heat between a combustion gas generated by combusting the fuel injected from the burner and the first heating medium.

In the present aspect, the first heating medium having a higher temperature can be obtained, compared to a case where the first heating medium is heated only by the exhaust gas. Accordingly, the reaction of the raw material fluid can be promoted, and it is possible to lower the concentration of the raw material fluid contained in the reaction gas.

In the raw material fluid treatment plant according to any one of the above-described aspects having the first low-temperature heating medium line and the first high-temperature heating medium line, a product of constant pressure specific heat and a flow rate of the first low-temperature heating medium flowing in the first low-temperature heating medium line may be larger than a product of constant pressure specific heat and a flow rate of the first high-temperature heating medium flowing in the first high-temperature heating medium line.

In the present aspect, a great calorific value can be input to a temperature level of the reactor requiring a large amount of the heat to react the raw material fluid, and a small calorific value can be input to a temperature level of the preheater in which the small calorific value is sufficient. Therefore, the calorific value required for each temperature level can be input without any excess or insufficiency, and the heat can be effectively utilized in accordance with the temperature level. In particular, when most of the raw material fluids are reacted in the pre-reactor, the required flow rate of the high-temperature first high-temperature heating medium to be injected into the post-reactor can be reduced, high-temperature heat can be saved, and heat utilization efficiency is achieved.

In the raw material fluid treatment plant according to any one of the above-described aspects having the burner, the exhaust heat utilization equipment may have a partition member that partitions an upstream side of a flow of the exhaust gas from the first heating medium heater inside the gas frame into a first exhaust gas flow path through which a portion of the exhaust gas flows and a second exhaust gas flow path through which a remaining portion of the exhaust gas flows. In this case, the burner injects the fuel into the first exhaust gas flow path.

In the present aspect, the fuel is injected to only a portion of the exhaust gas, and is combusted to be used in heating the first heating medium. Accordingly, the temperature of the first heating medium can be effectively raised with a small amount of an additional fuel. The additional fuel can be saved, and plant efficiency can be improved.

In the raw material fluid treatment plant according to any one of the above-described aspects including the reaction gas utilization equipment, the raw material reaction apparatus may have a reaction gas line through which the reaction gas generated by the reactor flows, and a residual raw material removal device that removes a residual raw material which is the raw material fluid contained in the reaction gas flowing in the reaction gas line, and that discharges a treated reaction gas which is the reaction gas from which the residual raw material is removed. In this case, the exhaust gas generation equipment utilizes the treated reaction gas which is a portion of the reaction gas.

In the present aspect, it is possible to reduce the amount of the residual raw material contained in the reaction gas supplied to the reaction gas utilization equipment.

In the raw material fluid treatment plant of the above-described aspect having the residual raw material removal device, the second heating medium may be the reaction gas, and the second heating medium line may be the reaction gas line.

In the present aspect, the preheater exchanges the heat between the raw material fluid and the reaction gas serving as the second heating medium, and while the raw material fluid is heated, the reaction gas is cooled. Therefore, in the present aspect, the low-temperature reaction gas can be supplied to the residual raw material removal device. In addition, the plant efficiency can be improved by effectively utilizing the exhaust heat in cooling the reaction gas.

In the raw material fluid treatment plant according to any one of the above-described aspects, the preheater may have a vaporizer that heats and vaporizes the raw material fluid of a liquid, and a gas heater that heats the raw material fluid of a gas from the vaporizer. In this case, the vaporizer is a heat exchanger that heats the raw material fluid of the liquid by exchanging heat between a second heating medium for vaporization which is a type of the second heating medium and the raw material fluid of the liquid. In addition, the gas heater is a heat exchanger that heats the raw material fluid of the gas by exchanging heat between a second heating medium for gas heating which is a type of the second heating medium and is different from the second heating medium for vaporization and the raw material fluid of the gas.

In the present aspect, different heating media are used for vaporizing the raw material fluid which requires a great calorific value and heating the raw material fluid with a gas which requires a small calorific value. In the present aspect, the calorific values required for each temperature level can be input for vaporizing the raw material fluid and heating the raw material fluid with the gas without any excess or insufficiency, and the heat can be effectively utilized in accordance with the temperature level.

In the raw material fluid treatment plant of the above-described aspect having the vaporizer and the gas heater, a product of constant pressure specific heat and a flow rate of the second heating medium for vaporization which flows inside the vaporizer may be larger than a product of constant pressure specific heat and a flow rate of the second heating medium for gas heating which flows inside the gas heater.

In the present aspect, a great calorific value can be input to the temperature level of the vaporizer requiring a large amount of the heat to vaporize the raw material fluid, and a small calorific value can be input to the temperature level of the gas heater in which the small calorific value is sufficient. Therefore, the calorific value required for each temperature level can be input without any excess or insufficiency. The heat can be effectively utilized in accordance with the temperature level, and heat utilization efficiency can be improved.

In the raw material fluid treatment plant of the above-described aspect having the vaporizer and the gas heater, the vaporizer may have ability to cool and condense the second heating medium for vaporization of a gas by receiving the second heating medium for vaporization of the gas and exchanging heat between the second heating medium for vaporization of the gas and the raw material fluid of the liquid.

In the present aspect, the second heating medium for vaporization which is condensed at a constant temperature is used as a heat source. In this manner, the heat source medium can be vaporized at a constant temperature. Therefore, in the present aspect, the heat having a relatively low constant temperature can be effectively utilized to vaporize the raw material fluid, and the heat utilization efficiency can be improved.

In the raw material fluid treatment plant of the above-described aspect having the vaporizer and the gas heater, the vaporizer may have a liquid phase preheater that raises a temperature of the raw material fluid of the liquid while maintaining a liquid phase, and a phase change preheater that heats and vaporizes the raw material fluid of the liquid from the liquid phase preheater. In this case, the liquid phase preheater is a heat exchanger that heats the raw material fluid of the liquid by exchanging heat between a second heating medium for liquid phase preheating which is a type of the second heating medium for vaporization and the raw material fluid of the liquid. The phase change preheater is a heat exchanger that heats the raw material fluid of the liquid by exchanging heat between a second heating medium for phase change preheating which is a type of the second heating medium for vaporization and is different from the second heating medium for liquid phase preheating and the raw material fluid of the liquid from the liquid phase preheater.

In the present aspect, the vaporizer is divided into a portion for vaporizing the raw material fluid in a liquid phase and a portion for preheating the raw material fluid in a liquid phase. Then, different heating media are used for vaporizing the raw material fluid which requires a great calorific value and heating the raw material fluid while maintaining the liquid phase which requires a small calorific value. Therefore, in the present aspect, the calorific value required for each temperature level can be input in vaporizing the raw material fluid and the heating the raw material fluid while maintaining the liquid phase without any excess or insufficiency, and the heat can be effectively used in accordance with the temperature level.

In the raw material fluid treatment plant of the above-described aspect having the liquid phase preheater and the phase change preheater, a product of constant pressure specific heat and a flow rate of the second heating medium for phase change preheating which flows inside the phase change preheater may be larger than a product of constant pressure specific heat and a flow rate of the second heating medium for liquid phase preheating which flows inside the liquid phase preheater.

In the present aspect, a great calorific value can be input to the temperature level of the phase change preheater requiring a large amount of the heat to vaporize the raw material fluid, and a small calorific value can be input to the temperature level of the liquid phase preheater in which the small calorific value is sufficient. Therefore, the calorific value required for each temperature level can be input without any excess or insufficiency. The heat can be effectively utilized in accordance with the temperature level, and heat utilization efficiency can be improved.

In the raw material fluid treatment plant of the above-described aspect having the liquid phase preheater and the phase change preheater, the phase change preheater may have ability to cool and condense the second heating medium for phase change preheating of the gas by receiving the second heating medium for phase change preheating of the gas and exchanging heat between the second heating medium for phase change preheating of the gas and the raw material fluid of the liquid from the liquid phase preheater.

In the present aspect the second heating medium for phase change preheating which is condensed at a constant temperature is used as a heat source. In this manner, the raw material fluid can be vaporized at a constant temperature. Therefore, in the present aspect, the heat having a relatively low constant temperature can be effectively utilized to vaporize the raw material fluid, and the heat utilization efficiency can be improved.

The raw material fluid treatment plant according to any one of the above-described aspects having the exhaust heat utilization heat cycle may include one or more heat cycles. In this case, the one or more heat cycles include the exhaust heat utilization heat cycle in which the heat cycle medium circulates. The raw material reaction apparatus has a second heating medium recovery line through which the second heating medium flows. The second heating medium is at least a portion of a first heat cycle medium flowing in a first heat cycle of the one or more heat cycles. The second heating medium line guides the first heat cycle medium flowing in a first portion of the first heat cycle to the preheater as the second heating medium. The second heating medium recovery line guides the first heat cycle medium cooled by exchanging heat with the raw material fluid, to a second portion through which the first heat cycle medium having a temperature lower than that of the first heat cycle medium flowing in the first portion flows in the first heat cycle.

In the present aspect, the first heat cycle medium flowing in the first heat cycle can be utilized for preheating the raw material fluid.

In the raw material fluid treatment plant of the above-described aspect having the first heat cycle, the first heat cycle may be the exhaust heat utilization heat cycle. In this case, the first heat cycle medium is water or steam serving as the heat cycle medium that circulates inside the exhaust heat utilization heat cycle.

In the raw material fluid treatment plant according to any one of the above-described aspects including the exhaust heat utilization equipment having the gas frame, the exhaust heat utilization equipment may have a second heating medium heater disposed on a downstream side of a flow of the exhaust gas from the first heating medium heater inside the gas frame, and heating at least a portion of the heat cycle medium by exchanging heat between at least a portion of the heat cycle medium and the exhaust gas. In this case, the raw material reaction apparatus has a second heating medium recovery line through which the second heating medium flows. The second heating medium line guides at least a portion of the heat cycle medium heated by the second heating medium heater, to the preheater as the second heating medium. The second heating medium recovery line guides the heat cycle medium cooled by the preheater to a portion through which the heat cycle medium having a temperature lower than that of the heat cycle medium in the second heating medium heater flows in the exhaust heat utilization heat cycle.

In the present aspect, a portion of the heat cycle medium circulating inside the exhaust heat utilization heat cycle is heated by an exhaust gas EG, and the heat cycle medium is used as the second heating medium. Therefore, in the present aspect, quality of the second heating medium can be easily controlled.

The raw material fluid treatment plant according to any one of the above-described aspects may include a Brayton cycle in which a working medium of a gas circulates. The Brayton cycle has a medium compressor that compresses the working medium, a medium heater that heats the working medium compressed by the medium compressor, a medium turbine driven by the working medium heated by the medium heater, and a medium cooler that cools the working medium exhausted from the medium turbine. In this case, the raw material reaction apparatus has a second heating medium recovery line through which the second heating medium flows. The medium cooler configures at least a portion of the preheater. The second heating medium line guides the working medium exhausted from the medium turbine to the medium cooler as the second heating medium. The second heating medium recovery line guides the working medium cooled by exchanging heat with the raw material fluid in the medium cooler, to the medium compressor as the second heating medium.

In the present aspect, the medium cooler configuring a portion of the preheater cools the working medium by exchanging heat between the raw material fluid and the working medium. Therefore, in the present aspect, the Brayton cycle can be operated by utilizing the heat of the raw material fluid, and an output of the plant can be increased.

In the raw material fluid treatment plant according to any one of the above-described aspects including the exhaust heat utilization equipment having the gas frame, the preheater may be a heat exchanger disposed on a downstream side of a flow of the exhaust gas from the first heating medium heater inside the gas frame, and heating the raw material fluid by exchanging heat between the raw material fluid and the exhaust gas serving as the second heating medium. In this case, the second heating medium line is configured to have a portion of the gas frame.

In the present aspect, the exhaust gas from which a large amount of the heat is deprived, that is, the heat of the low-temperature exhaust gas is utilized for preheating the raw material fluid. Therefore, in the present aspect, the heat of the low-temperature exhaust gas can be effectively utilized.

In the raw material fluid treatment plant of the above-described aspect in which the preheater is disposed inside the gas frame, the exhaust heat utilization equipment may have one or more evaporators disposed inside the gas frame, and converting the heat cycle medium in a liquid phase into the heat cycle medium in a gas phase by exchanging heat between the heat cycle medium in the liquid phase and the exhaust gas. In this case, the preheater is disposed on the downstream side from the evaporator located on a most downstream side of the one or more evaporators inside the gas frame. At least one evaporator of the one or more evaporators is disposed between the first heating medium heater and the preheater in a flow direction of the exhaust gas.

The raw material fluid treatment plant of the above-described aspect having the residual raw material removal device may include a heat cycle in which a third heating medium flows to utilize the heated third heating medium. In this case, the raw material reaction apparatus has a third heating medium line and a third heating medium recovery line which are connected to the heat cycle, and a reaction gas cooler that cools the reaction gas. The reaction gas cooler is provided in the reaction gas line, and heats the third heating medium while cooling the reaction gas by exchanging heat between the reaction gas flowing in the reaction gas line and the third heating medium. The third heating medium line guides at least a portion of the third heating medium before being heated, from the heat cycle to the reaction gas cooler. The third heating medium recovery line guides the third heating medium heated by the reaction gas cooler to the heat cycle. The residual raw material removal device removes the residual raw material from the reaction gas cooled by the reaction gas cooler.

In the present aspect, a cooled reaction gas RG can be supplied to the residual raw material removal device. In addition, in the present aspect, the exhaust heat in cooling the reaction gas can be effectively utilized to supply the heated third heating medium to the heat cycle, and the efficiency of the plant can be improved.

In the raw material fluid treatment plant of the above-described aspect including the heat cycle utilizing the third heating medium, the exhaust gas generation equipment may have a gas turbine. The gas turbine has an air compressor that generates combustion air by compressing air, a combustor that generates combustion gas by combusting the treated reaction gas as a fuel in the combustion air, and a turbine driven by the combustion gas to discharges the combustion gas as the exhaust gas. The heat cycle is a gas turbine cycle configured to have the gas turbine included in the exhaust gas generation equipment. The third heating medium line guides the treated reaction gas from the residual raw material removal device to the reaction gas cooler as the third heating medium. The third heating medium recovery line guides the treated gas heated by the reaction gas cooler to the combustor.

In the present aspect, the reaction gas cooler heats the fuel while cooling the reaction gas by exchanging heat between the reaction gas and the treated reaction gas serving as the fuel. Therefore, in the present aspect, the cooled reaction gas can be supplied to the residual raw material removal device, and the preheated fuel can be supplied to the combustor. Accordingly, the efficiency of the plant can be improved. In addition, the residual raw material remaining in the reaction gas is removed by the residual raw material removal device. In this manner, concentration of the residual raw material of the fuel to be supplied to the combustor can be reduced, and air pollutants caused by the residual raw material contained in the fuel can be reduced.

In the raw material fluid treatment plant of the above-described aspect including the heat cycle utilizing the third heating medium, the exhaust gas generation equipment may have a gas turbine. The gas turbine has an air compressor that generates combustion air by compressing air, a combustor that generates combustion gas by combusting the treated reaction gas as a fuel in the combustion air, a turbine driven by the combustion gas to discharge the combustion gas as the exhaust gas. The heat cycle is a gas turbine cycle configured to have the gas turbine included in the exhaust gas generation equipment. The third heating medium line guides the combustion air from the air compressor to the reaction gas cooler as the third heating medium. The third heating medium recovery line guides the combustion air heated by the reaction gas cooler to the combustor.

In the present aspect, the reaction gas cooler heats the combustion air while cooling the reaction gas by exchanging heat between the reaction gas and the combustion air. Therefore, in the present aspect, the cooled reaction gas can be supplied to the residual raw material removal device, and the preheated combustion air can be supplied to the combustor.

In the raw material fluid treatment plant of the above-described aspect including the heat cycle utilizing the third heating medium, the exhaust gas generation equipment may have a gas turbine driven by using the treated reaction gas as a fuel. The exhaust heat utilization equipment has a heat recovery steam generator that evaporates water by utilizing the heat of the exhaust gas exhausted from the gas turbine, a steam turbine driven by steam from the heat recovery steam generator, a condenser that causes the steam exhausted from the steam turbine to return to the water, and a water supply pump that supplies the water inside the condenser to the heat recovery steam generator. The heat cycle is a Rankine cycle configured to have the heat recovery steam generator, the steam turbine, the condenser, and the water supply pump. The third heating medium line guides at least a portion of the water or the steam flowing in a first portion of the Rankine cycle to the reaction gas cooler as the third heating medium. The third heating medium recovery line guides the water or the steam heated by the reaction gas cooler to a second portion through which the water or the steam having a temperature higher than that of the water or the steam flowing in the first portion flows in the Rankine cycle.

In the present aspect, the reaction gas cooler heats the water or the steam while cooling the reaction gas by exchanging heat between the reaction gas and the water or the steam flowing in the Rankine cycle. Therefore, in the present aspect, the cooled reaction gas can be supplied to the residual raw material removal device, and the heated water or steam can return to the Rankine cycle. Accordingly, thermal efficiency of the Rankine cycle can be improved.

The raw material fluid treatment plant of the above-described aspect including the heat cycle utilizing the third heating medium may include a low-boiling point medium Rankine cycle in which a low-boiling point medium having a boiling point lower than that of water circulates. The low-boiling point medium Rankine cycle has a medium booster that raises a pressure of the low-boiling point medium in a liquid phase, a medium heater that heats the low-boiling point medium in the liquid phase which is boosted by the medium booster to be converted into the low-boiling point medium in a gas phase, a medium turbine driven by the low-boiling point medium in the gas phase from the medium heater, and a medium cooler that cools and condenses the low-boiling point medium in the gas phase which is exhausted from the medium turbine. The heat cycle is the low-boiling point medium Rankine cycle. The reaction gas cooler forms the medium heater. The third heating medium line uses the low-boiling point medium in the liquid phase which is boosted by the medium booster as the third heating medium, and guides the low-boiling point medium in the liquid phase to the reaction gas cooler forming the medium heater. The third heating medium recovery line guides the low-boiling point medium in the gas phase from the reaction gas cooler to the medium turbine.

In the present aspect, the reaction gas cooler forming the medium heater of the low-boiling point medium Rankine cycle heats the low-boiling point medium while cooling the reaction gas by exchanging heat between the reaction gas and the low-boiling point medium. Therefore, in the present aspect, the low-boiling point medium Rankine cycle can be operated by utilizing the heat of the reaction gas, and the output of the plant can be increased.

The raw material fluid treatment plant of the above-described aspect including the heat cycle utilizing the third heating medium may include a Brayton cycle in which a working medium of a gas circulates. The Brayton cycle has a medium compressor that compresses the working medium, a medium heater that heats the working medium compressed by the medium compressor, a medium turbine driven by the working medium heated by the medium heater, and a medium cooler that cools the working medium exhausted from the medium turbine. The heat cycle is the Brayton cycle. The reaction gas cooler forms the medium heater. The third heating medium line uses the working medium from the medium compressor as the third heating medium, and guides the working medium to the reaction gas cooler forming the medium heater. The third heating medium recovery line guides the working medium from the reaction gas cooler to the medium turbine.

In the present aspect, the reaction gas cooler forming the medium heater of the Brayton cycle heats the working medium while cooling the reaction gas by exchanging heat between the reaction gas and the working medium. Therefore, in the present aspect, the Brayton cycle can be operated by utilizing the heat of the reaction gas, and the output of the plant can be increased.

In the raw material fluid treatment plant according to any one of the above-described aspects, the raw material reaction apparatus may have an oxidizer injecting device that injects an oxidizer that oxidizes and reacts the raw material fluid into the raw material fluid after passing through the preheater.

In the present aspect, a portion of the raw material fluid is subjected to an oxidation reaction with the oxidizer, thereby generating the heat. As a result, in the present aspect, the temperature of the raw material fluid rises, the reaction of the raw material fluid is promoted, and the concentration of the raw material fluid contained in the reaction gas can be lowered.

In the raw material fluid treatment plant of the above-described aspect having the oxidizer injecting device, the reactor may have a pre-reactor that generates the reaction gas by further heating and reacting the raw material fluid preheated by the preheater, and a post-reactor that further reacts the raw material fluid contained in the gas from the pre-reactor. In this case, the oxidizer injecting device injects the oxidizer into at least one of the raw material fluid after passing through the preheater and before flowing out from the pre-reactor and the gas passing through the pre-reactor and before flowing out from the post-reactor.

In the raw material fluid treatment plant according to any one of the above-described aspects having the oxidizer injecting device, the oxidizer injecting device may have a compressor that generates compressed air by compressing air. In this case, the oxidizer injecting device uses the compressed air as the oxidizer, and injects the compressed air into the raw material fluid after passing through the preheater.

The raw material fluid treatment plant of the above-described aspect in which the oxidizer injecting device has the compressor may further include a gas turbine. The gas turbine has an air compressor that generates combustion air by compressing air, a combustor that generates combustion gas by combusting the fuel in the combustion air, and a turbine driven by the combustion gas to discharge the combustion gas as the exhaust gas. At least a portion of the compressor of the oxidizer injecting device is the air compressor of the gas turbine. The oxidizer injecting device uses a portion of the combustion air from the air compressor as the oxidizer, and injects the combustion air into the raw material fluid after passing through the preheater.

According to another aspect of the invention, in order to achieve the above-described object, there is provided a raw material fluid treatment plant.

The raw material fluid treatment plant includes a raw material reaction apparatus that generates a reaction gas by heating and reacting a raw material fluid, and a heat cycle in which a third heating medium flows to utilize the heated third heating medium. The raw material reaction apparatus has a reactor that generates the reaction gas by heating and reacting the raw material fluid, a reaction gas line through which the reaction gas generated by the reactor flows, a third heating medium line and a third heating medium recovery line which are connected to the heat cycle, and a reaction gas cooler that cools the reaction gas. The reaction gas cooler is provided in the reaction gas line, and heats the third heating medium while cooling the reaction gas by exchanging heat between the reaction gas flowing in the reaction gas line and the third heating medium. The third heating medium line guides at least a portion of the third heating medium before being heated, from the heat cycle to the reaction gas cooler. The third heating medium recovery line guides the third heating medium heated by the reaction gas cooler to the heat cycle.

According to the present aspect, the third heating medium can be heated by the exhaust heat of the reaction gas cooler, and can be utilized in the heat cycle. Therefore, the exhaust heat can be effectively utilized, and the efficiency of the plant can be improved.

In the raw material fluid treatment plant of the other aspect, the reaction gas cooler may have ability to heat the third heating medium up to a temperature higher than a temperature of the raw material fluid in an inlet of the raw material fluid of the reactor.

According to the present aspect, even when a large amount of the heat is required for the reaction inside the reactor, the exhaust heat of the reaction gas cooler is utilized. In this manner, the temperature of the medium of the heat cycle can be raised to the temperature level of the reactor. The efficiency of the heat cycle is improved, and the efficiency of the plant is further improved.

The raw material fluid treatment plant of the other aspect may further include an exhaust gas generation equipment that generates an exhaust gas by combusting the reaction gas generated in the raw material reaction apparatus.

According to the present aspect, the generated reaction gas is effectively utilized, and the efficiency of the plant is improved.

In the raw material fluid treatment plant according to any one of the above-described aspects, the exhaust gas generation equipment may have a gas turbine. The gas turbine has an air compressor that generates combustion air by compressing air, a combustor that generates combustion gas by combusting the reaction gas as a fuel in the combustion air, and a turbine driven by the combustion gas to discharge the combustion gas as the exhaust gas.

In the raw material fluid treatment plant according to any one of the above-described aspects, the exhaust heat utilization equipment may have a heat recovery steam generator that evaporates water by utilizing heat of the exhaust gas serving as the heat source, a steam turbine driven by steam from the heat recovery steam generator, a condenser that causes the steam exhausted from the steam turbine to return to water, a water supply line that guides the water inside the condenser to the heat recovery steam generator, and a water supply pump provided in the water supply line. The heat recovery steam generator has a gas frame through which the exhaust gas flows.

In the raw material fluid treatment plant of the above-described aspect having the water supply line, the exhaust heat utilization equipment may have a water supply preheater that heats the water by exchanging heat between the water flowing in the water supply line and the steam extracted from the steam turbine.

In the present aspect, the water supply preheater can heat the water flowing in the water supply line. Therefore, in the present aspect, the temperature of the water supply flowing into the heat recovery steam generator can be raised. When the temperature of the water supply flowing into the heat recovery steam generator is high, it is possible to reduce a heat exchange amount between the water or the steam and the exhaust gas in each economizer, each evaporator, or each heater in the heat recovery steam generator. Therefore, it is preferable to adopt the present aspect when the calorific value for heating the raw material fluid is small.

In the raw material fluid treatment plant according to any one of the above-described aspects, the raw material fluid may be ammonia. In this case, the reactor generates the reaction gas containing nitrogen and hydrogen by heating the ammonia and performing a thermal decomposition reaction on the ammonia.

According to an aspect of the invention, in order to achieve the above-described object, there is provided a raw material fluid treatment method.

The raw material fluid treatment method includes a raw material reaction performing step of generating a reaction gas by heating and reacting a raw material fluid. The raw material reaction step includes a raw material preheating step and a reaction step. In the raw material preheating step, the raw material fluid is heated by exchanging heat between a second heating medium and the raw material fluid. In the reaction performing step, the reaction gas is generated by exchanging heat between the raw material fluid heated in the raw material preheating step and a first heating medium different from the second heating medium, and further heating and reacting the raw material fluid.

According to another aspect of the invention, in order to achieve the above-described object, there is provided a raw material fluid treatment method.

The raw material fluid treatment method includes a raw material reaction step of generating a reaction gas by heating and reacting a raw material fluid, and a heat cycle performing step of causing a third heating medium to flow to use the heated third heating medium. The raw material reaction step includes a reaction performing step of generating the reaction gas by heating and reacting the raw material fluid, and a reaction gas cooling step of cooling the reaction gas generated in the reaction performing step. In the reaction gas cooling step, the third heating medium is heated while the reaction gas is cooled by exchanging heat between at least a portion of the third heating medium before being heated and the reaction gas. In the heat cycle performing step, the third heating medium heated in the reaction gas cooling step is utilized.

Advantageous Effects of Invention

According to an aspect of the present invention, when the raw material fluid is reacted, the thermal energy loss of the heat source such as exhaust gas can be suppressed, and the thermal efficiency of the plant can be improved.

DESCRIPTION OF EMBODIMENTS

Hereinafter, various embodiments and various modification examples of a raw material fluid treatment plant according to the present invention will be described below with reference to the drawings.

First Embodiment

A first embodiment of the raw material fluid treatment plant will be described with reference to FIGS. 1 to 4.

Figure 1:
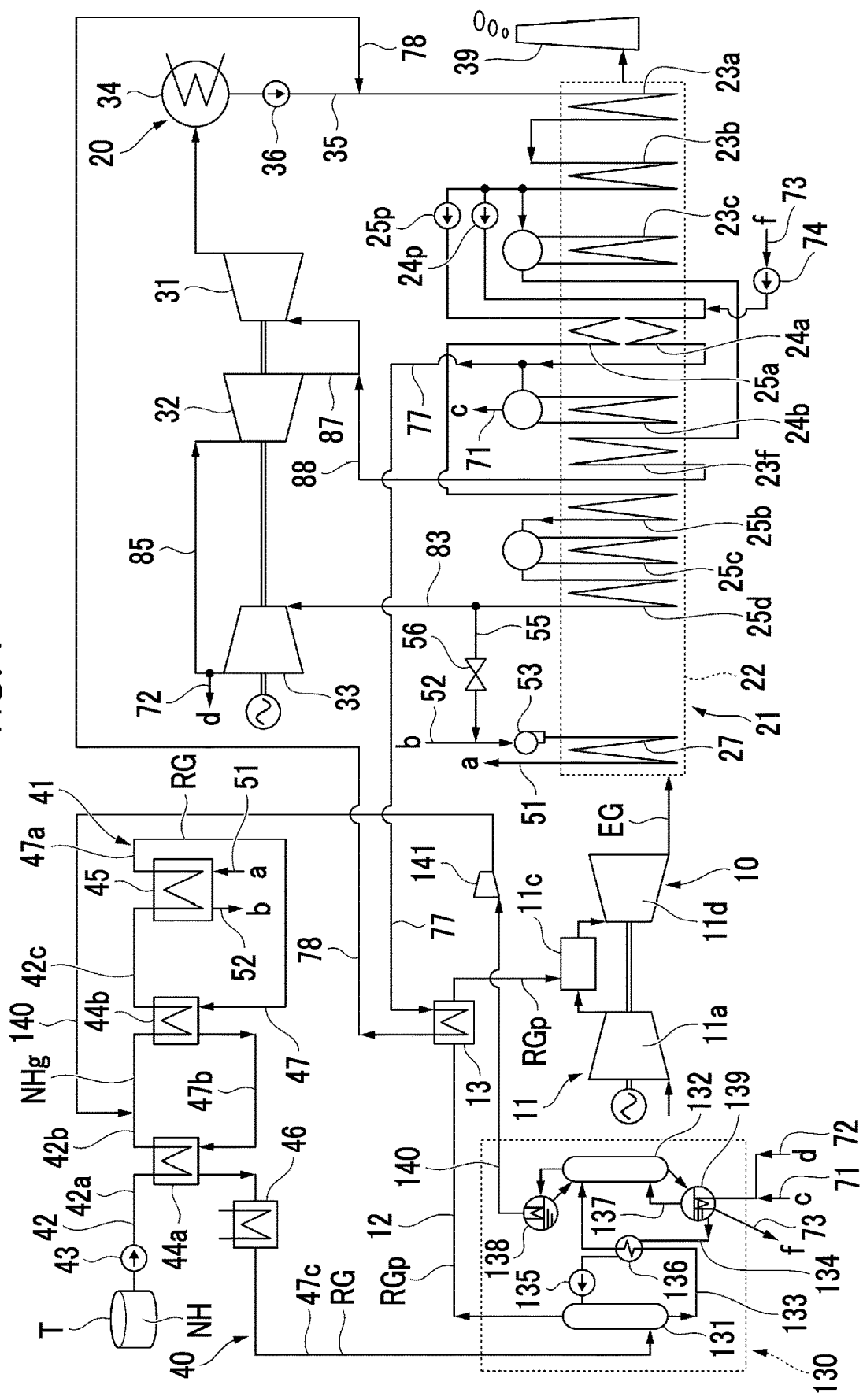
FIG. 1 is a system diagram of a raw material fluid treatment plant according to a first embodiment of the present invention.
Figure 2:
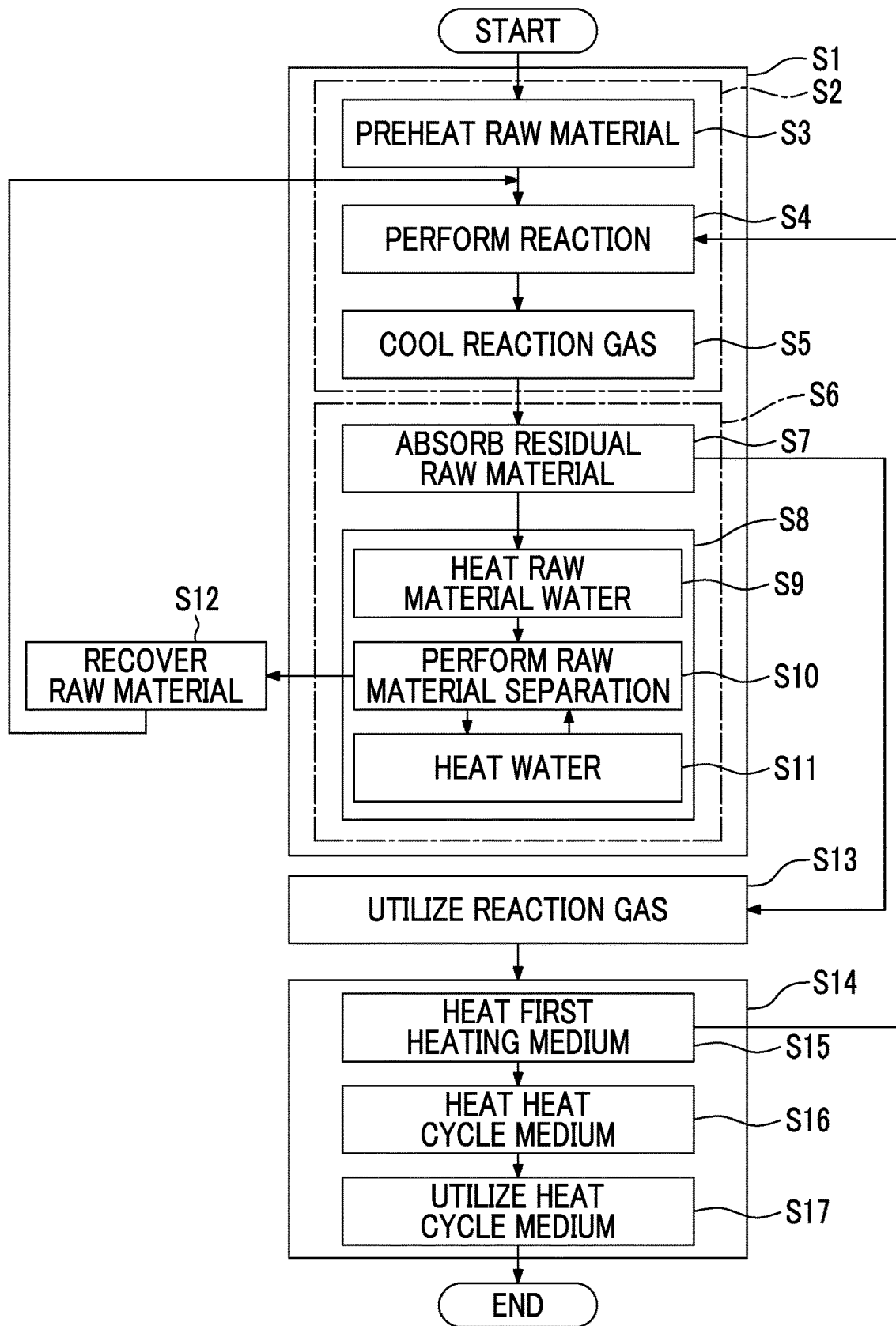
FIG. 2 is a flowchart illustrating an operation of a gas utilization plant according to the first embodiment of the present invention.

As illustrated in FIG. 1, the raw material fluid treatment plant of the present embodiment includes a raw material reaction apparatus 40 that generates a reaction gas RG by reacting a raw material fluid NH, a reaction gas utilization equipment 10 that utilizes the reaction gas RG, and an exhaust heat utilization equipment 20 that utilizes heat of an exhaust gas EG from the reaction gas utilization equipment 10.

The raw material fluid NH of the present embodiment is ammonia. The raw material reaction apparatus 40 generates the reaction gas RG containing hydrogen and nitrogen by performing thermal decomposition reaction on the ammonia which is the raw material fluid NH. The reaction gas utilization equipment 10 is a gas turbine equipment including a gas turbine 11 using the reaction gas RG as a fuel. The reaction gas utilization equipment 10 in the present embodiment and the reaction gas utilization equipment in each of the following embodiments are also the exhaust gas generation equipment that generates the exhaust gas EG. The exhaust heat utilization equipment 20 has a heat recovery steam generator 21 that generates steam by utilizing heat of the exhaust gas EG exhausted from the gas turbine 11, and steam turbines 31, 32, and 33 driven by the steam.

The raw material reaction apparatus 40 has a raw material reaction device 41 and a residual raw material removal device 130. The raw material reaction device 41 generates the reaction gas RG containing hydrogen, nitrogen, and residual ammonia by performing a thermal decomposition reaction on liquid ammonia NH which is a raw material fluid. The residual raw material removal device 130 removes a residual raw material (residual ammonia) from the reaction gas RG, and discharges a treated reaction gas RGp which is the reaction gas RG from which the residual raw material is removed.

The raw material reaction device 41 has an ammonia supply line 42 through which liquid ammonia NH or gaseous ammonia NHg flows from an ammonia tank T, a raw material ammonia pump 43, preheaters 44a and 44b, a reactor 45, a reaction gas cooler 46, a reaction gas line 47, a first heating medium line 51, a first heating medium recovery line 52, and a first heating medium booster 53. The liquid ammonia NH is stored in the ammonia tank T. For example, the liquid ammonia NH is produced by using the hydrogen as a raw material. For example, the hydrogen is obtained in such a way that water is electrolyzed by using electricity generated from renewable energy such as wind power or sunlight, or is obtained in such a way that a natural gas is reformed into steam. The hydrogen is less likely to be transported or stored, compared to a liquefied natural gas. Therefore, the hydrogen obtained as described above is used to produce the liquid ammonia NH which is likely to be transported or stored, and the liquid ammonia NH is stored in the ammonia tank T.

The ammonia supply line 42 has a first ammonia supply line 42a, a second ammonia supply line 42b, and a third ammonia supply line 42c. One end of the first ammonia supply line 42a is connected to the ammonia tank T. The preheaters 44a and 44b have a first preheater 44a and a second preheater 44b. The other end of the first ammonia supply line 42a is connected to an ammonia inlet of the first preheater 44a. The first preheater 44a is a heat exchanger. The first preheater 44a cools a second heating medium while heating the liquid ammonia NH to produce the gaseous ammonia NHg by exchanging heat between the liquid ammonia NH and the second heating medium. One end of the second ammonia supply line 42b is connected to an ammonia outlet of the first preheater 44a, and the other end of the second ammonia supply line 42b is connected to an ammonia inlet of the second preheater 44b. The second preheater 44b is a heat exchanger. The second preheater 44b cools the second heating medium while heating the gaseous ammonia NHg by exchanging heat between the gaseous ammonia NHg and the second heating medium. One end of the third ammonia supply line 42c is connected to an ammonia outlet of the second preheater 44b, and the other end of the third ammonia supply line 42c is connected to an ammonia inlet of the reactor 45.

The first heating medium line 51 is connected to a medium inlet of the reactor 45. The first heating medium recovery line 52 is connected to a medium outlet of the reactor 45. The first heating medium booster 53 is provided in the first heating medium recovery line 52. The reactor 45 is a heat exchanger. A catalyst for promoting the thermal decomposition reaction of the raw material fluid is disposed inside a region through which the raw material fluid passes in the reactor 45. The raw material fluid is the ammonia, as described above. The catalyst is not disposed in the preheaters 44a and 44b, and the catalyst is disposed in the reactor 45. That is, the catalyst is disposed only in a region where the temperature is sufficiently high for actively and progressively reacting the raw material fluid, and the catalyst is not disposed in a region where the temperature is low and the reaction is not progressive even when the catalyst is disposed. As a result, the reaction can be effectively promoted with a small amount of the catalyst, and cost of the catalyst can be reduced. In addition, in the reactor 45, the raw material fluid has an endothermic reaction. According to the present embodiment, the heat required for the endothermic reaction can be efficiently supplied. The reactor 45 cools the first heating medium while further heating the gaseous ammonia NHg by exchanging heat between the gaseous ammonia NHg heated by the second preheater 44b and the first heating medium from the first heating medium line 51. The cooled first heating medium flows into the first heating medium recovery line 52. The gaseous ammonia NHg heated by the reactor 45 is converted into the reaction gas RG containing hydrogen, nitrogen, and residual ammonia through thermal decomposition reaction. The reaction gas line 47 has a first reaction gas line 47a, a second reaction gas line 47b, and a third reaction gas line 47c. One end of the first reaction gas line 47a is connected to a reaction gas outlet of the reactor 45. The other end of the first reaction gas line 47a is connected to a second heating medium inlet of the second preheater 44b. One end of the second reaction gas line 47b is connected to a second heating medium outlet of the second preheater 44b, and the other end of the second reaction gas line 47b is connected to a second heating medium inlet of the first preheater 44a. One end of the third reaction gas line 47c is connected to a second heating medium outlet of the first preheater 44a, and the other end of the third reaction gas line 47c is connected to the residual raw material removal device 130. Therefore, in the present embodiment, the reaction gas RG is the second heating medium. In addition, in the present embodiment, the second heating medium line with respect to guiding the reaction gas RG which is the second heating medium to the first preheater 44a and the second preheater 44b is the reaction gas line 47. The reaction gas cooler 46 is provided in the third reaction gas line 47c. The reaction gas cooler 46 cools the reaction gas RG flowing in the third reaction gas line 47c.

The residual raw material removal device 130 has an absorption tower 131, a regeneration tower 132, an ammonia water line 133, a water line 134, a water supply pump 135, a heat exchanger 136, a water circulation line 137, a condenser 138, a reboiler 139, a recovery ammonia line 140, and a recovery ammonia booster 141.

The other end of the reaction gas line 47 is connected to a lower portion of the absorption tower 131. One end of the water line 134 is connected to an upper portion of the absorption tower 131. The water from the water line 134 is sprayed into the absorption tower 131, and the reaction gas RG from the reaction gas line 47 flows into the absorption tower 131. Inside the absorption tower 131, the water and the reaction gas RG come into contact with each other, and the residual ammonia contained in the reaction gas RG is dissolved in the water. As a result, ammonia water which is the water in which the residual ammonia is dissolved is stored in the lower portion of the absorption tower 131. On the other hand, the treated reaction gas RGp which is the reaction gas RG from which the residual ammonia is removed rises inside the absorption tower 131. Concentration of the gas phase ammonia NHg dissolved in the water increases as the temperature inside the absorption tower 131 is lower. Therefore, in the present embodiment, while the reaction gas RG flowing out from the reactor 45 is sequentially cooled by the second preheater 44b, the first preheater 44a, and the reaction gas cooler 46, the reaction gas RG is guided into the absorption tower 131.

The ammonia water line 133 connects a bottom portion of the absorption tower 131 and an upper portion of the regeneration tower 132 to each other. The ammonia water stored inside the absorption tower 131 is guided into the regeneration tower 132 via the ammonia water line 133. One end of the water circulation line 137 is connected to a bottom portion of the regeneration tower 132, and the other end of the water circulation line 137 is connected to a lower portion (above the bottom portion) of the regeneration tower 132. The reboiler 139 is provided in the water circulation line 137. The reboiler 139 cools the steam and condenses the steam into heated water while heating the water from the water circulation line 137 to produce the steam by exchanging heat between the steam from the exhaust heat utilization equipment 20 and the water from the water circulation line 137. The steam flows into the regeneration tower 132 via the water circulation line 137. Inside the regeneration tower 132, the ammonia water is heated by the steam, and the ammonia contained in the ammonia water is separated and distilled as the gaseous ammonia NHg. The water contained in the ammonia water is stored inside the regeneration tower 132. A portion of the water stored inside the regeneration tower 132 flows into the regeneration tower 132 as the steam via the water circulation line 137 and the reboiler 139. The other end of the water line 134 described above is connected to the water circulation line 137 or the reboiler 139. Therefore, the rest of the water stored inside the regeneration tower 132 is supplied to the absorption tower 131 via the water line 134. The water supply pump 135 is provided in the water supply line. The heat exchanger 136 heats the ammonia water while cooling the water by exchanging heat between the water flowing in the water line 134 and the ammonia water flowing in the ammonia water line 133.

One end of the recovery ammonia line 140 is connected to a top portion of the regeneration tower 132, and the other end of the recovery ammonia line 140 is connected to the second ammonia supply line 42b through which the gaseous ammonia NHg flows. The recovery ammonia line 140 is provided with the condenser 138 and the recovery ammonia booster 141. The gas containing the gaseous ammonia NHg and the water flows into the condenser 138 from the regeneration tower 132. The condenser 138 condenses the water contained in the gas from the regeneration tower 132, and causes the water to return to the regeneration tower 132. The gas from which the water is removed by the condenser 138 and whose concentration of the gaseous ammonia NHg is increased is boosted by the recovery ammonia booster 141, and thereafter, flows into the second preheater 44b via the recovery ammonia line 140 and the second ammonia supply line 42b.

The reaction gas utilization equipment 10 has a fuel line 12 and a fuel preheater 13 in addition to the gas turbine 11 described above.

The gas turbine 11 has an air compressor 11a that generates combustion air by compressing air, a combustor 11c that generates combustion gas by combusting a fuel in the combustion air, and a turbine 11d driven by the combustion gas. The air compressor 11a has a compressor rotor and a compressor casing that covers the compressor rotor. The turbine 11d has a turbine rotor and a turbine casing that covers the turbine rotor. The compressor rotor and the turbine rotor are connected to each other to form a gas turbine rotor. For example, a generator is connected to an end of the gas turbine rotor.

One end of the fuel line 12 is connected to a top portion of the absorption tower 131, and the other end of the fuel line 12 is connected to the combustor 11c. Therefore, the treated reaction gas RGp generated inside the absorption tower 131 is supplied to the combustor 11c as the fuel. The fuel preheater 13 is provided in the fuel line 12. The fuel preheater 13 heats the treated reaction gas RGp as the fuel. The treated reaction gas RGp heated by the fuel preheater 13 flows into the combustor 11c.

The reaction gas utilization equipment 10 described above has a gas turbine cycle which is a type of a heat cycle. This gas turbine cycle is configured to have the fuel line 12, the fuel preheater 13, and the gas turbine 11.

The exhaust heat utilization equipment 20 has a condenser 34, a water supply line 35, a water supply pump 36, and a chimney 39, in addition to the heat recovery steam generator 21 and the steam turbines 31, 32, and 33 which are described above.

The exhaust heat utilization equipment 20 of the present embodiment has a low-pressure steam turbine 31, a medium-pressure steam turbine 32, and a high-pressure steam turbine 33, as steam turbines 31, 32, and 33. Each of the steam turbines 31, 32, and 33 has a turbine rotor and a turbine casing that covers the turbine rotor. The turbine rotors of the respective steam turbines 31, 32, and 33 are connected to each other to form one steam turbine rotor. For example, a generator is connected to an end of the steam turbine rotor. The condenser 34 is connected to the low-pressure steam turbine 31. The condenser 34 causes the steam exhausted from the low-pressure steam turbine 31 to return to the water. The water supply line 35 connects the condenser 34 and the heat recovery steam generator 21 to each other. The water supply pump 36 is provided in the water supply line 35. The water supply pump 36 supplies the water inside the condenser 34 to the heat recovery steam generator 21 via the water supply line 35.

The heat recovery steam generator 21 has a gas frame 22, a first low-pressure economizer 23a, a second low-pressure economizer 23b, a low-pressure evaporator 23c, a low-pressure superheater 23f, a medium-pressure economizer 24a, a medium-pressure evaporator 24b, a first high-pressure economizer 25a, a second high-pressure economizer 25b, a high-pressure evaporator 25c, a high-pressure superheater 25d, a medium-pressure pump 24p, a high-pressure pump 25p, and a first heating medium heater 27.

The exhaust gas EG exhausted from the gas turbine 11 flows inside the gas frame 22. The gas frame 22 has an inlet and an outlet. An exhaust port of the turbine 11d is connected to the inlet of the gas frame 22. The chimney 39 is connected to the outlet of the gas frame 22. The exhaust gas EG flows from the inlet to the outlet inside the gas frame 22. Here, a side where the inlet exists with respect to the outlet will be referred to as an upstream side, and a side opposite thereto will be referred to as a downstream side.

The first heating medium heater 27, the high-pressure superheater 25*d*, a portion of the high-pressure evaporator 25*c*, the second high-pressure economizer 25*b*, the low-pressure superheater 23*f*, a portion of the medium-pressure evaporator 24*b*, the medium-pressure economizer 24*a* and the first high-pressure economizer 25*a*, a portion of the low-pressure evaporator 23*c*, the second low-pressure economizer 23*b*, and the first low-pressure economizer 23*a* are disposed in the above-described order from the upstream side toward the downstream side inside the gas frame 22. The medium-pressure economizer 24*a* is disposed at a position substantially the same as that of the first high-pressure economizer 25*a* in a flow direction of the exhaust gas EG.

The water supply line 35 is connected to the first low-pressure economizer 23*a*. The first low-pressure economizer 23*a* heats the water by exchanging heat between the water supplied from the water supply line 35 and the exhaust gas EG. The second low-pressure economizer 23*b* exchanges the heat between the water supplied from the first low-pressure economizer 23*a* and the exhaust gas EG, and further heats the water to obtain low-pressure heated water. The low-pressure evaporator 23*c* exchanges the heat between the low-pressure heated water and the exhaust gas EG, and heats the low-pressure heated water to obtain the steam. The low-pressure superheater 23*f* exchanges the heat between the steam supplied from the low-pressure evaporator 23*c* and the exhaust gas EG, and heats the steam to obtain low-pressure steam. One end of the low-pressure steam line 88 is connected to an outlet of the low-pressure superheater 23*f*. The other end of the low-pressure steam line 88 is connected to an inlet of the low-pressure steam turbine 31.

The medium-pressure pump 24*p* boosts the low-pressure heated water. The medium-pressure economizer 24*a* exchanges the heat between the heated water boosted by the medium-pressure pump 24*p* and the exhaust gas EG, and further heats the heated water to obtain medium-pressure heated water. The inlet of the medium-pressure evaporator 24*b* is connected to the outlet of the medium-pressure economizer 24*a*, and a medium-pressure heated water line 77 is connected to the outlet of the medium-pressure economizer 24*a*. The medium-pressure heated water line 77 is connected to a medium inlet of the fuel preheater 13 described above. The fuel preheater 13 cools the medium-pressure heated water while heating the treated reaction gas RGp by exchanging heat between the medium-pressure heated water supplied from the medium-pressure heated water line 77 and the treated reaction gas RGp serving as the fuel. A heated water recovery line 78 is connected to a medium outlet of the fuel preheater 13. The heated water recovery line 78 is connected to the water supply line 35.

The medium-pressure evaporator 24*b* exchanges the heat between the medium-pressure heated water and the exhaust gas EG, and heats the medium-pressure heated water to obtain medium-pressure steam. A first reboiler medium line 71 is connected to an outlet of the medium-pressure evaporator 24*b*. The first reboiler medium line 71 is connected to a medium inlet of the reboiler 139 described above. A reboiler medium recovery line 73 is connected to a medium outlet of the reboiler 139. The reboiler medium recovery line 73 is connected to an inlet of the medium-pressure economizer 24*a*. The reboiler medium recovery line 73 is provided with a reboiler medium booster 74.

The high-pressure pump 25*p* boosts the low-pressure heated water. The first high-pressure economizer 25*a* exchanges the heat between the heated water boosted by the high-pressure pump 25*p* and the exhaust gas EG, and further heats the heated water. The second high-pressure economizer 25*b* exchanges the heat between the heated water heated by the first high-pressure economizer 25*a* and the exhaust gas EG, and further heats the heated water. The high-pressure evaporator 25*c* exchanges the heat between the heated water heated by the second high-pressure economizer 25*b* and the exhaust gas EG, and heats the heated water to obtain the steam. The high-pressure superheater 25*d* exchanges the heat between the steam and the exhaust gas EG, and further superheats the steam to obtain high-pressure steam. One end of the high-pressure steam line 83 is connected to an outlet of the high-pressure superheater 25*d*. The other end of the high-pressure steam line 83 is connected to an inlet of the high-pressure steam turbine 33. One end of the high-pressure exhaust steam line 85 is connected to an outlet of the high-pressure steam turbine 33. The other end of the high-pressure exhaust steam line 85 is connected to an inlet of the medium-pressure steam turbine 32. The second reboiler medium line 72 is connected to the high-pressure exhaust steam line 85. The second reboiler medium line 72 is connected to a medium inlet of the reboiler 139 described above. Therefore, in addition to the above-described first reboiler medium line 71, the second reboiler medium line 72 is connected to a medium inlet of the reboiler 139.

One end of the medium-pressure exhaust steam line 87 is connected to an outlet of the medium-pressure steam turbine 32. The other end of the medium-pressure exhaust steam line 87 is connected to an inlet of the low-pressure steam turbine 31. Therefore, the medium-pressure exhaust steam line 87 and the low-pressure steam line 88 are connected to an inlet of the low-pressure steam turbine 31.

The first heating medium recovery line 52 is connected to a medium inlet of the first heating medium heater 27. The first heating medium recovery line 52 and the high-pressure steam line 83 are connected by a heating medium replenishment line 55. Here, the first heating medium, the heat cycle medium, and the high-pressure steam serving as a working medium of the high-pressure steam turbine are all steam, and are the same substance. In addition, the pressure of the first heating medium is lower than a maximum pressure of the heat cycle medium inside the exhaust heat utilization heat cycle. Here, the pressure of the first heating medium is lower than a steam pressure in the inlet of the high-pressure steam turbine. The heating medium replenishment line 55 is provided with a heating medium replenishment valve 56. Normally, the heating medium replenishment valve 56 is closed. However, when it is necessary to replenish the first heating medium, such as when actuated or when the pressure of the first heating medium is lowered due to a leakage of the first heating medium, the heating medium replenishment valve 56 is opened. Then, in this case, the high-pressure steam is appropriately supplied from the high-pressure steam line 83 as the first heating medium, to the first heating medium recovery line 52 via the heating medium replenishment line 55 and the heating medium replenishment valve 56. The first heating medium line 51 is connected to a medium outlet of the first heating medium heater 27. The first heating medium heater 27 heats the first heating medium by exchanging heat between the first heating medium supplied from the first heating medium recovery line 52 and the exhaust gas EG. The first heating medium heated by the first heating medium heater 27 flows into the reactor 45 via the first heating medium line 51. As described above, the first heating medium is cooled by exchanging heat with the gaseous ammonia NHg in the reactor 45. The cooled first heating medium returns to the first heating medium heater 27 via the first heating medium recovery line 52. The first heating medium is boosted by the first heating medium booster 53 during this process. In the following embodiments, as in the present embodiment, the first heating medium is a substance the same as the working medium of the high-pressure steam turbine, that is, the steam, and the pressure of the first heating medium may be lower than an inlet pressure of the high-pressure steam turbine. Furthermore, in the following embodiments, it is preferable to provide a heating medium replenishment line 55 connecting a line for supplying the steam to the high-pressure steam turbine 33 and the first heating medium recovery line 52 to each other, and a heating medium replenishment valve 56. As described above, in the following embodiments, when the heating medium replenishment line 55 and the heating medium replenishment valve 56 are provided, the first heating medium can be replenished without providing other equipment when actuated or when the pressure of the first heating medium is lowered.

The exhaust heat utilization equipment 20 described above has a Rankine cycle which is a type of the heat cycle. This Rankine cycle is configured to have the heat recovery steam generator 21, the steam turbines 31, 32, and 33, the condenser 34, and the water supply pump 36. Since the Rankine cycle utilizes the heat of the exhaust gas EG, the Rankine cycle is also the exhaust heat utilization heat cycle.

Next, an operation and an effect of the raw material fluid treatment plant described above will be described.

When the gas turbine 11 is actuated, an actuating fuel is supplied to the combustor 11c from an actuating fuel line (not illustrated). For example, as the actuating fuel, hydrogen or a natural gas is used. As described above, the air compressor 11a of the gas turbine 11 compresses the air to generate the combustion air. The combustor 11c generates the combustion gas by combusting the actuating fuel in the combustion air. For example, the pressure of the combustion air is approximately 2 MPa. Therefore, the pressure inside the combustor 11c into which the combustion air flows is also approximately 2 MPa, for example. The combustion gas is supplied to the turbine 11d to drive the turbine 11d. The exhaust gas EG which is the combustion gas driving the turbine 11d flows into the gas frame 22 of the heat recovery steam generator 21.

The first low-pressure economizer 23a heats the water by exchanging heat between the water supplied from the water supply line 35 and the exhaust gas EG. The second low-pressure economizer 23b exchanges the heat between the water supplied from the first low-pressure economizer 23a and the exhaust gas EG, and further heats the water to obtain low-pressure heated water. A portion of the low-pressure heated water is boosted by the high-pressure pump 25p, and thereafter, flows into the first high-pressure economizer 25a. The first high-pressure economizer 25a exchanges the heat between the heated water boosted by the high-pressure pump 25p and the exhaust gas EG, and further heats the heated water. The second high-pressure economizer 25b exchanges the heat between the heated water heated by the first high-pressure economizer 25a and the exhaust gas EG, and further heats the heated water. The high-pressure evaporator 25c exchanges the heat between the heated water heated by the second high-pressure economizer 25b and the exhaust gas EG, and heats the heated water to obtain the steam. The high-pressure superheater 25d exchanges the heat between the steam and the exhaust gas EG, and further superheats the steam to obtain high-pressure steam. This high-pressure steam flows into the high-pressure steam turbine 33 via the high-pressure steam line 83. The high-pressure steam turbine 33 is driven by the high-pressure steam.

A portion of the high-pressure steam driving the high-pressure steam turbine 33 flows into the medium-pressure steam turbine 32 via the high-pressure exhaust steam line 85. In addition, the other portion of the high-pressure steam driving the high-pressure steam turbine 33 flows into the reboiler 139 via the second reboiler medium line 72. The medium-pressure steam turbine 32 is driven by the steam supplied from the high-pressure exhaust steam line 85. The steam driving the medium-pressure steam turbine 32 flows into the low-pressure steam turbine 31 via the medium-pressure exhaust steam line 87.

The other portion of the low-pressure heated water described above flows into the low-pressure evaporator 23c. The low-pressure evaporator 23c exchanges the heat between the low-pressure heated water and the exhaust gas EG, and heats the low-pressure heated water to obtain the steam. The low-pressure superheater 23f exchanges the heat between the steam supplied from the low-pressure evaporator 23c and the exhaust gas EG, and heats the steam to obtain low-pressure steam. The low-pressure steam flows into the low-pressure steam turbine 31 via the low-pressure steam line 88. In addition to the low-pressure steam flowing from the low-pressure steam line 88, the steam driving the medium-pressure steam turbine 32 also flows into the low-pressure steam turbine 31 as described above. The low-pressure steam turbine 31 is driven by the steam.

The steam driving the low-pressure steam turbine 31 flows into the condenser 34. The condenser 34 causes the steam supplied from the low-pressure steam turbine 31 to return to the water. The water flows into the first low-pressure economizer 23a via the water supply line 35.

The other portion of the low-pressure heated water described above is boosted by the medium-pressure pump 24p, and thereafter, flows into the medium-pressure economizer 24a. The medium-pressure economizer 24a exchanges the heat between the heated water boosted by the medium-pressure pump 24p and the exhaust gas EG, and further heats the heated water to obtain medium-pressure heated water. A portion of the medium-pressure heated water flows into the fuel preheater 13 via the medium-pressure heated water line 77. The heated water flowing into the fuel preheater 13 flows into the water supply line 35 via the heated water recovery line 78. The other portion of the medium-pressure heated water flows into the medium-pressure evaporator 24b. The medium-pressure evaporator 24b exchanges the heat between the medium-pressure heated water and the exhaust gas EG, and heats the medium-pressure heated water to obtain medium-pressure steam. The medium-pressure steam flows into the reboiler 139 via the first reboiler medium line 71. That is, in addition to the steam supplied from the first reboiler medium line 71, the steam supplied from the second reboiler medium line 72 also flows into the reboiler 139 as described above. The steam flowing into the reboiler 139 is converted into the water, and thereafter, flows into the medium-pressure economizer 24a via the reboiler medium recovery line 73.

The first heating medium heater 27 raises the temperature of the steam by exchanging heat between the steam and the exhaust gas EG. The steam after the temperature is raised flows into the reactor 45 via the first heating medium line 51. The steam flows into the first heating medium heater 27 via the first heating medium recovery line 52 without any phase change. The steam as the first heating medium circulates between the first heating medium heater 27 and the reactor 45 while the exhaust gas EG flows inside the gas frame 22. The first heating medium circulates between the first heating medium heater 27 and the reactor 45 without any phase change. Accordingly, it is not necessary to use a great calorific value for evaporating the first heating medium, and the heat can effectively supply to the reactor 45 by using the limited heat of the exhaust gas EG.

The heat cycle medium which is the water or the steam circulates Inside the Rankine cycle of the exhaust heat utilization equipment 20, in other words, inside the exhaust heat utilization heat cycle. In addition, the liquid ammonia NH inside the ammonia tank T is supplied to the raw material reaction apparatus 40. Hereinafter, an operation of the raw material fluid treatment plant will be described with reference to a flowchart illustrated in FIG. 2. The liquid ammonia NH is supplied to the raw material reaction apparatus 40, and the steam serving as the first heating medium flows into the reactor 45. Furthermore, the steam as a medium for the reboiler flows into the reboiler 139.

When the liquid ammonia NH is supplied to the raw material reaction apparatus 40, a raw material reaction step (S1) is performed. In the raw material reaction step (S1), a reaction gas generation step (S2) and a residual raw material removal step (S6) are performed. In the reaction gas generation step (S2), a raw material preheating step (S3), a reaction performing step (S4), and a reaction gas cooling step (S5) are performed.

The liquid ammonia NH is stored inside the ammonia tank T in a state of being cooled to a temperature of −33.4° C. which is a boiling point or lower, and in a state of a substantially atmospheric pressure. For example, the liquid ammonia NH inside the ammonia tank T is boosted to approximately 5 MPa by the raw material ammonia pump 43. Thereafter, the liquid ammonia NH flows into the preheaters 44a and 44b, and is preheated by exchanging heat with the second heating medium in the preheaters 44a and 44b (S3: raw material preheating step). The liquid ammonia NH boosted by the raw material ammonia pump 43 first flows into the first preheater 44a, and is preheated here. Through the preheating, the liquid ammonia NH is vaporized to be the gaseous ammonia NHg. The liquid ammonia NH is vaporized to be the gaseous ammonia NHg at 90° C. or higher in a pressure environment where the liquid ammonia NH is boosted by the raw material ammonia pump 43. Therefore, the first preheater 44a preheats the liquid ammonia NH so that the temperature of the liquid ammonia NH is 90° C. or higher. Therefore, the first preheater 44a functions as a vaporizer for the liquid ammonia NH. The gaseous ammonia NHg flows into the second preheater 44b, and is preheated here to approximately 400° C., for example. Therefore, the second preheater 44b functions as a gas heater for the gaseous ammonia NHg.

The gaseous ammonia NHg supplied from the second preheater 44b flows into the reactor 45. In addition, the steam serving as the first heating medium heated by the first heating medium heater 27 of the heat recovery steam generator 21 flows into the reactor 45 via the first heating medium line 51. For example, the temperature of the steam is approximately 620° C. The reactor 45 cools the first heating medium while further heating the gaseous ammonia NHg by exchanging heat between the gaseous ammonia NHg and the first heating medium. The cooled first heating medium returns to the first heating medium recovery line 52 via the first heating medium recovery line 52. The first heating medium circulates between the reactor 45 and the first heating medium heater 27. The first heating medium does not have a phase change during a process of circulating between the reactor 45 and the first heating medium heater 27. The gaseous ammonia NHg heated by the reactor 45 is decomposed into hydrogen and nitrogen by a thermal decomposition reaction expressed by the following formula (S4: reaction performing step).

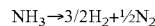

However, in the reaction performing step (S4), a portion of the gaseous ammonia NHg flowing into the reactor 45 remains as residual ammonia (residual raw material). Therefore, in addition to hydrogen and nitrogen, the residual ammonia remains in the reaction gas RG obtained in the reaction performing step (S3). The temperature of the reaction gas RG is approximately 600° C.

The reaction gas RG sequentially flows into the second preheater 44b, the first preheater 44a, and the reaction gas cooler 46, and is sequentially cooled by passing therethrough (S5: reaction gas cooling step). The reaction gas RG supplied from the reactor 45 flows into the second preheater 44b, as the second heating medium, via the reaction gas line 47 which also serves as the second heating medium line. The second preheater 44b cools the reaction gas RG while preheating the gaseous ammonia NHg as described above by exchanging heat between the gaseous ammonia NHg and the reaction gas RG. The reaction gas RG cooled by the first preheater 44a flows into the first preheater 44a, as a second heating medium, via the reaction gas line 47 which also serves as the second heating medium line. The first preheater 44a further cools the reaction gas RG while preheating and vaporizing the liquid ammonia NH as described above by exchanging heat between the liquid ammonia NH and the reaction gas RG. The reaction gas RG cooled by the first preheater 44a flows into the reaction gas cooler 46, and is further cooled. For example, the temperature of the reaction gas RG is approximately 30° C. to 50° C. As described above, the second preheater 44b and the first preheater 44a of the present embodiment function as a preheater for preheating the ammonia NH, and also function as a reaction gas cooler for cooling the reaction gas RG. In addition, the reaction gas RG here is a second heating medium for preheating the ammonia NH, and the ammonia NH is a third heating medium for cooling the reaction gas RG.

Through the above-described process, the reaction gas generation step (S2) is completed. When the reaction gas generation step (S2) is completed, the residual raw material removal step (S6) is performed.

In the residual raw material removal step (S6), a residual raw material absorption step (S7) and a residual raw material separation step (S8) are performed.

The residual raw material absorption step (S7) is performed in the absorption tower 131. The reaction gas RG supplied from the raw material reaction device 41 flows into the absorption tower 131. In addition, the water having the temperature of approximately 30° C. is sprayed on the absorption tower 131 from the water line 134. In the absorption tower 131, the reaction gas RG and the water come into contact with each other, and the residual ammonia contained in the reaction gas RG is dissolved in the water. The ammonia water which is the water in which the residual ammonia is dissolved is stored in a lower portion of the absorption tower 131. On the other hand, the treated reaction gas RGp which is the reaction gas RG from which the residual ammonia is removed is supplied to the gas turbine 11 via the fuel line 12.

In the residual raw material separation step (S8), a raw material water heating step (S9), a raw material separation performing step (S10), and a water heating step (S11) are performed.

The ammonia water (raw material water) stored in the lower portion of the absorption tower 131 is supplied to the regeneration tower 132 via the ammonia water line 133. In this process, the ammonia water is heated inside the heat exchanger 136 (S9: raw material water heating step). In addition to the ammonia water heated by the heat exchanger 136, the steam supplied from the reboiler 139 also flows into the regeneration tower 132. The ammonia water is heated by the steam, and the ammonia contained in the ammonia water is separated and distilled as the gaseous ammonia NHg (S10: raw material separation performing step). On the other hand, the steam is converted into liquid phase water, and is stored in the lower portion of the regeneration tower 132. A portion of the water flows into the reboiler 139 via the water circulation line 137. The medium-pressure steam supplied from the medium-pressure evaporator 24b flows into the reboiler 139 via the first reboiler medium line 71, and the steam exhausted from the high-pressure steam turbine 33 flows into the reboiler 139 via the second reboiler medium line 72. In the reboiler 139, the water flowing from the water circulation line 137 is heated to obtain the steam by exchanging heat with the steam (S11: water heating step). The steam is supplied to the regeneration tower 132. On the other hand, the steam obtained by exchanging heat with the water and flowing from the water circulation line 137 is cooled, and flows into the medium-pressure economizer 24a as heated water via the reboiler medium recovery line 73.

The gas containing the gaseous ammonia NHg inside the regeneration tower 132 flows into the condenser 138 via the recovery ammonia line 140. In the condenser 138, the gas is cooled, and the water contained in the gas is condensed into liquid-phase water. The water returns to the inside of the regeneration tower 132. On the other hand, the gas from which the water is removed, that is, the gas having high gaseous ammonia concentration, is boosted by the recovery ammonia booster 141 provided in the recovery ammonia line 140, and thereafter, flows into the second preheater 44b via the recovery ammonia line 140 and the second ammonia supply line 42b (S12: raw material recovery step). As described above, in the present embodiment, the residual ammonia removed from the reaction gas RG by the residual raw material removal device 130 returns to the second preheater 44b. Accordingly, a wasteful amount wasted in the ammonia as the raw material can be minimized.

As described above, the treated reaction gas RGp is supplied to the gas turbine 11 via the fuel line 12. The treated reaction gas RGp is preheated by the fuel preheater 13 during the process. The gas turbine 11 is driven by combusting the treated reaction gas RGp as the fuel (S13: reaction gas utilization step). The exhaust gas EG supplied from the gas turbine 11 flows into the heat recovery steam generator 21 of the exhaust heat utilization equipment 20.

The exhaust heat utilization equipment 20 utilizes the heat of the exhaust gas EG to heat the heat cycle medium flowing inside the exhaust heat utilization heat cycle, and utilizes the heated heat cycle medium (S14: exhaust heat utilization step). That is, in the exhaust heat utilization equipment 20, the water is heated by the exhaust gas EG to obtain the steam, and the steam is utilized to drive the steam turbines (medium utilization equipment) 31, 32, and 33. In the exhaust heat utilization step (S14), a first heating medium heating step (S15), a heat cycle medium heating step (S16), and a heat cycle medium utilization step (S17) are performed.

The exhaust gas EG flowing into the gas frame 22 heats the first heating medium by exchanging heat with the steam which is the first heating medium in the first heating medium heater 27 as described above (S14: first heating medium heating step). The steam heated by the first heating medium heater 27 is supplied to the reactor 45. In the reactor 45, as described above, the gaseous ammonia NHg flowing into the reactor 45 at this time and the steam which is the first heating medium exchange the heat with each other, and the gaseous ammonia NHg is heated. The gaseous ammonia NHg heated by the reactor 45 is converted into the reaction gas RG by the thermal decomposition reaction (S4: reaction performing step).

As described above, the exhaust gas EG flowing into the heat recovery steam generator 21 heats the heat cycle medium by exchanging heat with the heat cycle medium which is the steam or the water, and the steam can be utilized for each of the steam turbine 31, 32, and 33 (S16: heat cycle medium heating step). The steam is supplied to each of the steam turbine 31, 32, and 33 to drive each of the steam turbine 31, 32, and 33 (S17: heat cycle medium utilization step).

Through the above-described process, a series of operations in the raw material fluid treatment plant is completed.

Figure 3:
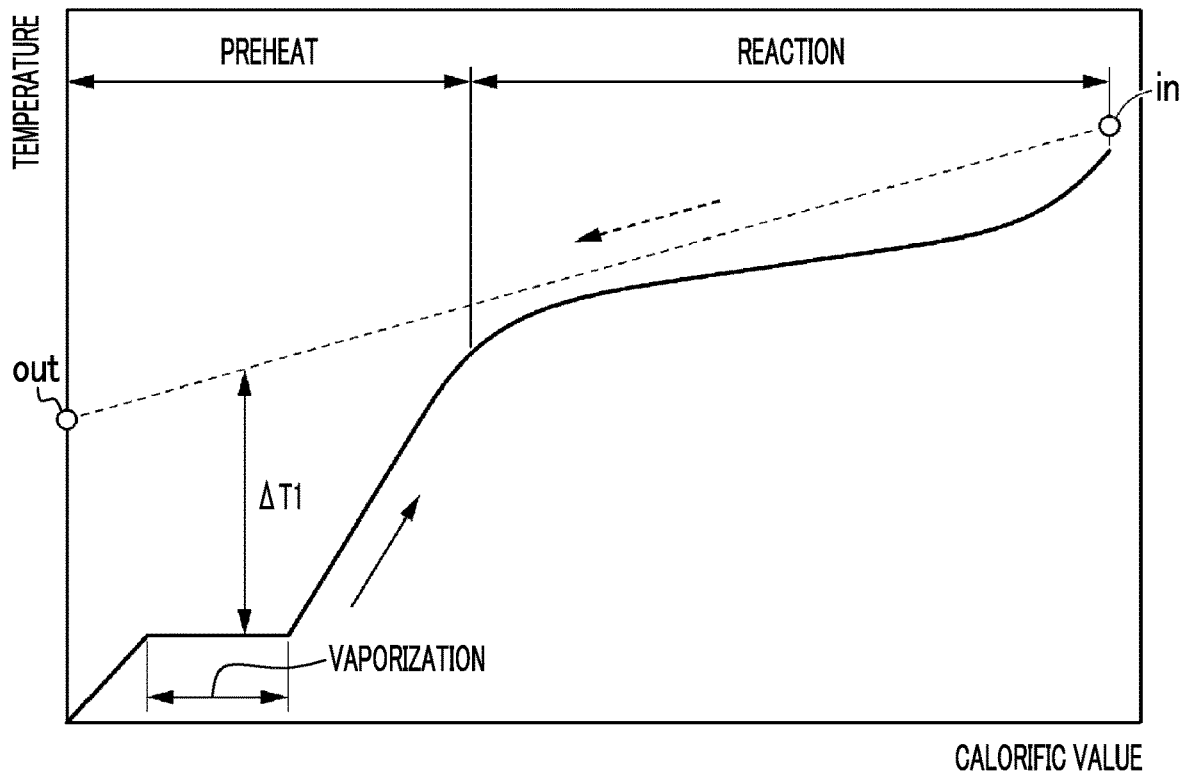
FIG. 3 is a T-Q diagram of ammonia and a heat source in a reference example.
Figure 4:
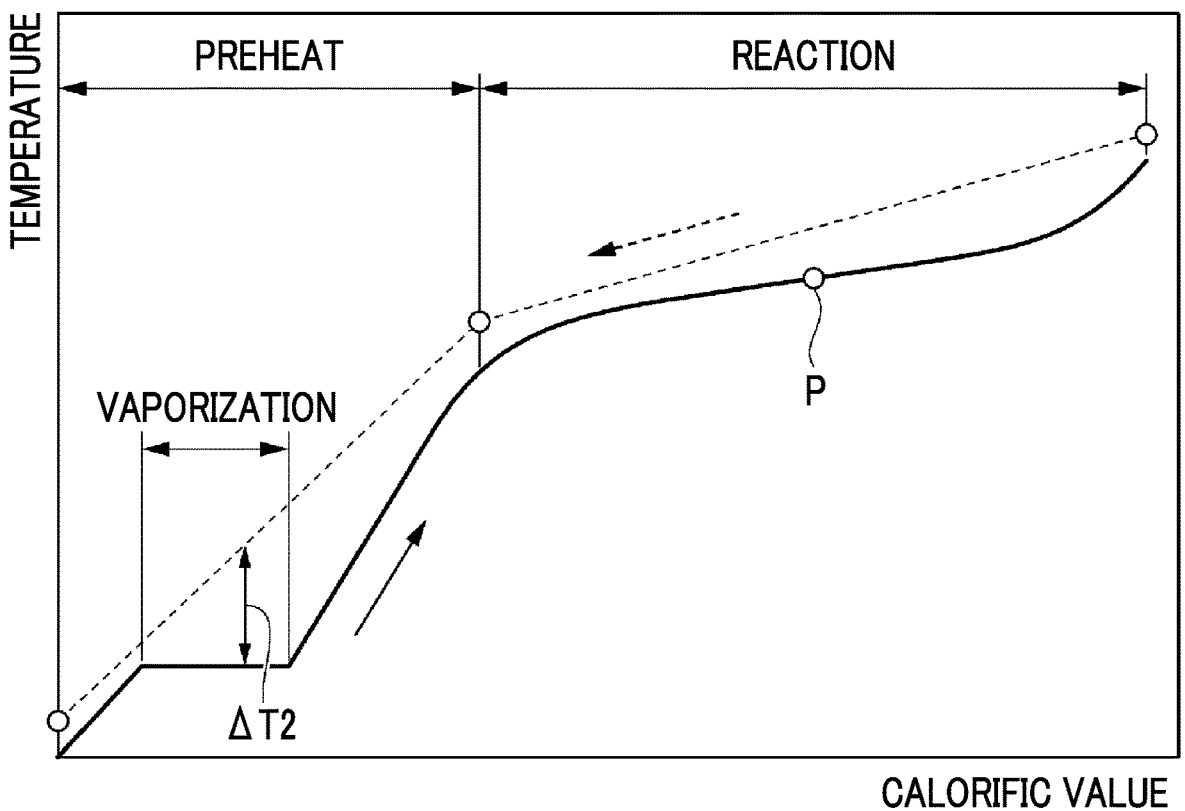
FIG. 4 is a T-Q diagram of ammonia and a heat source in the first embodiment.

Next, main advantageous effects of the present embodiment will be described with reference to FIGS. 3 and 4. FIGS. 3 and 4 are T-Q diagrams relating to ammonia (solid line) and a heat source for heating the ammonia (broken line). Therefore, in FIGS. 3 and 4, a horizontal axis represents a calorific value, and a vertical axis represents a temperature. In addition, FIG. 3 is a T-Q diagram relating to ammonia and a heat source until the thermal decomposition reaction is performed on the liquid ammonia by one heat exchange device, as in PTLs 1 and 2 described above. On the other hand, FIG. 4 is a T-Q diagram relating to the ammonia and the heat source until the thermal decomposition reaction is performed on the liquid ammonia in the present embodiment.

As illustrated in FIGS. 3 and 4, the temperature of liquid ammonia is raised by the preheating as the calorific value increases. When the temperature of the liquid ammonia reaches a saturation temperature, the liquid ammonia is gradually vaporized. In this vaporization process, even when the calorific value of the ammonia increases, the heat is utilized as heat of vaporization (latent heat), and the temperature of ammonia is not changed. When the liquid ammonia is all vaporized to obtain the gaseous ammonia, the calorific value is increased, and the temperature is raised by the preheating. When the temperature of the gaseous ammonia is raised to some extent, the thermal decomposition reaction starts. The thermal decomposition reaction is an endothermic reaction. Accordingly, a temperature rising amount with respect to an increasing amount of the calorific value is smaller, compared to that in the process of preheating the gaseous ammonia. However, when the thermal decomposition reaction proceeds and the concentration of the ammonia is lowered, the temperature rising amount with respect to the increasing amount of the calorific value gradually increases.

In one heat exchange device, the heat source for performing the thermal decomposition reaction on the liquid ammonia is only the exhaust gas passing through the inside of the gas frame of the heat exchange device. In this case, as illustrated in FIG. 3, the calorific value of the exhaust gas serving as a heat source gradually decreases and the temperature is lowered by the exchanging heat with the ammonia, as the exhaust gas flows from an inlet in to an outlet out of the gas frame. At this time, a temperature lowering amount with respect to a decreasing amount of the calorific value relating to the exhaust gas serving as a heat source is substantially constant, regardless of whether the thermal decomposition reaction is performed on the ammonia or whether the liquid ammonia is vaporized. Therefore, for example, a temperature difference ΔT1 between the ammonia during the vaporization and the exhaust gas obtained by exchanging heat with the ammonia increases, and the heat of the high-temperature exhaust gas is recovered by the low-temperature ammonia. Consequently, heat utilization efficiency of exhaust gas is low.

On the other hand, in the present embodiment, the heat sources for performing the thermal decomposition reaction on the liquid ammonia are the first heating medium heated by the exhaust gas EG and the second heating medium which is the reaction gas RG. A system through which the second heating medium flows is different from a system through which the first heating medium flows. The heat of the first heating medium which is a portion of the heat source is utilized to perform the thermal decomposition reaction on the ammonia. As illustrated in FIG. 4, in the first heating medium during the thermal decomposition reaction, the calorific value decreases, and the temperature is lowered due to the heat exchange with ammonia. At this time, the temperature lowering amount with respect to the decreasing amount of the calorific value relating to the first heating medium serving as the heat source is substantially constant.

In the present embodiment, the heat of the second heating medium which is the other portion of the heat source is utilized to preheat the ammonia. In the second heating medium during the preheating, the calorific value decreases, and the temperature is lowered due to the heat exchange with ammonia. However, the second heating medium having a suitable flow rate and a suitable temperature is used to preheat the ammonia. In this manner, a T-Q line indicating a temperature change with respect to a change in the calorific value relating to the second heating medium serving as the heat source represents a line along the T-Q line indicating a temperature change with respect to a change in the calorific value relating to the ammonia. Therefore, a temperature difference ΔT2 between the ammonia and the second heating medium during the preheating decreases, and the heat of the second heating medium having the temperature close to the temperature of the ammonia is recovered by the ammonia. Accordingly, the heat utilization efficiency of the second heating medium is high.

In addition, in the present embodiment, when the thermal decomposition reaction is performed on the ammonia, the ammonia is first preheated by exchanging heat between the reaction gas RG as the second heating medium and ammonia, just in front of a reaction region including the temperature at which inclination is a minimum P on the T-Q line of the ammonia. Thereafter, in the present embodiment, the thermal decomposition reaction is performed on the ammonia by utilizing the heat of the steam serving as the first heating medium in the reaction region. Therefore, in the present embodiment, the calorific value for heating the first heating medium can be reduced by using one heating medium, compared to a case where the ammonia is preheated and the thermal decomposition reaction is performed on the ammonia. Therefore, in the present embodiment, it is possible to suppress the thermal energy loss of the exhaust gas EG for heating the first heating medium.

In the reactor 45, a large portion of the applied heat is utilized for the ammonia decomposition reaction which is the endothermic reaction. Accordingly, the inclination of the T-Q line of the ammonia is small as described above. On the other hand, the endothermic reaction does not occur during preheating. Accordingly, the inclination of the T-Q line is large on average. Therefore, the first heating medium is circulated so that a product of constant pressure specific heat and a flow rate of the steam serving as the first heating medium which is the heat source of the reactor 45 is larger than a product of constant pressure specific heat and a flow rate of the second heating medium serving as the heat source of the preheater 44 configured to include the second preheater 44b and the first preheater 44a, that is, the reaction gas RG. Here, for example, when the constant pressure specific heat is considered in units of KJ/kgK and the flow rate is considered in units of kg/s, the product of the constant pressure specific heat and the flow rate, that is, heat capacity of the heating medium per unit time can be considered in units of kW/K. The unit of the constant pressure specific heat and the flow rate may be determined in any desired way as long as the same unit is used to compare the first heating medium and the second heating medium with each other. For example, the constant pressure specific heat may be considered in units of kcal/molK and the flow rate may be considered in units of mol/h. In this manner, the product of the constant pressure specific heat and the flow rate may be calculated by kcal/hK, and the first heating medium and the second heating medium may be compared with each other. As long as there is no reaction or no phase change, the inclination of the T-Q line is inversely proportional to the product of the constant pressure specific heat and the flow rate. As the product of the constant pressure specific heat and the flow rate is larger, the inclination of the T-Q line is smaller. Therefore, in this case, the first heating medium is circulated so that the product of the constant pressure specific heat and the flow rate of the steam serving as the first heating medium is larger than the product of the constant pressure specific heat and the flow rate of the second heating medium serving as the heat source of the preheater 44, that is, the reaction gas RG. As a result, the inclination of the T-Q line of the first heating medium and the second heating medium can be brought close to the inclination of the T-Q line of the ammonia. The temperature difference ΔT2 between the ammonia and the second heating medium during the preheating can be reduced. The heat of the second heating medium can be recovered by the ammonia having the temperature close to the temperature of the second heating medium. Accordingly, the calorific value required for each temperature level can be input without any excess or insufficiency. Therefore, the heat can be effectively utilized in accordance with the temperature level, and the heat utilization efficiency of the second heating medium is improved.

The above-described advantageous effects are obtained as follows. The following configurations a) and b) are adopted so that different media of the first heating medium and the second heating medium which are the respective heating media for the reaction and the preheating are used for the raw material fluids for the reaction and the preheating, that is, the media having different inclination of the T-Q line of the ammonia.

a) The first heating medium and the second heating medium are caused to have different heat capacities per unit time, that is, different inclinations of the T-Q line.

The first heating medium and the second heating medium are respectively brought close to the inclinations of the T-Q line of the first heating medium and the second heating medium are respectively the inclination of the T-Q line of the ammonia in the reactor and the inclination of the T-Q line of the ammonia in the preheater.

b) As the first heating medium and the second heating medium, the media having each temperature close to those of the ammonia in the reactor and the preheater are respectively used.

Therefore, in order to obtain the above-described advantageous effects, the first heating medium and the second heating medium need to be mutually different heating media. In the present embodiment, the first heating medium is the steam, and the second heating medium is the reaction gas. Both of these are different substances. However, types of the substances in the heating medium do not necessarily have to be different. Both of these may be the same substance, and the heat capacities per unit time may be different from each other, or the temperatures may be different from each, other depending on different phases, different flow rates, or different pressures. When the heat capacities per unit time are different from each other, the inclination of the T-Q line of the heating medium can be changed. In this manner, an advantageous effect can be achieved in that the inclination of the T-Q line of the heating medium is the inclination close to the T-Q line of the respective raw material fluids of the reactor and the preheater. In addition, since the temperatures are different from each other, it is possible to supply the heating medium having the temperature close to that of the respective raw material fluids of the reactor and the preheater. Accordingly, an advantageous effect can be achieved in that the raw material fluid can be reacted and preheated by using the low-temperature heating medium.

In addition, in the present embodiment, the first heating medium circulates between the reactor 45 and the first heating medium heater 27. Therefore, a temperature difference between the temperature of the first heating medium flowing out from the first heating medium heater 27 and the temperature of the first heating medium flowing into the first heating medium heater 27 can be minimized. Moreover, as described above, the first heating medium of the present embodiment does not have a phase change during a process of circulating between the reactor 45 and the first heating medium heater 27. Therefore, in the present embodiment, the calorific value for heating the first heating medium can also be reduced from this viewpoint.

The temperature of the exhaust gas EG for heating the first heating medium is higher than the temperature of the exhaust gas EG for generating steam to be supplied to the steam turbines 31, 32, and 33. Therefore, as described above, when the calorific value for heating the first heating medium can be reduced, the thermal energy loss of the high-temperature exhaust gas EG can be suppressed.

As described above, in the present embodiment, when the liquid ammonia NH is converted into the reaction gas RG, the thermal energy loss of the exhaust gas EG can be suppressed. Therefore, in the present embodiment, the thermal energy can be increased to drive the steam turbines 31, 32, and 33 in the thermal energy of the exhaust gas EG, and the thermal efficiency of the plant can be improved.

In the present embodiment, the heat cycle medium flowing inside the exhaust heat utilization heat cycle and the first heating medium are the water which is the same substance. Accordingly, it is possible to easily control the quality of the water which is the first heating medium.

In addition, in the present embodiment, the pressure of the steam which is the first heating medium is lower than a maximum pressure of the heat cycle medium in the exhaust heat utilization heat cycle. Therefore, without requiring a separate equipment, a portion of the heat cycle medium can be easily supplied to a system of the first heating medium as the first heating medium from the exhaust heat utilization heat cycle when actuated or when the pressure of the first heating medium is lowered, and the first heating medium can be replenished. Specifically, as described above, the high-pressure steam as the first heating medium is supplied to the first heating medium recovery line 52 from the high-pressure steam line 83 configuring a portion of the exhaust heat utilization heat cycle via the heating medium replenishment line 55 and the heating medium replenishment valve 56. During a normal operation, the heating medium replenishment valve 56 is closed. Here, the pressure of the steam which is the first heating medium is lower than the pressure of high-pressure steam which is the heat cycle medium in the exhaust heat utilization heat cycle. Only when it is necessary to replenish the first heating medium, such as when actuated or when the pressure of the first heating medium is lowered due to a seal leakage, the heating medium replenishment valve 56 is opened, and a portion of the high-pressure steam flowing in the high-pressure steam line 83 is guided to the first heating medium recovery line 52 so that the first heating medium recovery line 52 is replenished with the first heating medium. In the present embodiment, without requiring a separate equipment, the first heating medium can be easily replenished when actuated or when the pressure of the first heating medium is lowered.

As described above, in the present embodiment, the heat cycle medium flowing side the exhaust heat utilization heat cycle and the first heating medium are formed of the same substance, and the pressure of the steam which is the first heating medium is set to be lower than the maximum pressure of the heat cycle medium in the exhaust heat utilization heat cycle. Accordingly an advantageous effect can be achieved in that the first heating medium can be easily replenished from the exhaust heat utilization heat cycle. Therefore, as in the first heating medium, when the second heating medium is the substance the same as the heat cycle medium flowing inside the exhaust heat utilization heat cycle, and the pressure of the second heating medium is lower than the maximum pressure of the heat cycle medium in the exhaust heat utilization heat cycle, an advantageous effect can be achieved in that the second heating medium can be easily replenished from the exhaust heat utilization heat cycle. In particular, the first heating medium and the second heating medium do not include an element for extracting work by expansion of at least one heating medium, and do not have a medium introduction port into which the medium flows from the outside during a normal operation. Even when a closed loop is configured to include a heat exchange element, a pipe, and a booster element, the heating medium flowing in the closed loop is formed of the substance the same as that of the heat cycle medium, and the pressure of the heating medium is set to be lower than the maximum pressure of the heat cycle medium in the exhaust heat utilization heat cycle. In this manner, advantageous effects the same as those described above can be achieved. That is, even when the heating medium is the closed loop, without requiring the separate equipment, first heating medium can be easily replenished when actuated or when the pressure of the first heating medium is lowered.

In addition, the raw material reaction apparatus 40 of the present embodiment includes the residual raw material removal device 130 that removes the residual ammonia contained in the reaction gas RG from the raw material reaction device 41, in addition to the raw material reaction device 41 that performs the thermal decomposition reaction on the ammonia NH. Therefore, in the present embodiment, the concentration of the residual ammonia contained in the gas to be supplied to the reaction gas utilization equipment 10 can be suppressed.

Incidentally, when the fuel containing the ammonia is combusted, the ammonia contained in the fuel is converted to NOx by the combustion, and the exhaust gas contains NOx. As described above, the raw material reaction apparatus 40 of the present embodiment can suppress the concentration of the residual ammonia contained in the gas to be supplied to the reaction gas utilization equipment 10. The reaction gas utilization equipment 10 of the present embodiment is a gas turbine equipment that combusts the gas supplied from the raw material reaction apparatus 40, as the fuel. Therefore, in the present embodiment, the concentration of NOx contained in the exhaust gas EG generated by the combustion of the fuel can be suppressed. Furthermore, in the present embodiment, the concentration of $CO_2$ contained in the exhaust gas EG generated by the combustion of fuel can be suppressed.

Second Embodiment

Figure 5:
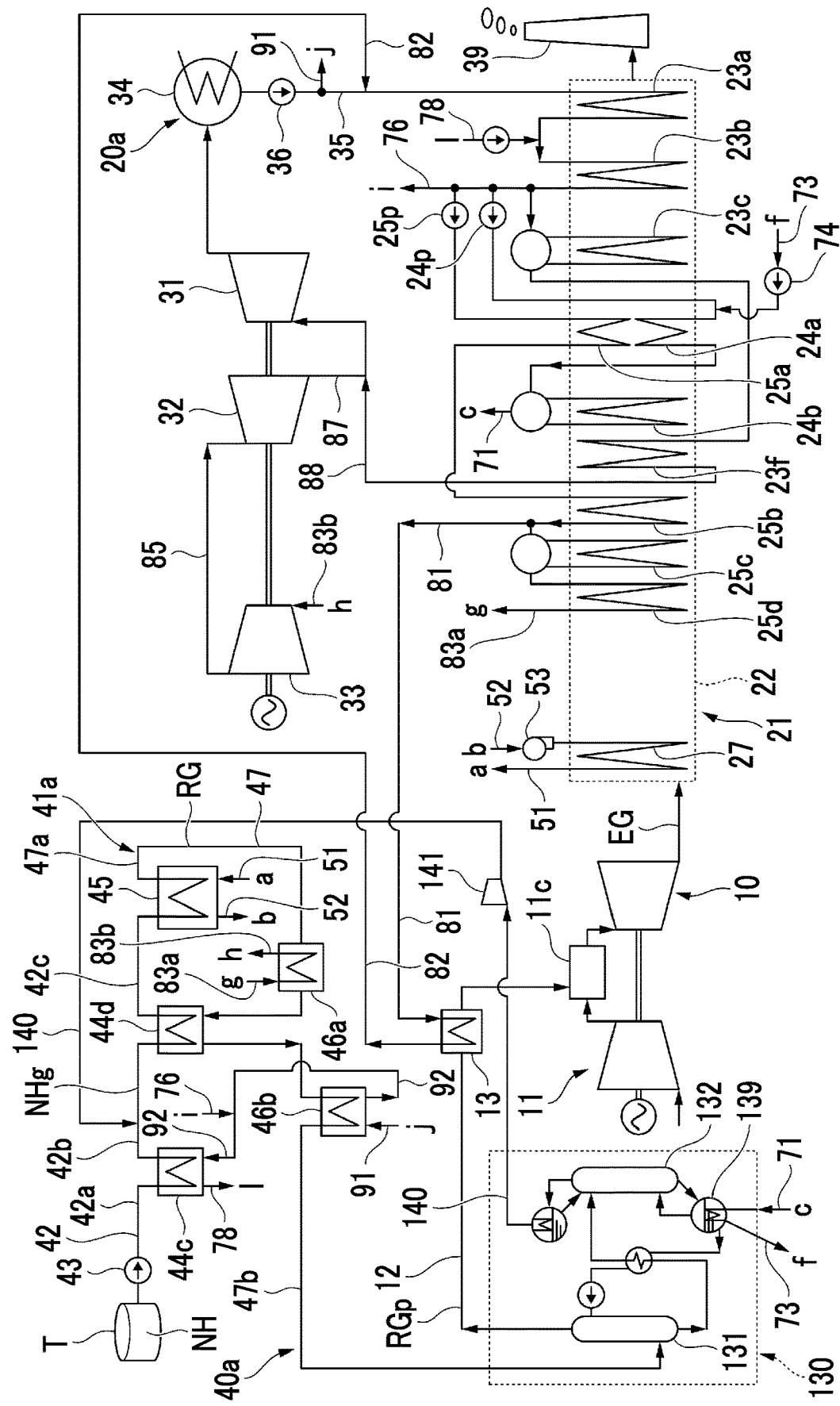
FIG. 5 is a system diagram of a raw material fluid treatment plant according to a second embodiment of the present invention.

A second embodiment of the w material fluid treatment plant will be described with reference to FIG. 5.

The raw material fluid treatment plant of the present embodiment is a plant in which the heat source for preheating the ammonia NH and the heat source for cooling the reaction gas RG are changed from those of the raw material fluid treatment plant of the first embodiment. Therefore, a raw material preheating step in the series of operations in the raw material fluid treatment plant of the present embodiment is different from the raw material preheating step (S3) of the first embodiment. Furthermore, a reaction gas cooling step in the series of operations in the raw material fluid treatment plant of the present embodiment is different from the reaction gas cooling step (S5) of the first embodiment.

As in the first embodiment, the raw material fluid treatment plant of the present embodiment includes a raw material reaction apparatus 40a, the reaction gas utilization equipment 10, and an exhaust heat utilization equipment 20a.

As in the raw material reaction apparatus 40 of the first embodiment, the raw material reaction apparatus 40a of the present embodiment has a raw material reaction device 41a and the residual raw material removal device 130. The raw material reaction device 41a of the present embodiment is different from the raw material reaction device 41 of the first embodiment. On the other hand, the residual raw material removal device 130 of the present embodiment is the same as the residual raw material removal device 130 of the first embodiment.

The reaction gas utilization equipment 10 of the present embodiment is basically the same as the reaction gas utilization equipment 10 of the first embodiment. The individual devices configuring the exhaust heat utilization equipment 20a in the present embodiment are the same as the individual devices configuring the exhaust heat utilization equipment 20 in the first embodiment. However, a line configuration connecting the individual devices to each other in the present embodiment is different from a line configuration connecting the individual devices to each other in the first embodiment.

As in the raw material reaction device 41 of the first embodiment, the raw material reaction device 41a of the present embodiment has the ammonia supply line 42, the raw material ammonia pump 43, preheaters 44c and 44d, the reactor 45, the reaction gas cooler 46, and the reaction gas line 47. As in the first embodiment, the preheaters 44c and 44d have a first preheater 44c and a second preheater 44d. In addition, the reaction gas coolers 46a and 46b have a first reaction gas cooler 46a and a second reaction gas cooler 46b.

As in the first embodiment, the ammonia supply line 42 has a first ammonia supply line 42a, a second ammonia supply line 42b, and a third ammonia supply line 42c. One end of the first ammonia supply line 42a is connected to the ammonia tank T, and the other end of the first ammonia supply line 42a is connected to an ammonia inlet of the first preheater 44c. The first preheater 44c is a heat exchanger. The first preheater 44c cools the second heating medium while heats the liquid ammonia NH to obtain the gaseous ammonia NHg by exchanging heat between the liquid ammonia NH and the second heating medium. One end of the second ammonia supply line 42b is connected to an ammonia outlet of the first preheater 44c, and the other end of the second ammonia supply line 42b is connected to an ammonia inlet of the second preheater 44d. The second preheater 44d is a heat exchanger. The second preheater 44d cools the second heating medium while heats the gaseous ammonia NHg by exchanging heat between the gaseous ammonia NHg and the second heating medium. One end of the third ammonia supply line 42c is connected to an ammonia outlet of the second preheater 44d, and the other end of the third ammonia supply line 42c is connected to an ammonia inlet of the reactor 45.

The first heating medium line 51 is connected to a medium inlet of the reactor 45. The first heating medium recovery line 52 is connected to a medium outlet of the reactor 45. The first heating medium booster 53 is provided in the first heating medium recovery line 52. The reactor 45 is a heat exchanger. As in the reactor 45 of the first embodiment, the reactor 45 cools the first heating medium while further heating the gaseous ammonia NHg by exchanging heat between the gaseous ammonia NHg heated by the second preheater 44d and the first heating medium from the first heating medium line 51. The cooled first heating medium flows into the first heating medium recovery line 52. As in the first embodiment, both the first heating medium line 51 and the first heating medium recovery line 52 are connected to the first heating medium heater 27 of the heat recovery steam generator 21.

The reaction gas line 47 has a first reaction gas line 47a and a second reaction gas line 47b. One end of the first reaction gas line 47a is connected to a reaction gas outlet of the reactor 45. The other end of the first reaction gas line 47a is connected to an inlet of the second heating medium of the second preheater 44d. Therefore, in the present embodiment, the reaction gas RG is a type of the second heating medium. The first reaction gas cooler 46a is provided in the first reaction gas line 47a. One end of the second reaction gas line 47b is connected to an outlet of the second heating medium of the second preheater 44d, and the other end of the second reaction gas line 47b is connected to the residual raw material removal device 130. The second reaction gas cooler 46b is provided in the second reaction gas line 47b.

The high-pressure steam line connecting the high-pressure superheater 25d of the heat recovery steam generator 21 and the high-pressure steam turbine 33 to each other has a first high-pressure steam line 83a and a second high-pressure steam line 83b. One end of the first high-pressure steam line 83a is connected to an outlet of the high-pressure superheater 25d, and the other end of the first high-pressure steam line 83a is connected to an inlet of the third heating medium of the first reaction gas cooler 46a. One end of the second high-pressure steam line 83b is connected to an outlet of the third heating medium of the first reaction gas cooler 46a, and the other end of the second high-pressure steam line 83b is connected to an inlet of the high-pressure steam turbine 33. Therefore, in the present embodiment, the high-pressure steam supplied from the high-pressure superheater 25d is a type of the third heating medium. The first high-pressure steam line 83a is a type of the third heating medium line. The second high-pressure steam line 83b is a type of the third heating medium recovery line.

One end of the high-pressure heated water line 81 is connected to an outlet of the second high-pressure economizer 25b in the heat recovery steam generator 21. The other end of the high-pressure heated water line 81 is connected to a medium inlet of the fuel preheater 13. One end of the high-pressure heated water recovery line 82 is connected to a medium outlet of the fuel preheater 13. The other end of the high-pressure heated water recovery line 82 is connected to the water supply line 35. Therefore, the fuel preheater 13 of the present embodiment heats the fuel by exchanging heat between the high-pressure heated water supplied from the second high-pressure economizer 25b and the fuel.

A branch water supply line 91 branched from the water supply line 35 is connected to an inlet of the third heating medium of the second reaction gas cooler 46b. One end of a connection water supply line 92 is connected to an outlet of the third heating medium of the second reaction gas cooler 46b. The other end of the connection water supply line 92 is connected to an inlet of the second heating medium of the first preheater 44c. Therefore, in the present embodiment, the water supply flowing in the water supply line 35 is a type of the third heating medium that exchanges the heat with the reaction gas RG. In addition, the branch water supply line 91 is a type of the third heating medium line. In addition, the connection water supply line 92 is a type of the third heating medium recovery line with respect to the second reaction gas cooler 46b. In the present embodiment, the water supply flowing into the first preheater 44c from the connection water supply line 92 is a type of the second heating medium. In addition, the connection water supply line 92 is a type of the second heating medium line with respect to the first preheater 44c. One end of the heated water recovery line 78 is connected to an outlet of the second heating medium of the first preheater 44c. The other end of the heated water recovery line 78 is connected to an inlet of the second low-pressure economizer 23b of the heat recovery steam generator 21. Therefore, the heated water recovery line 78 is a type of the second heating medium recovery line with respect to the first preheater 44c, and is also a type of the third heating medium recovery line with respect to the second reaction gas cooler 46b.

The low-pressure heated water line 76 connects the second low-pressure economizer 23b of the heat recovery steam generator 21 and the first preheater 44c to each other. Specifically, one end of the low-pressure heated water line 76 is connected to an outlet of the second low-pressure economizer 23b, and the other end of the low-pressure heated water line 76 is connected to an inlet of the second heating medium of the first preheater 44c. A portion of the low-pressure heated water supplied from the second low-pressure economizer 23b flows into the first preheater 44c, as a type of the second heating medium via the low-pressure heated water line 76. Therefore, the low-pressure heated water line 76 is a type of the second heating medium line.

In the raw material preheating step of the present embodiment, as in the first embodiment, the liquid ammonia NH is boosted by the raw material ammonia pump 43, and thereafter, flows into the preheaters 44c and 44d to be preheated by exchanging heat with the second heating medium in the preheaters 44c and 44d.

The liquid ammonia NH boosted by the raw material ammonia pump 43 first flows into the first preheater 44c, and is preheated here by exchanging heat with the second heating medium. As a result, the liquid ammonia NH is vaporized to obtain the gaseous ammonia NHg. Therefore, the first preheater 44c functions as a vaporizer for the liquid ammonia NH. The second heating medium flowing into the first preheater 44c includes the water supply flowing into the first preheater 44c from the second reaction gas cooler 46b via the connection water supply line 92 and the low-pressure heated water flowing into the first preheater 44c from the second low-pressure economizer 23b via the low-pressure heated water line 76. The second heating medium cooled by exchanging heat with the liquid ammonia NH in the first preheater 44c flows into the second low-pressure economizer 23b via the heated water recovery line 78 which is a type of the second heating medium recovery line and which is a type of the third heating medium recovery line.

Here, the heat recovery steam generator 21, the steam turbines 31, 32, and 33, the condenser 34, the water supply pump 36, and various pipes connecting all of these configure a Rankine cycle, which is a type of the first heat cycle. The connection water supply line 92 which is a type of the second heating medium line guides a portion of the water (first heat cycle medium) flowing in an outlet (first portion in the first heat cycle) of the second low-pressure economizer 23b, to the first preheater 44c as a type of the second heating medium via the low-pressure heated water line 76. The heated water recovery line 78 which is a type of the second heating medium recovery line guides the water cooled by exchanging heat with the raw material fluid (ammonia), to a second portion in which the water having the temperature lower than that of the first portion flows, that is, to an inlet of the second low-pressure economizer 23b. According to this configuration, the heat having a suitable temperature can be supplied to the preheater from the Rankine cycle (first heat cycle) without any excess or insufficiency, and the heat can be used for preheating the raw material fluid. Therefore, in the present embodiment, the heat utilization efficiency is improved.

In addition, the branch water supply line 91 which is a type of the third heating medium line guides the water from the water supply line 35 (first portion in the Rankine cycle) which is one of configuration elements of the Rankine cycle, to the second reaction gas cooler 46b. The heated water recovery line 78 which is a type of the third heating medium recovery line receives the water heated by exchanging heat with the reaction gas in the second reaction gas cooler 46b via the connection water supply line 92 and the first preheater 44c. Then, the heated water recovery line 78 guides the water to the second portion in which the water having the temperature higher than that of the water supply line 35 (first portion) flows, that is, to an inlet of the second low-pressure economizer 23b. According to this configuration, the exhaust heat of the reaction gas cooler is recovered in a suitable amount of the water, and is recovered at a location having a suitable temperature in the Rankine cycle, thereby improving the heat utilization efficiency.

The gaseous ammonia NHg supplied from the first preheater 44c flows into the second preheater 44d, and is further preheated here by exchanging heat with the second heating medium. Therefore, the second preheater 44d functions as a gas heater for the gaseous ammonia NHg. Through the above-described process, the raw material preheating step of the present embodiment is completed. The second heating medium flowing into the second preheater 44d is the reaction gas RG flowing into the second preheater 44d from the first reaction gas cooler 46a via the first reaction gas line 47a. The reaction gas RG is cooled by exchanging heat with the gaseous ammonia NHg in the second preheater 44d.

The gaseous ammonia NHg supplied from the second preheater 44d flows into the reactor 45, and is decomposed into hydrogen and nitrogen by the thermal decomposition reaction as in the first embodiment, thereby generating the reaction gas RG (reaction performing step).

In the reaction gas cooling step, the reaction gas RG is cooled by exchanging heat between the reaction gas RG and the third heating medium. The reaction gas RG supplied from the reactor 45 sequentially flows into the first reaction gas cooler 46a, the second preheater 44d, and the second reaction gas cooler 46b, and is sequentially cooled by passing therethrough.

The first reaction gas cooler 46a superheats the high-pressure steam while cooling the reaction gas RG by exchanging heat between the reaction gas RG supplied from the reactor 45 and the high-pressure steam supplied from the high-pressure superheater 25d of the heat recovery steam generator 21 which is the third heating medium. The superheated high-pressure steam flows into the high-pressure steam turbine 33 via the second high-pressure steam line 83b, and drives the high-pressure steam turbine 33. As described above, in the present embodiment, the high-pressure steam having the temperature higher than that in the first embodiment flows into the high-pressure steam turbine 33. Accordingly, an output of the high-pressure steam turbine 33 can be increased, compared to the first embodiment.

In the present embodiment, the first high-pressure steam line 83a which is a type of the third heating medium line guides the whole amount of the steam flowing out from an outlet of the high-pressure superheater 25d to the first reaction gas cooler 46a. The outlet of the high-pressure superheater 25d is a type of the first portion of the Rankine cycle. The second high-pressure steam line 83b which is a type of the third heating medium recovery line guides the steam superheated by exchanging heat with the reaction gas in the first reaction gas cooler 46a to the second portion in which the steam having the temperature higher than that in an outlet (first portion) of the high-pressure superheater 25d, that is, to an inlet of the high-pressure steam turbine 33. According to this configuration, the exhaust heat of the reaction gas cooler is recovered in a suitable amount of the steam, and is recovered at a location having a suitable temperature in the Rankine cycle, thereby improving the heat utilization efficiency.

In a plant that utilizes the heat to react the raw material fluid and obtain the reaction gas as in the present embodiment, the reaction of the raw material fluid consumes a large amount of the high-temperature heat. Accordingly, there is a possibility that the temperature of the heat cycle medium may not be sufficiently raised. Specifically, in order to supply the high-temperature heat sufficient for the reaction of the raw material fluid, the first heating medium heater 27 is disposed at a location having the highest temperature, on a most upstream side side with respect to the flow of the exhaust gas EG in the gas frame 22 of the heat recovery steam generator 21. Here, as described above, the reaction of the raw material fluid requires a large amount of the heat. Accordingly, the first heating medium heater 27 requires a large amount of the heat of the first heating medium which is the heat source of the reaction. In this case, the heat exchange amount increases in the first heating medium heater 27, and the temperature of the exhaust gas EG is significantly lowered in the first heating medium heater 27. Therefore, in the high-pressure superheater 25d installed on the downstream side of the first heating medium heater 27 when viewed from the flow of the exhaust gas EG, the temperature of the exhaust gas EG which can be utilized as the heat source is lowered. Consequently, there is a possibility that the high-pressure superheater 25d may not heat the high-pressure steam to a sufficiently high temperature. When the steam in an outlet of the high-pressure superheater 25d is directly supplied to the high-pressure steam turbine 33 as in the first embodiment, the temperature in an inlet of the high-pressure steam turbine 33 is lowered. In addition, in order to suppress erosion of turbine blades which is caused by moisture near the outlet of the low-pressure steam turbine 31, it is necessary to maintain low wetness of the outlet of the low-pressure steam turbine 31. Accordingly, it is necessary to maintain enthalpy of the outlet of the low-pressure steam turbine 31 to have a prescribed value or greater. When the temperature of the inlet of the high-pressure steam turbine 33 is low, in order to maintain the enthalpy of the outlet of the low-pressure steam turbine 31 to have the prescribed value or greater, it is necessary to maintain a small heat drop from the inlet of the high-pressure steam turbine 33 to the outlet of the low-pressure steam turbine 31. In other words, it is necessary to reduce a pressure ratio from the inlet of the high-pressure steam turbine 33 to the outlet of the low-pressure steam turbine 31. Therefore, in the first embodiment, the steam pressure of the inlet of the high-pressure steam turbine 33 cannot be raised.

In the present embodiment, the steam of the outlet of the high-pressure superheater 25d is supplied to the first reaction gas cooler 46a that cools the reaction gas, as the third heating medium. The exhaust heat of the reaction gas cooler 46a is recovered, and thereafter, is supplied to the high-pressure steam turbine 33. Therefore, in the present embodiment, the steam temperature in the inlet of the high-pressure steam turbine 33 can be raised, and the entropy of the low-pressure steam turbine 31 can have the prescribed value or greater. Therefore, in the present embodiment, while the erosion in the outlet of the low-pressure steam turbine 31 can be suppressed, the steam pressure and the temperature of the inlet of the high-pressure steam turbine 33 can be raised. From the above-described viewpoint, in the present embodiment, even when a large amount of the high-temperature heat is required for the reaction in the reactor 45 and the heating of the first heating medium in the first heating medium heater 27, an output of the steam turbine can be increased, and the efficiency of the plant can be improved.

In the first embodiment and the present embodiment, the first heating medium circulates between the reactor 45 and the first heating medium heater 27. The reactor 45 exchanges the heat between the first heating medium and the raw material fluid. Accordingly, a difference between the temperature of the outlet of the first heating medium of the reactor 45 and the temperature of the inlet of the raw material fluid can be reduced to a minimum temperature difference which can be achieved with a reasonable heat exchange area. In addition, the first heating medium flowing out from the reactor 45 enters the first heating medium heater 27 only by boosting a pressure loss of the system.

Accordingly, there is a small difference between the temperature of the inlet of the first heating medium of the first heating medium heater 27 and the temperature of the outlet of the first heating medium of the reactor 45. In addition, the first heating medium heater 27 exchanges the heat between the exhaust gas EG and the first heating medium. Accordingly, a difference between the temperature of the outlet of the exhaust gas of the first heating medium heater 27 and the temperature of the inlet of the first heating medium of the first heating medium heater 27 can be reduced to the minimum temperature difference which can be achieved with the reasonable heat exchange area. Furthermore, the temperature of the outlet of the exhaust gas of the first heating medium heater 27 and the temperature of the inlet of the exhaust gas of the high-pressure superheater 25d are substantially equal to each other. Therefore, when a heat exchange temperature difference is sufficiently reduced to improve the heat utilization efficiency of the reactor 45 and the first heating medium heater 27, the temperature difference decreases between the temperature of the inlet of the exhaust gas of the high-pressure superheater 25d and the temperature of the inlet of the raw material fluid of the reactor 45. When the steam to be supplied to the high-pressure steam turbine 33 is superheated by using only the heat of the exhaust gas as in the first embodiment, the steam temperature in the inlet of the high-pressure steam turbine 33 is less likely to be higher than the temperature of the inlet of the raw material fluid of the reactor 45.

In the present embodiment, although the description is repeated, the temperature of the high-pressure steam is raised by utilizing the exhaust heat of the reaction gas cooler 46a. In the first heating medium heater 27, the difference between the temperature of the inlet of the exhaust gas and the temperature of the outlet of the first heating medium, that is, the temperature of the inlet of the first heating medium of the reactor 45 can be reduced to the minimum temperature difference which can be achieved with the reasonable heat exchange area. In the reactor 45, the difference between the temperature of the inlet of the first heating medium of the reactor 45 and the temperature of the outlet of the reaction gas can be reduced to the minimum temperature difference which can be achieved with the reasonable heat exchange area. In addition, the reaction gas cooler 46a exchanges the heat between the steam to be supplied to the high-pressure steam turbine 33 which is the third heating medium and the reaction gas of the outlet of the reactor 45. Accordingly, the difference between the temperature of the reaction gas in the outlet of the reactor 45 and the steam temperature of the inlet of the high-pressure steam turbine 33 can be reduced to the minimum temperature difference which can be achieved with the reasonable heat exchange area. Therefore, in the present embodiment, the steam temperature of the inlet of the high-pressure steam turbine 33 can be raised to a temperature close to the temperature of the inlet of the exhaust gas of the first heating medium heater 27. The heat is exchanged between the exhaust gas EG in the outlet of the exhaust gas of the first heating medium heater 27 and the raw material fluid in the inlet of the raw material fluid of the reactor 45 via the first heating medium heater 27, the first heating medium, and the reactor 45. Accordingly, the temperature of the inlet of the raw material fluid of the reactor 45 is lower than the temperature of the outlet of the exhaust gas of the first heating medium heater 27. As described above, when it is considered that the temperature of the exhaust gas of the first heating medium heater 27 is significantly lowered, the temperature of the inlet of the exhaust gas of the first heating medium heater 27 is significantly higher than the temperature of the inlet of the raw material fluid of the reactor 45. Therefore, in the second embodiment, the exhaust heat of the reaction gas cooler that cools the reaction gas is utilized. In this manner, the third heating medium (steam of the inlet of the high-pressure steam turbine 33) can be relatively easily heated to a temperature higher than the temperature in the inlet of the raw material fluid of the reactor.

In addition, in the reactor 45, the heat is applied from the first heating medium in the outlet of the first heating medium of the reactor 45 to the raw material fluid in the inlet of the raw material fluid of the reactor 45. Therefore, the temperature of the outlet of the first heating medium of the reactor 45 is higher than the temperature of the inlet of the raw material fluid of the reactor 45. Therefore, the third heating medium (steam of the inlet of the high-pressure steam turbine 33) having the temperature higher than the temperature of the outlet of the first heating medium of the reactor 45 is much less likely to be supplied to the high-pressure steam turbine 33 without using the exhaust heat of cooling the reaction gas. However, as described above, when the configuration of the present embodiment is adopted, the high-temperature steam can be relatively easily supplied to the high-pressure steam turbine 33 in this way.

In the present embodiment, as described above, the third heating medium is heated to the temperature higher than the temperature of the outlet of the first heating medium of the reactor 45 by using the exhaust heat of cooling the reaction gas. Thereafter, the third medium is supplied to the heat cycle. In this manner, it is possible to particularly improve an advantageous effect of increasing the output of the heat cycle (here, the steam turbine) and an advantageous effect of improving the efficiency of the plant.

As described above, the second preheater 44d preheats the gaseous ammonia NHg while further cooling the reaction gas RG by exchanging heat between the reaction gas RG cooled by the first reaction gas cooler 46a and the gaseous ammonia NHg. Therefore, the second preheater 44d functions as a preheater for preheating the gaseous ammonia NHg, and also functions as a reaction gas cooler for cooling the reaction gas RG. In addition, the reaction gas RG described here is the second heating medium for preheating the gaseous ammonia NHg, and the gaseous ammonia NHg is the third heating medium for cooling the reaction gas RG.

The second reaction gas cooler 46b heats the water supply while cooling the reaction gas RG by exchanging heat between the reaction gas RG is cooled by the second preheater 44d and the water supply serving as the third heating medium. The heated water supply flows into the first preheater 44c as the second heating medium. As described above, the low-pressure heated water also flows into the first preheater 44c as the second heating medium.

Through the above-described process, the reaction gas cooling step is completed. The reaction gas RG cooled by the second reaction gas cooler 46b flows into the residual raw material removal device 130, and the residual ammonia contained in the reaction gas RG is removed as in the first embodiment.

As described above, the second heating medium that preheats the ammonia NH by exchanging heat with the ammonia NH may be the reaction gas RG, and may be the water or the steam serving as the heat cycle medium flowing inside the exhaust heat utilization heat cycle. In addition, the third heating medium that cools the reaction gas RG by exchanging heat with the reaction gas RG may be the ammonia NH, and may be the water or the steam serving as the heat cycle medium flowing inside the exhaust heat utilization heat cycle.

In addition, in the present embodiment, the raw material fluid in a liquid phase, that is, the liquid ammonia is vaporized by the first preheater (vaporizer) 44c, and thereafter, is supplied to the second preheater (gas heater) 44d. In addition, the water supply and the heated water are supplied to the first preheater (vaporizer) 44c as the second heating medium for vaporization, and the reaction gas serving as the second heating medium for gas heating is supplied to the second preheater (gas heater) 44d. In particular, a large amount of the water in which the water supply flowing into the first preheater 44c from the second reaction gas cooler 46b via the connection water supply line 92 merges with the low-pressure heated water flowing into the first preheater 44c from the second low-pressure economizer 23b via the low-pressure heated water line 76 is supplied to the first preheater (vaporizer) 44c, as the second heating medium for vaporization. Therefore, in the present embodiment, a product of constant pressure specific heat and a flow rate of the second heating medium for vaporization which flows inside the first preheater (vaporizer) 44c is larger than a product of constant pressure specific heat and a flow rate of the second heating medium for gas heating which flows inside the second preheater (gas heater) 44d. That is, in the present embodiment, a great calorific value is supplied to the first preheater (vaporizer) 44c which requires the great calorific value for vaporizing the raw material fluid at a temperature level required for the first preheater 44c, and a small calorific value is supplied to the second preheater (gas heater) 44d in which the small calorific value is sufficient at a temperature level required for the second preheater 44. Therefore, in the present embodiment, the calorific value required for each temperature level can be input without any excess or insufficiency. The heat can be effectively utilized in accordance with the temperature level, and heat utilization efficiency can be improved. As in the description of the first embodiment, the unit of the constant pressure specific heat and the flow rate may be determined in any desired way as long as the comparison is made by using the same unit for the second heating medium for vaporization and the second heating medium for gas heating.

In the present embodiment, an advantageous effect of improving the heat utilization efficiency in the preheater is an advantageous effect obtained by supplying respectively different media to the second heating medium for vaporization and the second heating medium for gas heating. In the present embodiment, the water is used as the second heating medium for vaporization, and the reaction gas is used as the second heating medium for gas heating. Both of these are different substances. However, both of these do not need to be different substances. Both of these may be the same substance, and the heat capacities per unit time may be different from each other, or the temperatures may be different from each other, depending on different phases, different flow rates, or different pressures. When both of these have the different heat capacities per unit time, it is possible to supply a greater calorific value to the temperature level of vaporization which requires the great calorific value, compared to gas temperature raising for the raw material fluid. In addition, when the temperature of the second heating medium for vaporization and the temperature of the second heating medium for gas heating are different from each other, the heating medium having the temperature close to that of the raw material fluid can be supplied to each of the vaporizer of the raw material fluid and the gas heater of the raw material fluid. Therefore, the raw material fluid can be vaporized, and the temperature can be raised by using the heating medium having a relatively low-temperature. Moreover, the heat required for preheating can be supplied in accordance with the temperature level of the raw material fluid. Accordingly, the heat utilization efficiency is improved, and the efficiency of the plant is improved.

In the present embodiment, the steam may be supplied to the first preheater (vaporizer) 44c from an intermediate stage of the low-pressure evaporator 23c or the low-pressure steam turbine 31. In the first preheater 44c, the raw material fluid in the liquid phase, that is, the liquid ammonia may be evaporated by using the heat generated by condensation of the steam. The heat of vaporization or the heat of condensation of a fluid, that is, latent heat, is generally hotter than the heat caused by a change in the temperature, that is, sensible heat. Therefore, according to this configuration, the heat of vaporization which requires a large amount of the heat can be supplied by using the heat of condensation from which a great calorific value can be easily obtained. In this case, the second heating medium for vaporization which is condensed at a constant temperature is used as the heat source. In this manner, the heat source medium can be vaporized at a constant temperature. The heat having a relatively low constant temperature can be effectively utilized to vaporize the raw material fluid, and the heat utilization efficiency can be improved.

Third Embodiment

Figure 7:
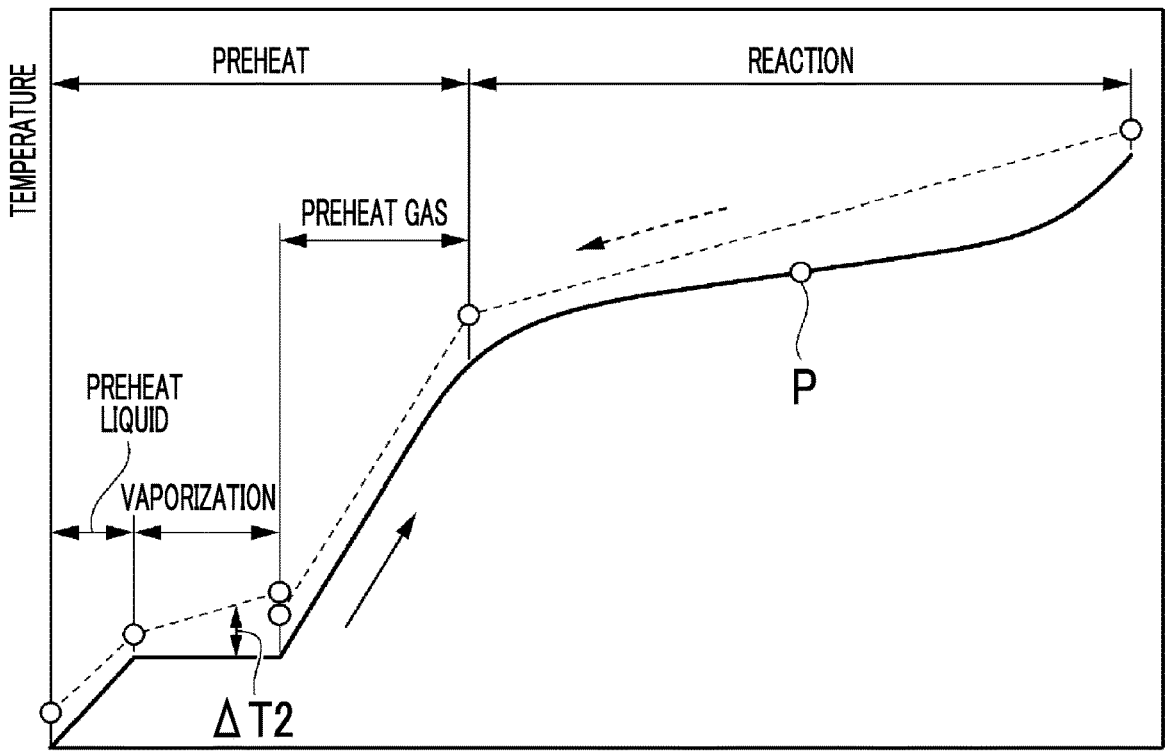
FIG. 7 is a T-Q diagram of ammonia and a heat source in the third embodiment.
Figure 8:
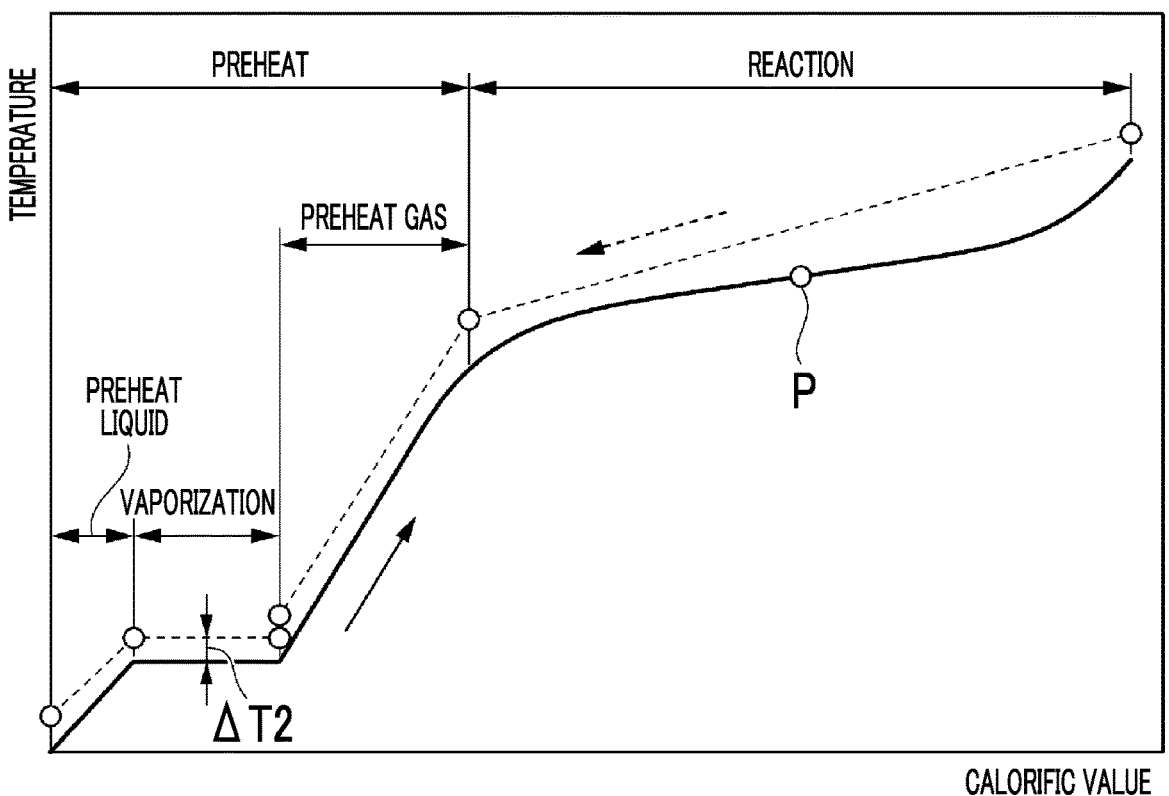
FIG. 8 is a T-Q diagram of ammonia and a heat source in a modification example of the third embodiment.

A third embodiment of the raw material fluid treatment plant will be described with reference to FIGS. 6 to 8.

The raw material fluid treatment plant of the present embodiment is the plant in which the heat source for preheating the ammonia NH and the heat source for cooling the reaction gas RG are changed from those of the raw material fluid treatment plant of the first embodiment. Therefore, a raw material preheating step in the series of operations in the raw material fluid treatment plant of the present embodiment is different from the raw material preheating step (S3) of the first embodiment. Furthermore, a reaction gas cooling step in the series of operations in the raw material fluid treatment plant of the present embodiment is different from the reaction gas cooling step (S5) of the first embodiment.

Figure 6:
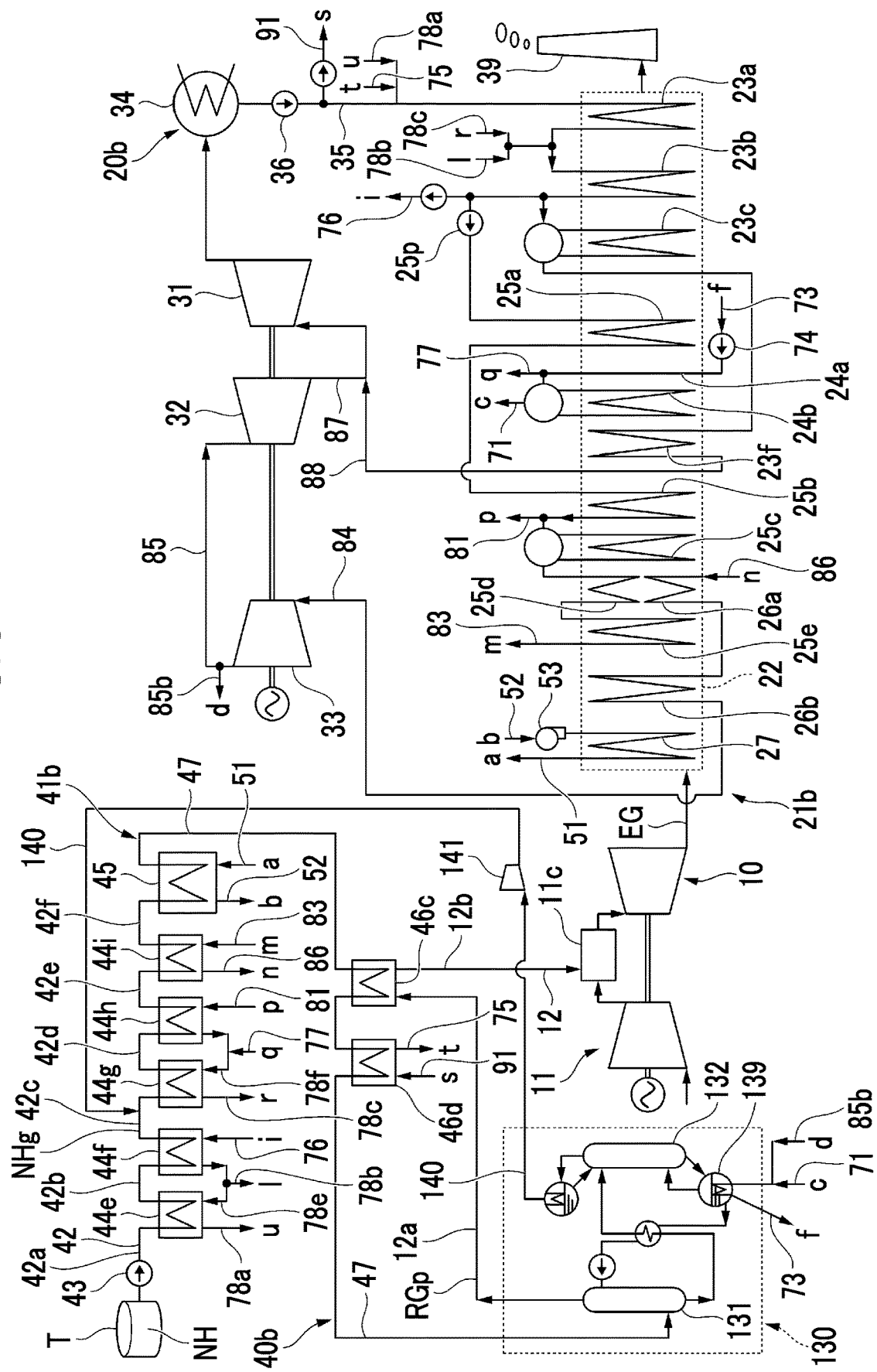
FIG. 6 is a system diagram of a raw material fluid treatment plant according to a third embodiment of the present invention.

As illustrated in FIG. 6, as in the above-described embodiment, the raw material fluid treatment plant of the present embodiment includes a raw material reaction apparatus 40b, the reaction gas utilization equipment 10, and an exhaust heat utilization equipment 20b.

As in the raw material reaction apparatus of the above-described embodiment, the raw material reaction apparatus 40b of the present embodiment has a raw material reaction device 41b and the residual raw material removal device 130. The raw material reaction device 41b of the present embodiment is different from the raw material reaction device of the above-described embodiment. On the other hand, the residual raw material removal device 130 of the present embodiment is the same as the residual raw material removal device 130 of the first embodiment.

The reaction gas utilization equipment 10 of the present embodiment is basically the same as the reaction gas utilization equipment 10 of the above-described embodiment. In addition, the exhaust heat utilization equipment 20b of the present embodiment is different from the exhaust heat utilization equipment of the above-described embodiment.

As in the above-described embodiment, the exhaust heat utilization equipment 20b of the present embodiment has a heat recovery steam generator 21b, the low-pressure steam turbine 31, the medium-pressure steam turbine 32, the high-pressure steam turbine 33, the condenser 34, the water supply line 35, the water supply pump 36, and the chimney 39.

As in the above-described embodiment, the heat recovery steam generator 21b has the gas frame 22, the first low-pressure economizer 23a, the second low-pressure economizer 23b, the low-pressure evaporator 23c, the low-pressure superheater 23f, the medium-pressure evaporator 24b, the first high-pressure economizer 25a, the medium-pressure economizer 24a, the second high-pressure economizer 25b, the high-pressure evaporator 25c, the first high-pressure superheater 25d, and the high-pressure pump 25p, and the first heating medium heater 27. The heat recovery steam generator 21 of the present embodiment further has a second high-pressure superheater 25e, a first high-pressure reheater 26a, and a second high-pressure reheater 26b.

The first heating medium heater 27, the second high-pressure reheater 26b, the second high-pressure superheater 25e, the first high-pressure superheater 25d, the first high-pressure reheater 26a, a portion of the high-pressure evaporator 25c, the second high-pressure economizer 25b, the low-pressure superheater 23f, a portion of the medium-pressure evaporator 24b, the medium-pressure economizer 24a, the first high-pressure economizer 25a, a portion of the low-pressure evaporator 23c, the second low-pressure economizer 23b, the first low-pressure economizer 23a are disposed in the above-described order from the upstream side toward the downstream side inside the gas frame 22. The first high-pressure reheater 26a is disposed at a position substantially the same as that of the first high-pressure superheater 25d in the flow direction of the exhaust gas EG. The second high-pressure reheater 26b further superheats the steam superheated by the first high-pressure reheater 26a. An outlet of the second high-pressure reheater 26b is connected to an inlet of the high-pressure steam turbine 33 by the high-pressure reheat steam line 84.

The raw material reaction device 41b of the present embodiment has the ammonia supply line 42, the raw material ammonia pump 43, preheaters 44e to 44i, the reactor 45, reaction gas coolers 46c and 46d, and the reaction gas line 47. The preheaters 44e to 44i of the present embodiment have a first preheater 44e, a second preheater 44f, a third preheater 44g, a fourth preheater 44h, and a fifth preheater 44i. In addition, the reaction gas coolers 46c and 46d of the present embodiment have a first reaction gas cooler 46c and a second reaction gas cooler 46d.

The ammonia supply line 42 has a first ammonia supply line 42a, a second ammonia supply line 42b, a third ammonia supply line 42c, a fourth ammonia supply line 42d, a fifth ammonia supply line 42e, and a sixth ammonia supply line 42f.

One end of the first ammonia supply line 42a is connected to the ammonia tank T, and the other end of the first ammonia supply line 42a is connected to an ammonia inlet of the first preheater 44e. The first preheater 44e is a heat exchanger. The first preheater 44e cools the second heating medium while heating the liquid ammonia NH by exchanging heat between the liquid ammonia NH and the second heating medium. One end of the second ammonia supply line 42b is connected to an ammonia outlet of the first preheater 44e, and the other end of the second ammonia supply line 42b is connected to an ammonia inlet of the second preheater 44f. The second preheater 44f is a heat exchanger. The second preheater 44f cools the second heating medium while heating the liquid ammonia NH to obtain the gaseous ammonia NHg by exchanging heat between the liquid ammonia NH heated by the first preheater 44e and the second heating medium. One end of the third ammonia supply line 42c is connected to an ammonia outlet of the second preheater 44f, and the other end of the third ammonia supply line 42c is connected to an ammonia inlet of the third preheater 44g. The recovery ammonia line 140 is connected to the third ammonia supply line 42c. The third preheater 44g is a heat exchanger. The third preheater 44g cools the second heating medium while heating the gaseous ammonia NHg by exchanging heat between the gaseous ammonia NHg and the second heating medium. One end of the fourth ammonia supply line 42d is connected to an ammonia outlet of the third preheater 44g, and the other end of the fourth ammonia supply line 42d is connected to an ammonia inlet of the fourth preheater 44h. The fourth preheater 44h is a heat exchanger. The fourth preheater 44h cools the second heating medium while heating the gaseous ammonia NHg by exchanging heat between the gaseous ammonia NHg and the second heating medium. One end of the fifth ammonia supply line 42e is connected to an ammonia outlet of the fourth preheater 44h, and the other end of the fifth ammonia supply line 42e is connected to an ammonia inlet of the fifth preheater 44i. The fifth preheater 44i is a heat exchanger. The fifth preheater 44i cools the second heating medium while heating the gaseous ammonia NHg by exchanging heat between the gaseous ammonia NHg and the second heating medium. One end of the sixth ammonia supply line 42f is connected to an ammonia outlet of the fifth preheater 44i, and the other end of the sixth ammonia supply line 42f is connected to an ammonia inlet of the reactor 45.

As in each of the above-described embodiments, the first heating medium line 51 is connected to a medium inlet of the reactor 45. The first heating medium recovery line 52 is connected to a medium outlet of the reactor 45. The first heating medium booster 53 is provided in the first heating medium recovery line 52. The reactor 45 is a heat exchanger. The reactor 45 cools the first heating medium while further heating the gaseous ammonia NHg by exchanging heat between the gaseous ammonia NHg heated by the fifth preheater 44i and the first heating medium supplied from the first heating medium line 51. The cooled first heating medium flows into the first heating medium recovery line 52. As in the first embodiment, both the first heating medium line 51 and the first heating medium recovery line 52 are connected to the first heating medium heater 27 of the heat recovery steam generator 21b.

One end of the reaction gas line 47 is connected to a reaction gas outlet of the reactor 45, and the other end of the reaction gas line 47 is connected to the residual raw material removal device 130. The first reaction gas cooler 46c and the second reaction gas cooler 46d are provided in the reaction gas line 47.

One end of the low-pressure heated water line 76 is connected to a second heating medium inlet of the second preheater 44f. The other end of the low-pressure heated water line 76 is connected to an outlet of the second low-pressure economizer 23b in the heat recovery steam generator 21b. Therefore, the low-pressure heated water line 76 is a type of the second heating medium line. One end of the first connection heated water line 78e is connected to a second heating medium outlet of the second preheater 44f. The other end of the first connection heated water line 78e is connected to a second heating medium inlet of the first preheater 44e. Therefore, the first connection heated water line 78e is a type of the second heating medium recovery line with respect to the second preheater 44f, and is a type of the second heating medium line with respect to the first preheater 44e. One end of the second heated water recovery line 78b is further connected to a second heating medium outlet of the second preheater 44f. The other end of the second heated water recovery line 78b is connected to an inlet of the second low-pressure economizer 23b. Therefore, the second heated water recovery line 78b is a type of the second heating medium recovery line with respect to the second preheater 44f. One end of the first heated water recovery line 78a is connected to a second heating medium outlet of the first preheater 44e. The other end of the first heated water recovery line 78a is connected to the water supply line 35. Therefore, the first heated water recovery line 78a is a type of the second heating medium recovery line.

One end of the high-pressure heated water line 81 is connected to a second heating medium inlet of the fourth preheater 44h. The other end of the high-pressure heated water line 81 is connected to an outlet of the second high-pressure economizer 25b of the heat recovery steam generator 21b. Therefore, the high-pressure heated water line 81 is a type of the second heating medium line. One end of the second connection heated water line 78f is connected to an outlet of the second heating medium of the fourth preheater 44h. The other end of the second connection heated water line 78f is connected to a second heating medium inlet of the third preheater 44g. Therefore, the second connection heated water line 78f is a type of the second heating medium recovery line with respect to the fourth preheater 44h, and is a type of the second heating medium line with respect to the third preheater 44g. One end of the medium-pressure heated water line 77 is further connected to a second heating medium inlet of the third preheater 44g. The other end of the medium-pressure heated water line 77 is connected to an outlet of the medium-pressure economizer 24a. Therefore, the medium-pressure heated water line 77 is a type of the second heating medium line with respect to 44g of the third preheater. One end of the third heated water recovery line 78c is connected to a second heating medium outlet of the third preheater 44g. The other end of the third heated water recovery line 78c is connected to an inlet of the second low-pressure economizer 23b. Therefore, the third heated water recovery line 78c is a type of the second heating medium recovery line.

One end of the high-pressure steam line 83 is connected to a second heating medium inlet of the fifth preheater 44i. The other end of the high-pressure steam line 83 is connected to an outlet of the second high-pressure superheater 25e. Therefore, the high-pressure steam line 83 is a type of the second heating medium line. One end of the high-pressure steam recovery line 86 is connected to an outlet of the second heating medium of the fifth preheater 44i. The other end of the high-pressure steam recovery line 86 is connected to an inlet of the first high-pressure reheater 26a. Therefore, the high-pressure steam recovery line 86 is a type of the second heating medium recovery line.

The fuel line 12 has a first fuel line 12a and a second fuel line 12b. One end of the first fuel line 12a is connected to a third heating medium inlet of the first reaction gas cooler 46c. The other end of the first fuel line 12a is connected to the residual raw material removal device 130. The treated reaction gas RGp generated by the residual raw material removal device 130 flows through the first fuel line 12a. The first reaction gas cooler 46c is a heat exchanger. The first reaction gas cooler 46c heats the treated reaction gas RGp while cooling the reaction gas RG by exchanging heat between the reaction gas RG flowing in the reaction gas line 47 and the treated reaction gas RGp serving as the fuel flowing in the first fuel line 12a. Therefore, the first reaction gas cooler 46c of the present embodiment functions as a reaction gas cooler for cooling the reaction gas RG, and also functions as a fuel preheater for preheating the treated reaction gas RGp which is the fuel of the gas turbine 11. Therefore, the first reaction gas cooler 46c which also functions as the fuel preheater is a configuration element of the raw material reaction device 41b, and is also a configuration element of the reaction gas utilization equipment 10.

The treated reaction gas RGp is a type of the third heating medium that cools the reaction gas RG in the first reaction gas cooler 46c. Therefore, the first fuel line 12a through which the treated reaction gas RGp flows is a type of the third heating medium line. One end of the second fuel line 12b is connected to a third heating medium outlet of the first reaction gas cooler 46c. The other end of the second fuel line 12b is connected to the combustor 11c.

One end of the branch water supply line 91 is connected to a third heating medium inlet of the second reaction gas cooler 46d. The other end of the branch water supply line 91 is connected to the water supply line 35. Therefore, the water supply is a type of the third heating medium with respect to the second reaction gas cooler 46d. In addition, the branch water supply line 91 is a type of the third heating medium line. The second reaction gas cooler 46d is a heat exchanger. The second reaction gas cooler 46d cools the reaction gas RG by exchanging heat between the reaction gas RG flowing in the reaction gas line 47 and the water supply flowing in the branch water supply line 91. One end of the water supply recovery line 75 is connected to a third heating medium outlet of the second reaction gas cooler 46d. The other end of the water supply recovery line 75 is connected to the water supply line 35. Therefore, the water supply recovery line 75 is a type of the third heating medium recovery line.

In the raw material preheating step of the present embodiment, as in the above-described embodiment, the liquid ammonia NH is boosted by the raw material ammonia pump 43, and thereafter, flows into the preheaters 44e to 44i. The liquid ammonia NH is preheated by exchanging heat with the second heating medium in the preheaters 44e to 44i.

The liquid ammonia NH boosted by the raw material ammonia pump 43 first flows into the first preheater 44e, and is preheated here by exchanging heat with the second heating medium. The second heating medium flowing into the first preheater 44e is the heated water flowing into the first preheater 44e from the second preheater 44f via the first connection heated water line 78e. The heated water cooled by exchanging heat with the liquid ammonia NH in the first preheater 44e flows into the water supply line 35 via the first heated water recovery line 78a.

The liquid ammonia NH preheated by the first preheater 44e flows into the second preheater 44f, and is further preheated here by exchanging heat with the second heating medium to obtain the gaseous ammonia NHg. Therefore, in the present embodiment, the first preheater 44e and the second preheater 44d function as vaporizers for the liquid ammonia NH. In addition, the first preheater 44e functions as a liquid phase preheater for the liquid ammonia NH, and the second preheater 44d functions as a phase change preheater for the liquid ammonia NH. The second heating medium flowing into the second preheater 44f is the low-pressure heated water flowing into the second preheater 44f from the second low-pressure economizer 23b via the low-pressure heated water line 76. A portion of the heated water cooled by exchanging heat with the liquid ammonia NH in the second preheater 44f flows into the first preheater 44e via the first connection heated water line 78e, as described above. The other portion of the heated water flows into the second low-pressure economizer 23b via the second heated water recovery line 78b.

The gaseous ammonia NHg generated in the second preheater 44f flows into the third preheater 44g, and is further preheated here by exchanging heat with the second heating medium. The second heating medium flowing into the third preheater 44g is the heated water flowing into the third preheater 44g from the fourth preheater 44h via the second connection heated water line 78f, and the medium-pressure heated water flowing into the third preheater 44g from the medium-pressure economizer 24a via the medium-pressure heated water line 77. The heated water cooled by exchanging heat with the gaseous ammonia NHg in the third preheater 44g flows into the second low-pressure economizer 23b via the third heated water recovery line 78c.

The gaseous ammonia NHg preheated by the third preheater 44g flows into the fourth preheater 44h, and is further preheated here by exchanging heat with the second heating medium. The second heating medium flowing into the fourth preheater 44h is the high-pressure heated water flowing into the fourth preheater 44h from the second high-pressure economizer 25b via the high-pressure heated water line 81. The heated water cooled by exchanging heat with the gaseous ammonia NHg in the fourth preheater 44h flows into the third preheater 44g via the second connection heated water line 78f, as described above.

The gaseous ammonia NHg preheated by the fourth preheater 44h flows into the fifth preheater 44i, and is further preheated here by exchanging heat with the second heating medium. Therefore, in the present embodiment, the third preheater 44g, the fourth preheater 44h, and the fifth preheater 44i function as gas heaters for the gaseous ammonia NHg. Through the above-described process, the raw material preheating step of the present embodiment is completed. The second heating medium flowing into the fifth preheater 44i is the high-pressure steam flowing into the fifth preheater 44i from the second high-pressure superheater 25e via the high-pressure steam line 83. The steam cooled by exchanging heat with the gaseous ammonia NHg in the fifth preheater 44i flows into the first high-pressure reheater 26a via the high-pressure steam recovery line 86. The first high-pressure reheater 26a superheats the steam by exchanging heat between the steam supplied from the fifth preheater 44i and the exhaust gas EG. The second high-pressure reheater 26b exchanges the heat between the steam supplied from the first high-pressure reheater 26a and the exhaust gas EG, and heats the steam to obtain high-pressure reheated steam. As described above, the high-pressure reheated steam flows into the high-pressure steam turbine 33 via the high-pressure reheat steam line 84. The high-pressure steam turbine 33 is driven by the high-pressure reheated steam. As described above, a portion of the steam exhausted from the high-pressure steam turbine 33 flows into the medium-pressure steam turbine 32 via the high-pressure exhaust steam line 85. The other portion of the steam exhausted from the high-pressure steam turbine 33 flows into the reboiler 139 via the second high-pressure exhaust steam line 85b.

The gaseous ammonia NHg supplied from the fifth preheater 44i flows into the reactor 45, and is decomposed into hydrogen and nitrogen by the thermal decomposition reaction as in the above-described embodiment, thereby generating the reaction gas RG (reaction performing step).

In the reaction gas cooling step, the reaction gas RG is cooled by exchanging heat between the reaction gas RG and the third heating medium. The reaction gas RG supplied from the reactor 45 sequentially flows into the first reaction gas cooler 46c and the second reaction gas cooler 46d, and is sequentially cooled by passing therethrough.

The first reaction gas cooler 46c heats the treated reaction gas RGp while cooling the reaction gas RG by exchanging heat between the reaction gas RG supplied from the reactor 45 and the treated reaction gas RGp supplied from the residual raw material removal device 130 which is the third heating medium. The treated reaction gas RGp heated by the first reaction gas cooler 46c flows into the combustor 11c as the fuel. Therefore, the first reaction gas cooler 46c also functions as the fuel preheater as described above.

The reaction gas RG cooled by the first reaction gas cooler 46c flows into the second reaction gas cooler 46d. The second reaction gas cooler 46d heats the water supply while cooling the reaction gas RG by exchanging heat between the reaction gas RG and the water supply from the branch water supply line 91. The water supply heated by the second reaction gas cooler 46d flows into the water supply line 35 via the water supply recovery line 75.

Through the above-described process, the reaction gas cooling step is completed. The reaction gas RG cooled by the second reaction gas cooler 46d flows into the residual raw material removal device 130, and the residual ammonia contained in the reaction gas RG is removed, as in the above-described embodiment.

As described above, the second heating medium that preheats the ammonia NH by exchanging heat with the ammonia NH may be the water or the steam serving as the heat cycle medium flowing inside the exhaust heat utilization heat cycle.

In addition, the third heating medium that cools the reaction gas RG by exchanging heat with the reaction gas RG may be the water serving as the heat cycle medium flowing inside the exhaust heat utilization heat cycle. In addition, the third heating medium may be the treated reaction gas RGp serving as the fuel.

In the present embodiment, the first heating medium supplied from the first heating medium heater 27 is utilized in the reactor 45, and the second heating medium (high-pressure steam) supplied from the second high-pressure superheater 25e is utilized in the fifth preheater 44i. The second heating medium (high-pressure heated water) supplied from the second high-pressure economizer 25b is utilized in the fourth preheater 44h, and the second heating medium (medium-pressure heated water) supplied from the medium-pressure economizer 24a is utilized in the third preheater 44g. The second heating medium (low-pressure heated water) supplied from the second low-pressure economizer 23b is utilized in the second preheater 44f.

Here, a relationship between a high temperature and a low temperature which are required for each heating medium is as follows.

Required temperature of first heating medium used in reactor 45
> Required temperature of second heating medium used in fifth preheater 44i
> Required temperature of second heating medium used in fourth preheater 44h
> Required temperature of second heating medium used in third preheater 44g
> Required temperature of second heating medium used in second preheater 44f As described above, in the present embodiment, in order to convert the raw material ammonia NH into the reaction gas RG, the raw material ammonia NH is heated by a plurality of heat exchangers. Moreover, a heating medium having a temperature required and sufficient for heating the ammonia NH is supplied to each of the plurality of heat exchangers. Therefore, in the present embodiment, the raw material ammonia NH can be used as the reaction gas RG by effectively utilizing the heat. Therefore, in the present embodiment, the raw material ammonia NH can be used as the reaction gas RG by effectively using the heat having a low temperature as much as possible.

In addition, in the present embodiment, even when a large amount of the relatively high-temperature heat is consumed in reacting the raw material fluid, that is, the ammonia NH, the treated reaction gas RGp which is the fuel to be input to the gas turbine 11 and is a type of the third heating medium can be heated to the high temperature by using the high-temperature exhaust heat of the first reaction gas cooler 46c. Therefore, in the present embodiment, the required fuel flow rate of the gas turbine 11 can be reduced, and the efficiency of the plant can be improved. In addition, in the present embodiment, according to the above-described configuration, when the liquid ammonia NH is converted into the reaction gas RG, the heat utilization efficiency of the exhaust gas EG is improved as a result, and the efficiency of the plant can also be improved from this viewpoint.

The heating of the raw material fluid in the present embodiment will be described with reference to FIG. 7. FIG. 7 is a T-Q diagram relating to ammonia (solid line) and a heat source (broken line) for heating the ammonia, as in FIG. 4. In addition, in FIG. 7, the horizontal axis represents the calorific value, and the vertical axis represents the temperature.

In the first preheater (liquid phase preheater) 44e, as described above, the liquid ammonia NH and the second heating medium for liquid phase preheating exchange the heat with each other, and the liquid ammonia NH is heated while a state of the liquid is maintained. In the second preheater (phase change preheater) 44f, as described above, the liquid ammonia NH supplied from the first preheater (liquid phase preheater) 44e and the second heating medium for phase change preheating exchange the heat with each other, and the liquid Ammonia NH is heated and vaporized to obtain the gaseous ammonia NHg. The gaseous ammonia NHg is sequentially heated by each of the third preheater (gas heater) 44g, the fourth preheater (gas heater) 44h, and the fifth preheater (gas heater) 44i. In FIG. 7, a temperature change with respect to a change in the calorific value during a process of heating (preheating) the gaseous ammonia NHg is simplified, and is illustrated in a straight line.

In the second preheater (phase change preheater) 44f, the low-pressure heated water flowing into the second preheater 44f from the second low-pressure economizer 23b via the low-pressure heated water line 76 is supplied as the second heating medium for phase change preheating. In addition, a portion of the second heating medium for phase change preheating which flows out from the second preheater (phase change preheater) 44f is supplied to the first preheater (liquid phase preheater) 44e, as the second heating medium for liquid phase preheating. Therefore, a flow rate of the second heating medium for phase change preheating and a flow rate of the second heating medium for liquid phase preheating are different from each other. In addition, a temperature of the second heating medium for phase change preheating in the inlet of the second preheater (phase change preheater) 44f and a temperature of the second heating medium for liquid phase preheating in the inlet of the first preheater (liquid phase preheater) 44e are different from each other. Therefore, both the second heating medium for phase change preheating and the second heating medium for liquid phase preheating are the water, but both of these are different second heating media.

Here, the flow rate of the second heating medium for phase change preheating is higher than the flow rate of the second heating medium for liquid phase preheating. In addition, constant pressure specific heat of the second heating medium for phase change preheating and constant pressure specific heat of the second heating medium for liquid phase preheating are equivalent to each other. Therefore, a product of the constant pressure specific heat and the flow rate of the second heating medium for phase change preheating is larger than a product of the constant pressure specific heat and the flow rate of the second heating medium for liquid phase preheating. Inclination of the T-Q line with respect to a medium that does not have a phase change or a chemical reaction is inversely proportional to the product of the constant pressure specific heat and the flow rate, that is, the heat capacity per unit time. Therefore, in FIG. 7, the inclination of the T-Q line of the second heating medium for phase change preheating is smaller than the inclination of the T-Q line of the second heating medium for liquid phase preheating. When the ammonia is vaporized, the ammonia is evaporated at a constant temperature while the heat is received. Accordingly, the T-Q line of the ammonia is parallel to the horizontal axis, and the second heating medium for phase change preheating and the ammonia exchange the heat with each other while maintaining a small temperature difference close to the constant temperature. On the other hand, in the first preheater (liquid phase preheater) 44e, the liquid ammonia is preheated while a state of the liquid is maintained. Accordingly, the T-Q line of the ammonia has the inclination. In addition, as described above, the second heating medium for liquid phase preheating has a small product of the constant pressure specific heat and the flow rate, that is, the small heat capacity per unit time. Accordingly, the T-Q line of the second heating medium for liquid phase preheating has the large inclination.

When the flow rate of the water returning to the second low-pressure economizer 23b via the second heated water recovery line 78b is added or subtracted, the flow rate of the second heating medium for liquid phase preheating can be adjusted. Therefore, the heat capacity per unit time of the second heating medium for liquid phase preheating, that is, the product of the constant pressure specific heat and the flow rate is made equal to the heat capacity of the liquid ammonia per unit time, that is, the product of the constant pressure specific heat and the flow rate. In this manner, the inclinations of the T-Q lines of the liquid ammonia and the second heating medium for liquid phase preheating can be equal to each other. Therefore, in the present embodiment, the flow rate of the second heating medium for liquid phase preheating is adjusted so that the inclination of the T-Q line of the second heating medium for liquid phase preheating is equal to that of the liquid ammonia. In this manner, the heat is exchanged between the two while the constant temperature difference is maintained between the liquid ammonia and the second heating medium for liquid phase preheating. As a result, in the present embodiment, the liquid ammonia can be preheated by the second heating medium for liquid phase preheating at a minimum flow rate, and the heat can be effectively utilized.

In addition, in the present embodiment, as described above, the product of the constant pressure specific heat and the flow rate of the second heating medium for phase change preheating is larger than the product of the constant pressure specific heat and the flow rate of the second heating medium for liquid phase preheating. Therefore, in the present embodiment, a great calorific value is supplied to the liquid ammonia for vaporizing the liquid ammonia requiring the great calorific value, and a small calorific value is supplied in preheating the gaseous ammonia in which the small calorific value is sufficient and which does not have a phase change.

According to the above-describe configuration, in the present embodiment, the T-Q line of the second heating medium can be aligned with the T-Q line of the ammonia (raw material fluid). Therefore, in the present embodiment, the temperature difference between the second heating medium and the ammonia (raw material fluid) is reduced, and the required calorific value is supplied for each temperature level without any excess or insufficiency. Accordingly, the heat utilization efficiency can be improved, and the efficiency of the plant can be improved.

The second heating medium for phase change preheating and the second heating medium for liquid phase preheating need to be different media. However, both of these do not need to be different substances, and the products of the constant pressure specific heat and the flow rate, that is, the heat capacities and the temperatures may be different from each other.

In addition, the heating medium in a gas phase may be supplied to the second preheater (phase change preheater) $44f$ as the second heating medium for phase change preheating, and the second heating medium for phase change preheating may be condensed by the second preheater (phase change preheater) $44f$. The second heating medium for phase change preheating in the gas phase is condensed by the second preheater (phase change preheater) $44f$. When the liquid ammonia (raw material fluid) is vaporized by using the heat of condensation at that time, as illustrated in FIG. 8, both the temperatures of the second heating medium for phase change preheating and the raw material fluid can be maintained in a constant state. Accordingly, in a state where a temperature difference $\Delta T2$ between the two is reduced, both of these can exchange the heat with each other. In this way, the second heating medium for phase change preheating in the gas phase is supplied to the second preheater (phase change preheater) $44f$, and the second heating medium for phase change preheating is condensed here. In this manner, the heat utilization efficiency can be improved, and the efficiency of the plant can be improved. As will be described later in a sixth embodiment, the second heating medium for the second vaporization in the gas phase is the steam evaporated by the low-pressure evaporator $23d$ or the steam extracted from an intermediate stage of the low-pressure steam turbine 31.

Fourth Embodiment

A fourth embodiment of the raw material fluid treatment plant will be described with reference to FIGS. 9 and 10.

The raw material fluid treatment plant of the present embodiment is a modification example of the raw material fluid treatment plant of the third embodiment. The raw material fluid treatment plant of the present embodiment promotes the thermal decomposition reaction of the ammonia NH, compared to the raw material fluid treatment plant of the third embodiment. Therefore, a reaction performing step in a series of operations in the raw material fluid treatment plant of the present embodiment is different from the reaction performing step of the third embodiment.

Figure 9:
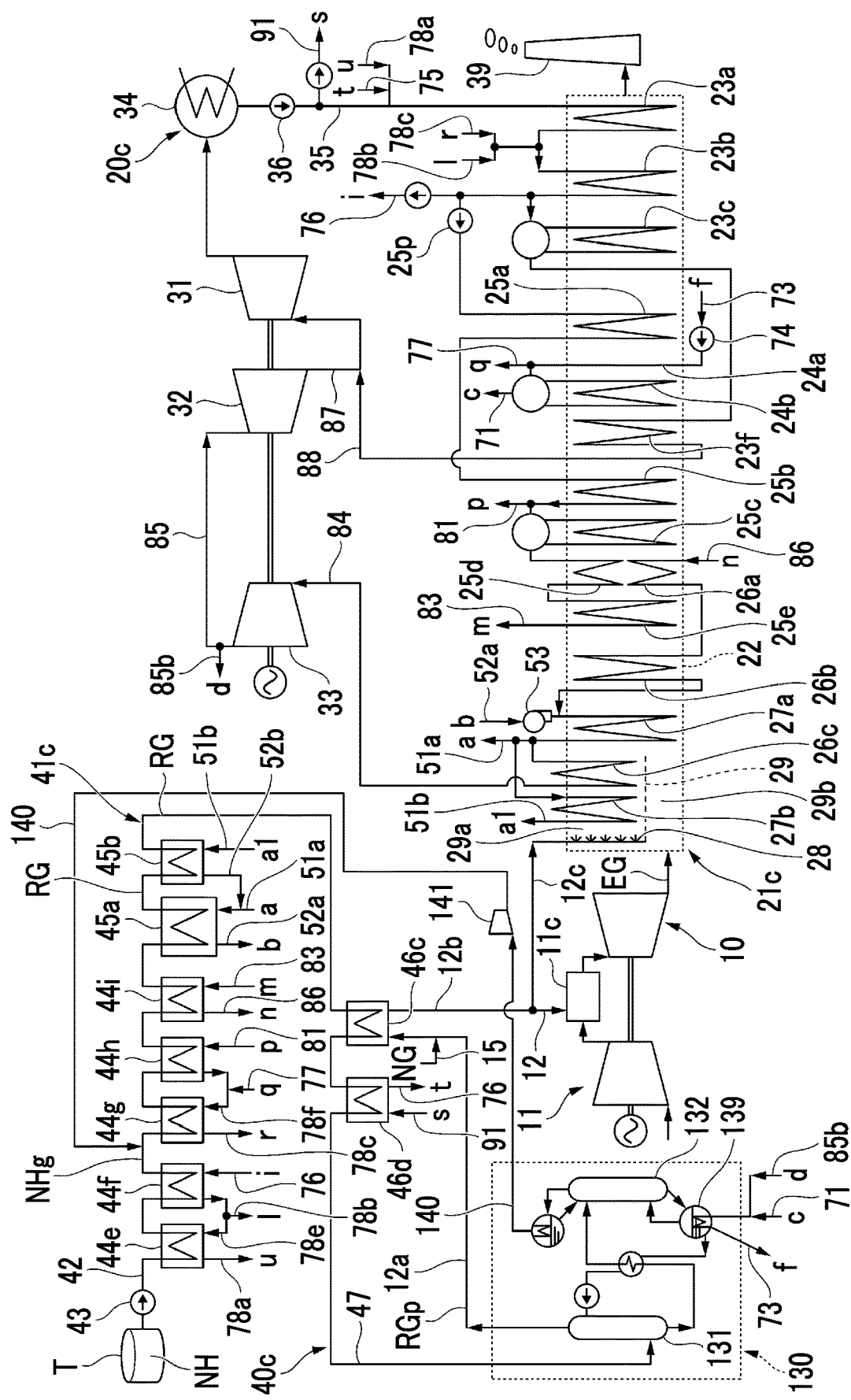
FIG. 9 is a system diagram of a raw material fluid treatment plant according to a fourth embodiment of the present invention.
Figure 10:
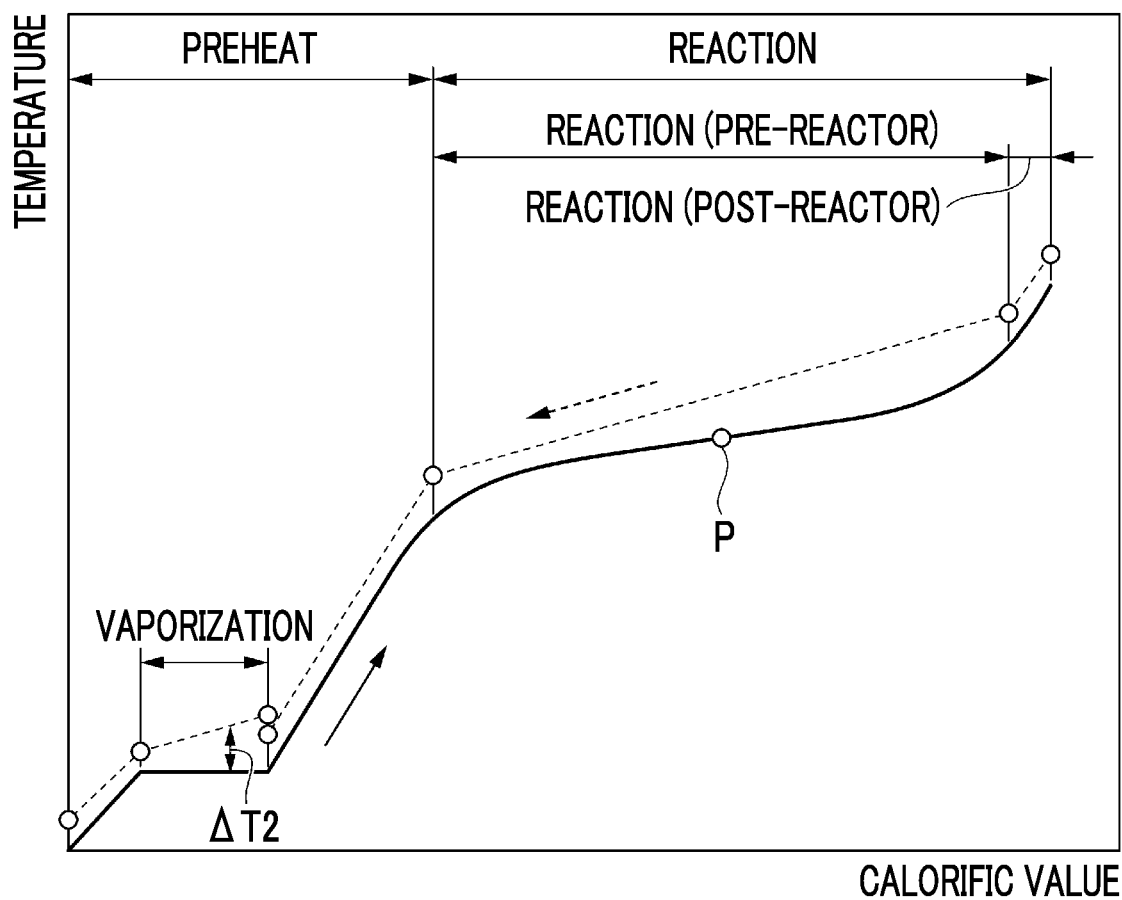
FIG. 10 is a T-Q diagram of ammonia and a heat source in the fourth embodiment.

As in the above-described embodiment, the raw material fluid treatment plant of the present embodiment includes a raw material reaction apparatus $40c$, the reaction gas utilization equipment 10, and an exhaust heat utilization equipment $20c$, as illustrated in FIG. 9.

As in the heat recovery steam generator $21b$ of the third embodiment, a heat recovery steam generator $21c$ of the exhaust heat utilization equipment $20c$ has the gas frame 22, the first low-pressure economizer $23a$, the second low-pressure economizer $23b$, the low-pressure evaporator $23c$, the low-pressure superheater $23f$, the medium-pressure economizer $24a$, the medium-pressure evaporator $24b$, the first high-pressure economizer $25a$, the second high-pressure economizer $25b$, the high-pressure evaporator $25c$, the first high-pressure superheater $25d$, the second high-pressure superheater $25e$, the first high-pressure reheater $26a$, the second high-pressure reheater $26b$, the high-pressure pump $25p$, and the first heating medium heaters $27a$ and $27b$. The heat recovery steam generator $21c$ of the present embodiment further has a third high-pressure reheater $26c$ and a burner 28. The first heating medium heaters $27a$ and $27b$ of the present embodiment have a first low-temperature heating medium heater $27a$ and a first high-temperature heating medium heater $27b$.

The burner 28, the first high-temperature heating medium heater $27b$, the third high-pressure reheater $26c$, and the first low-temperature heating medium heater $27a$ are disposed on the upstream side from the second high-pressure reheater $26b$ inside the gas frame 22. The heat recovery steam generator $21c$ has a partition member 29 that partitions the upstream side of the flow of the exhaust gas EG from the first high-temperature heating medium heater $27b$ inside the gas frame 22 into a first exhaust gas flow path $29a$ through which a portion of the exhaust gas EG flows and a second exhaust gas flow path $29b$ through which the remaining portion of the exhaust gas EG flows. The burner 28, the first high-temperature heating medium heater $27b$, and the third high-pressure reheater $26c$ are disposed in the above-described order from the upstream side toward the downstream side inside the first exhaust gas flow path $29a$. A branch fuel line $12c$ branched from the fuel line 12 is connected to the burner 28. The burner 28 injects the treated reaction gas RGp serving as the fuel supplied from the branch fuel line $12c$ into the exhaust gas EG flowing inside the first exhaust gas flow path $29a$. The fuel injected into the gas frame 22 is combusted. As a result, the combustion gas is generated, and the high-temperature gas flows inside the first exhaust gas flow path $29a$. The combustion gas flowing in the first exhaust gas flow path $29a$ and the exhaust gas EG flowing in the second exhaust gas flow path $29b$ merge with each other on the downstream side from the partition member 29 inside the gas frame 22. The first low-temperature heating medium heater $27a$ and the second high-pressure reheater $26b$ are disposed in the above-described order on the downstream side from the partition member 29 inside the gas frame 22.

The reactors $45a$ and $45b$ of the raw material reaction device $41c$ in the raw material reaction apparatus $40c$ have a pre-reactor $45a$ and a post-reactor $45b$.

One end of the first low-temperature heating medium line $51a$ is connected to an inlet of the first heating medium of the pre-reactor $45a$. The other end of the first low-temperature heating medium line $51a$ is connected to an outlet of the first low-temperature heating medium heater $27a$. One end of the first low-temperature heating medium recovery line 52a is connected to an outlet of the first heating medium of the pre-reactor 45a. The other end of the first low-temperature heating medium recovery line 52a is connected to an inlet of the first low-temperature heating medium heater 27a. The outlet of the second high-pressure reheater 26b is further connected to the inlet of the first low-temperature heating medium heater 27a. A first heating medium booster 53 is provided in the first low-temperature heating medium recovery line 52a.

The inlet of the third high-pressure reheater 26c is further connected to the outlet of the first low-temperature heating medium heater 27a. One end of the high-pressure reheat steam line 84 is connected to the outlet of the third high-pressure reheater 26c. The other end of the high-pressure reheat steam line 84 is connected to the inlet of the high-pressure steam turbine 33.

The inlet of the first high-temperature heating medium heater 27b is further connected to the outlet of the first low-temperature heating medium heater 27a. One end of the first high-temperature heating medium line 51b is connected to the outlet of the first high-temperature heating medium heater 27b. The other end of the first high-temperature heating medium line 51b is connected to the inlet of the first heating medium of the post-reactor 45b. One end of the first high-temperature heating medium recovery line 52b is connected to the outlet of the first heating medium of the post-reactor 45b. The other end of the first high-temperature heating medium recovery line 52b is connected to the inlet of the first heating medium of the pre-reactor 45a.

The steam superheated by the second high-pressure reheater 26b and the steam supplied from the first low-temperature heating medium recovery line 52a flow into the first low-temperature heating medium heater 27a. The first low-temperature heating medium heater 27a superheats the steam by exchanging heat between the steam and the exhaust gas EG.

A portion of the steam superheated by the first low-temperature heating medium heater 27a flows into the pre-reactor 45a via the first low-temperature heating medium line 51a, as the first low-temperature heating medium. The other portion of the steam superheated by the first low-temperature heating medium heater 27a flows into the third high-pressure reheater 26c. The high-temperature combustion gas comes into contact with the third high-pressure reheater 26c. The fuel supplied from the burner 28 is injected into the exhaust gas EG supplied from the gas turbine 11, and the fuel is combusted to generate the high-temperature combustion gas. The high-temperature combustion gas comes into contact with the third high-pressure reheater 26c. The third high-pressure reheater 26c superheats the steam by exchanging heat between the high-temperature combustion gas and the steam. The steam flows into the high-pressure steam turbine 33 via the high-pressure reheat steam line 84, and drives the high-pressure steam turbine 33. Therefore, the temperature of the steam flowing into the high-pressure steam turbine 33 of the present embodiment is higher than the temperature of the steam flowing into the high-pressure steam turbine 33 of the third embodiment. Therefore, in the present embodiment, an output of the high-pressure steam turbine 33 can be increased.

The remaining steam superheated by the first low-temperature heating medium heater 27a flows into the first high-temperature heating medium heater 27b. The first high-temperature heating medium heater 27b superheats the steam by exchanging heat between the above-described high-temperature mixed gas and the steam. The steam flows into the post-reactor 45b via the first high-temperature heating medium line 51b, as the first high-temperature heating medium. The temperature of the first high-temperature heating medium is higher than the temperature of the first low-temperature heating medium.

In the reaction performing step of the present embodiment, as in the above-described embodiment, the gaseous ammonia NH and the first heating medium exchange the heat with each other so that the gaseous ammonia NH is heated and subjected to the thermal decomposition reaction. In this manner, the reaction gas RG is generated.

The gaseous ammonia NHg preheated by the fifth preheater 44i flows into the pre-reactor 45a. The steam flows into the pre-reactor 45a from the post-reactor 45b via the first high-temperature heating medium recovery line 52b, as the first low-temperature heating medium. In addition, the steam flows into the pre-reactor 45a from the first low-temperature heating medium heater 27a via the first low-temperature heating medium line 51a, as the first low-temperature heating medium. The pre-reactor 45a cools the first low-temperature heating medium while heating the gaseous ammonia NHg by exchanging heat between the gaseous ammonia NHg and the first low-temperature heating medium. The steam which is the cooled first low-temperature heating medium flows into the first low-temperature heating medium heater 27a via the first low-temperature heating medium recovery line 52a. In addition, a portion of the heated gaseous ammonia NHg is subjected to the thermal decomposition reaction, and is converted into the reaction gas RG containing hydrogen, oxygen, and ammonia.

The reaction gas RG generated in the pre-reactor 45a flows into the post-reactor 45b. The steam superheated by the first high-temperature heating medium heater 27b flows into the post-reactor 45b, as the first high-temperature heating medium. The post-reactor 45b cools the first high-temperature heating medium while heating the reaction gas RG by exchanging heat between the reaction gas RG supplied from the pre-reactor 45a and the first high-temperature heating medium. The steam which is the cooled first high-temperature heating medium flows into the pre-reactor 45a via the first high-temperature heating medium line 51b, as the first low-temperature heating medium. A portion of the gaseous ammonia NHg contained in the heated reaction gas RG is subjected to the thermal decomposition reaction, and is converted into the reaction gas RG containing hydrogen, oxygen, and the ammonia NH.

The heating of the raw material fluid in the present embodiment will be described with reference to FIG. 10. As in FIG. 4, FIG. 10 is a T-Q diagram relating to the ammonia (solid line) and the heat source for heating ammonia (broken line). In addition, in FIG. 10, the horizontal axis represents the calorific value, and the vertical axis represents the temperature.

The thermal decomposition reaction of the ammonia is promoted as the temperature of the reaction environment is higher. In addition, as illustrated in FIG. 10, when the concentration of the ammonia is lowered during the thermal decomposition reaction, the temperature rising amount with respect to the increasing amount of the calorific value gradually increases. In the present embodiment, as described above, the gaseous ammonia NHg is first caused to flow into the pre-reactor 45a to exchange the heat with the first low-temperature heating medium, thereby obtaining the reaction gas RG containing hydrogen, oxygen, and ammonia. In the present embodiment, the reaction gas RG is further caused to flow into the post-reactor 45b to exchange the heat with the first high-temperature heating medium having the temperature higher than that of the first low-temperature heating medium, and the ammonia contained in the reaction gas RG is subjected to the thermal decomposition reaction. Therefore, in the present embodiment, the concentration of the residual ammonia contained in the reaction gas RG flowing out from the post-reactor 45b can be lowered than the concentration of the residual ammonia contained in the reaction gas RG flowing out from the reactor 45 in the above-described embodiment.

In the first, second, and third embodiments, only the exhaust gas EG of the gas turbine 11 is used as the heat source to generate the first heating medium used for the thermal decomposition reaction of the ammonia (raw material fluid). Therefore, in the first, second, and third embodiments, the raw material fluid cannot be reacted at the temperature exceeding the temperature of the exhaust gas EG in the outlet of the gas turbine 11 by obtaining the first heating medium having the temperature exceeding than the temperature of the exhaust gas EG in the outlet of the gas turbine 11. On the other hand, in the present embodiment, the fuel is injected into the exhaust gas EG, and is additionally combusted. Accordingly, the raw material fluid can be reacted at the temperature exceeding the temperature of the exhaust gas EG in the outlet of the gas turbine 11 which is the reaction gas utilization equipment (exhaust gas generation equipment) by obtaining the first heating medium having the temperature exceeding the temperature of the exhaust gas EG in the outlet of the gas turbine 11 which is the reaction gas utilization equipment (exhaust gas generation equipment). In addition, in the present embodiment, the exhaust gas EG of the gas turbine 11 is diverted. The fuel is additionally injected into only a portion of the exhaust gas EG, and is combusted. Therefore, the temperature of the exhaust gas can be raised with a small amount of the additionally injected fuel. Therefore, the efficiency of the plant can be improved.

In addition, in the present embodiment, the first high-temperature heating medium after being used in the post-reactor 45b, to which the steam supplied from the first low-temperature heating medium heater 27a is added, is supplied to the pre-reactor 45a, as the first low-temperature heating medium. Therefore, in the present embodiment, the flow rate of the first low-temperature heating medium which is the heat source of the pre-reactor 45a is higher than that of the first high-temperature heating medium. The first low-temperature heating medium and the first high-temperature heating medium have the same pressure and the same constant pressure specific heat. Accordingly, the product of the constant pressure specific heat and the flow rate of the first low-temperature heating medium, that is, the heat capacity per unit time is larger than the product of the constant pressure specific heat and the flow rate of the first high-temperature heating medium. In the medium which is not involved in a phase change or a chemical reaction, the inclination of the T-Q line is inversely proportional to the product of the constant pressure specific heat and the flow rate, that is, the heat capacity per unit time. Therefore, as illustrated in FIG. 10, the inclination of the T-Q line of the first low-temperature heating medium in the pre-reactor 45a is smaller than the inclination of the T-Q line of the first high-temperature heating medium in the post-reactor 45b.

A temperature level of the pre-reactor 45a is close to the temperature at which the reaction of the ammonia (raw material fluid) proceeds most actively, and the reaction requires a great calorific value. Therefore, the inclination of the T-Q line of the ammonia inside the pre-reactor 45a is small. On the other hand, inside the post-reactor 45b, the amount of the residual ammonia is reduced, the reaction amount is reduced, and the calorific value required for the reaction is also reduced. Accordingly, the temperature rises with a small calorific value. Therefore, the inclination of the T-Q line of the ammonia inside the post-reactor 45b is large.

When the flow rate of the steam to be supplied from the first low-temperature heating medium heater 27a to the pre-reactor 45a via the first low-temperature heating medium line 51a is added or subtracted without passing through the post-reactor 45b, the heat capacities of the first low-temperature heating medium and the first high-temperature heating medium can be adjusted independently of each other. Therefore, since the heat capacity of the first low-temperature heating medium is adjusted, the inclination of the T-Q line of the first low-temperature heating medium can be brought close to the inclination of the T-Q line of the ammonia and the reaction gas inside the pre-reactor 45a. In addition, since the heat capacity of the first high-temperature heating medium is adjusted, the inclination of the T-Q line of the first high-temperature heating medium can be brought close to the inclination of the T-Q line of the ammonia and the reaction gas inside the post-reactor 45b.

In the present embodiment, as described above, the product of the constant pressure specific heat and the flow rate of the first low-temperature heating medium is larger than the product of the constant pressure specific heat and the flow rate of the first high-temperature heating medium. Therefore, in the present embodiment, the great calorific value can be supplied to the pre-reactor 45a in which the reaction proceeds actively to require the great calorific value, and the small calorific value can be supplied to the post-reactor 45b which requires the small calorific value.

According to the above-describe configuration, in the present embodiment, the T-Q line of each of the first low-temperature heating medium and the first high-temperature heating medium can be aligned with the T-Q line of the ammonia and the reaction gas in each of the pre-reactor 45a and the post-reactor 45b. Therefore, in the present embodiment, the temperature difference among the first heating medium, the ammonia (raw material fluid), and the reaction gas is reduced, the required calorific value is supplied for each temperature level without any excess or insufficiency. Accordingly, the heat utilization efficiency can be improved, and the efficiency of the plant can be improved.

The first low-temperature heating medium and the first high-temperature heating medium need to be different media. However, both of these do not need to be different substances, and the products of the constant pressure specific heat and the flow rate, that is, the heat capacities and the temperatures may be different from each other.

In addition, in the present embodiment, as described above, the concentration of the residual ammonia contained in the reaction gas RG can be lowered. Accordingly, energy consumption in the residual raw material removal device 130 can be suppressed.

In the present embodiment, the temperature of the reaction gas is further raised in the post-reactor 45b by using the first high-temperature heating medium having the high temperature. Accordingly, the temperature of the reaction gas RG in the inlet of the first reaction gas cooler 46c is higher than that in the third embodiment. Therefore, in the first reaction gas cooler 46c, the treated reaction gas RGp serving as the fuel can be preheated to the temperature higher than that in the third embodiment, and can be injected into the combustor 11c of the gas turbine 11. Therefore, in the present embodiment, the fuel consumption of the gas turbine 11 can be reduced, and the efficiency of the plant can be further improved. The gas turbine 11 is a type of the heat cycle, and the treated reaction gas RGp is a type of the third heating medium utilized for the heat cycle. Therefore, the high-temperature third heating medium can be used for the heat cycle, and as described above, the efficiency of the plant is improved. In the present embodiment, the reaction in the post-reactor 45b can be realized by using the temperature higher than the temperature of the exhaust gas EG in the outlet of the gas turbine 11 which is a type of the reaction gas utilization equipment (exhaust gas generation equipment). Therefore, the temperature of the third heating medium can be raised to the temperature higher than the temperature of the exhaust gas EG in the outlet of the gas turbine 11 which is a type of the reaction gas utilization equipment (exhaust gas generation equipment). Therefore, in the present embodiment, the efficiency of the plant can be further improved by adopting this configuration.

In the present embodiment, the reactor has the pre-reactor 45a and the post-reactor 45b, and the first heating medium heater has the first low-temperature heating medium heater 27a and the first high-temperature heating medium heater 27b. However, as in the above-described embodiment, there may be one reactor and one first heating medium heater.

In the present embodiment, the gas frame 22 is internally divided into two exhaust gas flow paths 29a and 29b. However, the gas frame 22 may not be divided into the two exhaust gas flow paths. In this case, one first heating medium heater heats the first heating medium by exchanging heat between the combustion gas formed by combusting the fuel injected from the burner 28 into the exhaust gas EG supplied from the gas turbine 11 and the first heating medium. The first heating medium heated by one first heating medium heater flows into one reactor 45, heats the gaseous ammonia NHg, and performs the thermal decomposition reaction on the gaseous ammonia NHg.

In addition, the natural gas line 15 through which the natural gas NG flows may be connected to the fuel line 12 through which the treated reaction gas RGp flows. For example, in the fuel line 12, the natural gas line 15 is connected to the upstream side of the fuel preheater (first reaction gas cooler 46c). As described above, the natural gas line 15 is connected to the fuel line 12. In this manner, for example, when the gas turbine exhaust gas at the temperature required for generating the reaction gas cannot be obtained when actuated or during a low load, the operation can be performed by using only the natural gas NG. In another embodiment, the natural gas line 15 through which the natural gas NG flows may also be connected to the fuel line 12. In addition, although not illustrated, the natural gas may be supplied to the burner 28, instead of the treated reaction gas RG. In this way, the temperature of the combustion gas in the outlet of the burner 28 is easily controlled. In another embodiment, when the burner is additionally installed, the treated reaction gas RG may be supplied to the burner, or the natural gas may be supplied to the burner. In addition, only the fuel such as the natural gas other than the reaction gas RG and the treated reaction gas RGp can be supplied to the fuel line 12. In this case, the gas turbine 11 is the exhaust gas generation equipment, but is not the reaction gas utilization equipment.

Fifth Embodiment

Figure 11:
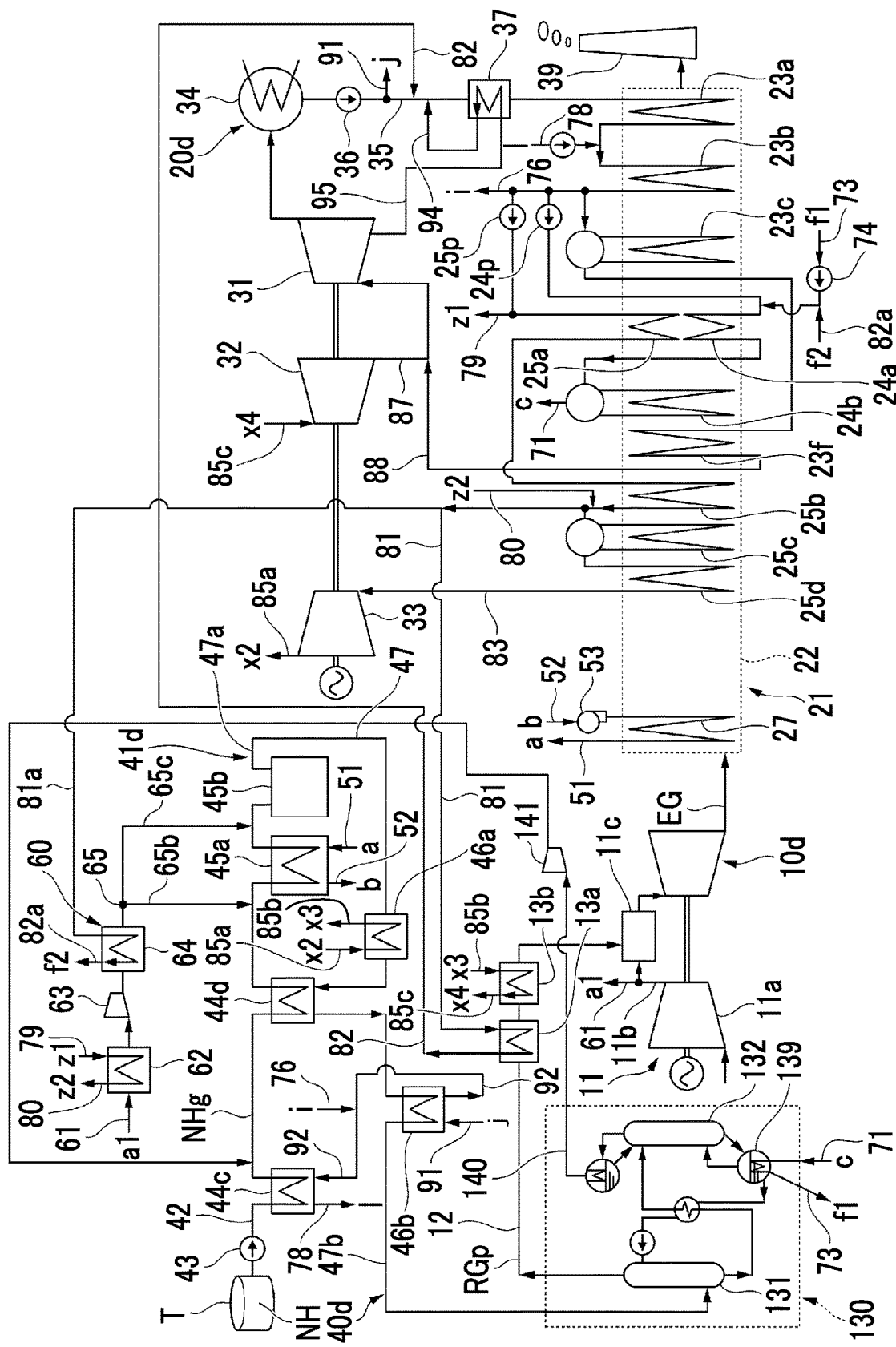
FIG. 11 is a system diagram of a raw material fluid treatment plant according to a fifth embodiment of the present invention.

A fifth embodiment of the raw material fluid treatment plant will be described with reference to FIG. 11.

The raw material fluid treatment plant of the present embodiment is a modification example of the raw material fluid treatment plant of the second embodiment. In the raw material fluid treatment plant of the present embodiment, a portion of the ammonia is subjected to a self-thermal decomposition reaction.

As in the above-described embodiment, the raw material fluid treatment plant of the present embodiment includes a raw material reaction apparatus 40d, a reaction gas utilization equipment 10d, and an exhaust heat utilization equipment 20d.

As in the raw material reaction apparatus of the above-described embodiment, the raw material reaction apparatus 40d of the present embodiment has a raw material reaction device 41d and the residual raw material removal device 130. The raw material reaction device 41d of the present embodiment is different from the raw material reaction device 41a of the second embodiment. On the other hand, the residual raw material removal device 130 of the present embodiment is the same as the residual raw material removal device 130 of the above-described embodiment.

The reaction gas utilization equipment 10d of the present embodiment is basically the same as the reaction gas utilization equipment 10 of the above-described embodiment. However, the fuel preheater in the reaction gas utilization equipment 10d has a first fuel preheater 13a and a second fuel preheater 13b. In addition, the exhaust heat utilization equipment 20d of the present embodiment is different from the exhaust heat utilization equipment of the above-described embodiment.

As in the above-described embodiment, the exhaust heat utilization equipment 20d of the present embodiment has the heat recovery steam generator 21, the low-pressure steam turbine 31, the medium-pressure steam turbine 32, the high-pressure steam turbine 33, the condenser 34, the water supply line 35, the water supply pump 36, and the chimney 39. The exhaust heat utilization equipment 20d of the present embodiment further has a water supply preheater 37 for preheating the water supply. The water supply preheater 37 is provided in the water supply line 35. One end of the extraction steam line 95 is connected to a medium inlet of the water supply preheater 37. The other end of the extraction steam line 95 is connected to a casing of the low-pressure steam turbine 31. One end of the extraction steam recovery line 94 is connected to a medium outlet of the water supply preheater 37. The other end of the extraction steam recovery line 94 is connected to a position on the condenser 34 side from the water supply preheater 37 in the water supply line 35. The heat recovery steam generator 21 is the same as the heat recovery steam generator 21 of the second embodiment. One end of the high-pressure steam line 83 is connected to an outlet of the high-pressure superheater 25d of the heat recovery steam generator 21 in the present embodiment. The other end of the high-pressure steam line 83 is connected to an inlet of the high-pressure steam turbine 33. Therefore, in the present embodiment, as in the first embodiment, the high-pressure steam supplied from the high-pressure superheater 25d flows into the high-pressure steam turbine 33 via the high-pressure steam line 83.

As in the raw material reaction device 41a of the second embodiment, the raw material reaction device 41d of the present embodiment has the ammonia supply line 42, the raw material ammonia pump 43, the first preheater 44c, the second preheater 44d, the reactors 45a and 45b, the first reaction gas cooler 46a, the second reaction gas cooler 46b, and the reaction gas line 47. However, the reactors 45a and 45b of the present embodiment have the pre-reactor 45a and the post-reactor 45b. The raw material reaction device 41d of the present embodiment further has an oxidizer injecting device 60 that injects an oxidizer into the ammonia NH which is the raw material fluid NH.

The oxidizer in the present embodiment is the air. The oxidizer injecting device 60 has an oxidizer receiving line 61 through which the oxidizer in a gas phase flows, an oxidizer cooler 62 that cools the oxidizer supplied from the oxidizer receiving line 61, an oxidizer compressor 63 that compresses the oxidizer cooled by the oxidizer cooler 62, an oxidizer heater 64 that heats the oxidizer compressed by the oxidizer compressor 63, and an oxidizer injecting line 65 that guides the oxidizer heated by the oxidizer heater 64 to the reactor 45.

The gas turbine 11 has a combustion air passage 11*b* that connects a discharge port of the air compressor 11*a* and a compressed air inlet of the combustor 11*c* to each other. The combustion air supplied from the air compressor 11*a* flows through the combustion air passage 11*b*. One end of the oxidizer receiving line 61 is connected to the combustion air passage 11*b*. The other end of the oxidizer receiving line 61 is connected to an inlet of the oxidizer compressor 63. The oxidizer cooler 62 is provided in the oxidizer receiving line 61. The oxidizer cooler 62 is a heat exchanger. One end of the high-pressure water supply line 79 is connected to a medium inlet of the oxidizer cooler 62. The other end of the high-pressure water supply line 79 is connected to a discharge port of the high-pressure pump 25*p* in the heat recovery steam generator 21. One end of the high-pressure water supply recovery line 80 is connected to a medium outlet of the oxidizer cooler 62. The other end of the high-pressure water supply recovery line 80 is connected to an inlet of the high-pressure evaporator 25*c* in the heat recovery steam generator 21. The oxidizer compressor 63 boosts the oxidizer cooled by the oxidizer cooler 62 to a pressure at which the oxidizer can be injected into the reactors 45*a* and 45*b*. The oxidizer heater 64 is a heat exchanger. One end of the second high-pressure heated water line 81*a* is connected to a medium inlet of the oxidizer heater 64. The other end of the second high-pressure heated water line 81*a* is connected to an outlet of the second high-pressure economizer 25*b* in the heat recovery steam generator 21. One end of the second high-pressure heated water recovery line 82*a* is connected to a medium outlet of the oxidizer heater 64. The other end of the second high-pressure heated water recovery line 82*a* is connected to an inlet of the medium-pressure economizer 24*a* in the heat recovery steam generator 21. The oxidizer injecting line 65 has a first oxidizer injecting line 65*b* and a second oxidizer injecting line 65*c*. One end of the first oxidizer injecting line 65*b* and one end of the second oxidizer injecting line 65*c* are all connected to an outlet of the oxidizer of the oxidizer heater 64. The other end of the first oxidizer injecting line 65*b* is connected to the pre-reactor 45*a*. In addition, the other end of the second oxidizer injecting line 65*c* is connected to the post-reactor 45*b*.

In addition to the oxidizer supplied from the oxidizer injecting device 60, the gaseous ammonia NHg supplied from the second preheater 44*d* flows into the pre-reactor 45*a*. One end of the first heating medium line 51 is connected to a medium inlet of the pre-reactor 45*a*. The other end of the first heating medium line 51 is connected to an outlet of the first heating medium heater 27. One end of the first heating medium recovery line 52 is connected to a medium outlet of the pre-reactor 45*a*. The other end of the first heating medium recovery line 52 is connected to an inlet of the second heating medium heater. In addition to the oxidizer supplied from the oxidizer injecting device 60, the reaction gas RG supplied from the pre-reactor 45*a* flows into the post-reactor 45*b*.

The first reaction gas line 47*a* is connected to the post-reactor 45*b*. The first reaction gas cooler 46*a* is provided in the first reaction gas line 47*a* as in the second embodiment. In addition, the second reaction gas cooler 46*b* is provided in the second reaction gas line 47*b* as in the second embodiment.

The treated reaction gas RGp supplied from the residual raw material removal device 130 flows into the first fuel preheater 13*a* in the reaction gas utilization equipment 10*d*. As in the fuel preheater 13 of the second embodiment, one end of the high-pressure heated water line 81 is connected to a medium inlet of the first fuel preheater 13*a*. As in the fuel preheater 13 of the second embodiment, one end of the high-pressure heated water recovery line 82 is connected to a medium outlet of the first fuel preheater 13*a*. The treated reaction gas RGp preheated by the first fuel preheater 13*a* flows into the second fuel preheater 13*b*, and the treated reaction gas RGp is further preheated. The treated reaction gas RGp preheated by the second fuel preheater 13*b* flows into the combustor 11*c*.

One end of the first high-pressure exhaust steam line 85*a* is connected to an inlet of the third heating medium of the first reaction gas cooler 46*a* described above. The other end of the first high-pressure exhaust steam line 85*a* is connected to an outlet of the high-pressure steam turbine 33. One end of the second high-pressure exhaust steam line 85*b* is connected to an outlet of the third heating medium of the first reaction gas cooler 46*a*. The other end of the second high-pressure exhaust steam line 85*b* is connected to a medium inlet of the second fuel preheater 13*b*. One end of the third high-pressure exhaust steam line 85*c* is connected to a medium outlet of the second fuel preheater 13*b*. The other end of the third high-pressure exhaust steam line 85*c* is connected to an inlet of the medium-pressure steam turbine 32.

A portion of the combustion air supplied from the air compressor 11*a* of the gas turbine 11 flows into the oxidizer cooler 62 as the oxidizer via the oxidizer receiving line 61. The high-pressure water supply from the high-pressure pump 25*p* of the heat recovery steam generator 21 flows into the oxidizer cooler 62 via the high-pressure water supply line 79. For example, the temperature of the combustion air supplied from the air compressor 11*a* is approximately 450° C., and for example, the pressure of the combustion air is approximately 2 MPa. The oxidizer cooler 62 heats the high-pressure water supply while cooling the combustion air by exchanging heat between the combustion air serving as the oxidizer and the high-pressure water supply. The heated high-pressure water supply flows into the high-pressure evaporator 25*c* of the heat recovery steam generator 21 via the high-pressure water supply recovery line 80.

The oxidizer compressor 63 compresses and boosts the combustion air cooled by the oxidizer cooler 62. The pressure of the liquid ammonia NH flowing into the first preheater 44*c* is boosted by the raw material ammonia pump 43, and is approximately 5 MPa as described above. Therefore, the pressure inside the pre-reactor 45*a* and the post-reactor 45*b* is also approximately 5 MPa. The oxidizer compressor 63 boosts the oxidizer to a pressure at which the oxidizer can be injected into the pre-reactor 45*a* and the post-reactor 45*b*. The oxidizer cooler 62 cools the oxidizer before flowing into the oxidizer compressor 63 in order to reduce compression power in the oxidizer compressor 63.

The combustion air compressed by the oxidizer compressor 63 flows into the oxidizer heater 64. The high-pressure heated water supplied from the second high-pressure economizer 25b flows into the oxidizer heater 64 via the second high-pressure heated water line 81a. The oxidizer heater 64 cools the high-pressure heated water while heating the combustion air by exchanging heat between the combustion air serving as the oxidizer and the high-pressure heated water. The high-pressure heated water cooled by the oxidizer heater 64 flows into the medium-pressure economizer 24a via the second high-pressure heated water recovery line 82a. The oxidizer heater 64 supplies the heat to the pre-reactor 45a and the post-reactor 45b together with the combustion air serving as the oxidizer. In this manner, even in a case of a small amount of the oxidizer and a small amount of an oxidation reaction of an oxidation target gas, the temperature inside the pre-reactor 45a and the post-reactor 45b is raised to activate the reaction inside the pre-reactor 45a and the post-reactor 45b. Specifically, the oxidizer heater 64 raises the temperature of the combustion air serving as the oxidizer to the temperature close to, equal to or higher than the temperature of the oxidation target gas flowing into the respective reactors 45a and 45b.

The gaseous ammonia NHg supplied from the second preheater 44d and the combustion air supplied from the oxidizer injecting device 60 flow into the pre-reactor 45a. In the pre-reactor 45a, a portion of the gaseous ammonia NHg is subjected to the oxidation reaction (combustion) with the combustion air. The heat generated by the oxidation reaction heats the gaseous ammonia NHg. Furthermore, the gaseous ammonia NHg is heated by the first heating medium heater 27, and is heated by exchanging heat with the first heating medium. Therefore, inside the pre-reactor 45a, the gaseous ammonia NHg is heated to the higher temperature than that side the reactor 45 of the second embodiment, and the thermal decomposition reaction of the gaseous ammonia NHg is promoted.

The reaction gas RG supplied from the pre-reactor 45a and the combustion air supplied from the oxidizer injecting device 60 flow into the post-reactor 45b. Inside the post-reactor 45b, a portion of the gaseous ammonia NHg contained in the reaction gas RG supplied from the pre-reactor 45a and a portion of hydrogen generated by the thermal decomposition reaction inside the pre-reactor 45a are subjected to the oxidation reaction (combustion) with the combustion air. The heat generated by the oxidation reaction heats the gaseous ammonia NHg. Therefore, inside the post-reactor 45b, the gaseous ammonia NHg contained in the reaction gas RG supplied from the pre-reactor 45a is heated, and the thermal decomposition reaction of the gaseous ammonia NHg is further promoted.

As described above, in the present embodiment, the oxidizer is injected into the respective reactors 45a and 45b so that a portion of the gaseous ammonia NHg inside the respective reactors 45a and 45b is subjected to the oxidation reaction. In this manner, an environmental temperature of the thermal decomposition reaction inside the respective reactors 45a and 45b can be raised. Therefore, in the present embodiment, the concentration of the ammonia contained in the reaction gas RG flowing out from the respective reactors 45a and 45b can be lowered.

In the present embodiment, as the oxidizer, the combustion air supplied from the air compressor 11a of the gas turbine 11 is used. The combustion air is previously compressed by the air compressor 11a. Accordingly, the combustion air is the air having the pressure higher than an atmospheric pressure. The oxidizer compressor 63 boosts the combustion air to a pressure at which the combustion air can be injected into the pre-reactor 45a and the post-reactor 45b. Therefore, a driving force of the oxidizer compressor 63 can be suppressed in the present embodiment, compared to a case where the oxidizer compressor 63 boosts the atmosphere to a pressure at which the combustion air can be injected into the pre-reactor 45a and the post-reactor 45b.

The reaction gas RG supplied from the post-reactor 45b flows into the first reaction gas cooler 46a via the reaction gas line 47. The high-pressure steam exhausted from the high-pressure steam turbine 33 flows into the first reaction gas cooler 46a via the first high-pressure exhaust steam line 85a, as the third heating medium. The first reaction gas cooler 46a superheats the high-pressure steam while cooling the reaction gas RG by exchanging heat between the reaction gas RG supplied from the post-reactor 45b and the high-pressure steam exhausted from the high-pressure steam turbine 33.

As in the second embodiment, the second preheater 44d preheats the gaseous ammonia NHg while further cooling the reaction gas RG by exchanging heat between the reaction gas RG cooled by the first reaction gas cooler 46a and the gaseous ammonia NHg.

As in the second embodiment, the second reaction gas cooler 46b heats the water supply while cooling the reaction gas RG by exchanging heat between the reaction gas RG cooled by the second preheater 44d and the water supply serving as the third heating medium. The heated water supply flows into the first preheater 44c as the second heating medium.

As in the second embodiment, the reaction gas RG cooled by the second reaction gas cooler 46b flows into the residual raw material removal device 130, and the residual ammonia contained in the reaction gas RG is removed.

The treated reaction gas RGp supplied from the residual raw material removal device 130 flows into the combustor 11c via the fuel line 12, as the fuel. In this process, the treated reaction gas RGp is sequentially preheated by the first fuel preheater 13a and the second fuel preheater 13b. As in the fuel preheater 13 of the second embodiment, the first fuel preheater 13a heats the treated reaction gas RGp by exchanging heat between the high-pressure heated water supplied from the second high-pressure economizer 25b and the treated reaction gas RGp. The treated reaction gas RGp heated by the first fuel preheater 13a flows into the second fuel preheater 13b. Furthermore, the steam superheated by the first reaction gas cooler 46a flows into the second fuel preheater 13b via the second high-pressure exhaust steam line 85b. The second fuel preheater 13b cools the steam while heating the treated reaction gas RGp by exchanging heat between the treated reaction gas RGp heated by the first fuel preheater 13a and the steam supplied from the first reaction gas cooler 46a. The steam cooled by the second fuel preheater 13b flows into the medium-pressure steam turbine 32 via the third high-pressure exhaust steam line 85c, and drives the medium-pressure steam turbine 32. The treated reaction gas RGp heated by the second fuel preheater 13b flows into the combustor 11c.

As described above, in the present embodiment, the oxidizer of the ammonia NH is introduced into the respective reactors 45. A portion of the ammonia NH is combusted, and the environmental temperature of the thermal decomposition reaction inside the respective reactors 45 is raised. Accordingly, the concentration of the ammonia contained in the reaction gas RG flowing in the reaction gas line 47 can be lowered. Therefore, in the present embodiment, the energy consumption in the residual raw material removal device 130 can be suppressed as in the fourth embodiment.

In the present embodiment, the oxidizer is injected into the pre-reactor 45a and the post-reactor 45b. However, the oxidizer may be injected into one reactor 45 out of the pre-reactor 45a and the post-reactor 45b. When the oxidizer is injected into only the pre-reactor 45a, the post-reactor 45b is unnecessary.

In the present embodiment, the high-temperature exhaust heat in the first reaction gas cooler 46a is recovered by the high-pressure steam exhausted from the high-pressure steam turbine 33. Then, after the heat of the high-pressure steam is utilized in the second fuel preheater 13b, the high-pressure steam is caused to flow into the medium-pressure steam turbine 32. Therefore, in the present embodiment, the treated reaction gas RGp heated to the high temperature by the second fuel preheater 13b can be supplied to the gas turbine 11. Accordingly, the efficiency of the gas turbine 11 can be improved, and the high-temperature steam can also be supplied to an inlet of the medium-pressure steam turbine 32. Therefore, the output of the steam turbine can be increased, and the efficiency of the plant can be improved.

When the ammonia NH is subjected to the decomposition reaction by using only the exhaust gas EG of the gas turbine 11 as the heat source, and the fuel injected into the gas turbine 11 is preheated to drive the steam turbine, the reaction temperature of the ammonia, the temperature of the fuel injected into the gas turbine 11, and the inlet steam temperature of the steam turbine are all lower than the temperature of the exhaust gas EG in the outlet of the gas turbine 11. However, in the present embodiment, in the respective reactors 45a and 45b, the temperature of the gas is raised by oxidizing a portion of the ammonia or the reaction gas with the oxidizer. Accordingly, the reaction temperature of the raw material fluid (here, the ammonia) can be higher than the temperature of the exhaust gas EG in the outlet of the reaction gas utilization equipment (or the exhaust gas generation equipment (here, the gas turbine 11)). Therefore, the concentration of the residual raw material (here, the ammonia) contained in the reaction gas (here, the ammonia decomposition gas) in the outlet of the reactor 45 can be lowered. Furthermore, in the present embodiment, the temperature of the gas turbine injecting fuel and the steam turbine inlet steam can be raised by using the exhaust heat that cools the reaction gas having the temperature higher than that of the exhaust gas EG in the outlet of the gas turbine 11. Therefore, in the present embodiment, the gas turbine injecting fuel temperature and the steam turbine inlet steam temperature can be raised than the temperature of the exhaust gas EG in the outlet of the gas turbine 11. In this case, improved efficiency of the plant can be particularly achieved. That is, the temperature of the third heating medium (here, the high-pressure steam exhausted from the high-pressure steam turbine 33) can be raised to the temperature higher than the temperature of the exhaust gas EG in the outlet of the reaction gas utilization equipment (or the exhaust gas generation equipment, here, the gas turbine 11). Therefore, in the present embodiment, the efficiency of the plant can be further improved by adopting this configuration.

In the present embodiment, the combustion air is used as the oxidizer for the raw material fluid NH. However, the oxidizer is not limited to the combustion air, and for example, the oxidizer may be any type of the gas such as the atmosphere and the oxygen as long as the oxidation reaction of the raw material fluid NH is available.

In the present embodiment, the water supply preheater 37 heats the water supply from the condenser 34 by exchanging heat with the steam extracted from the low-pressure steam turbine 31. The steam extracted from the low-pressure steam turbine 31 is condensed into water by exchanging heat with the water supply. The water flows into the water supply. Therefore, in the present embodiment, the temperature of the water supply flowing into the heat recovery steam generator 21 can be raised. When the temperature of the water supply flowing into the heat recovery steam generator 21 is raised, the water temperature in the inlet and outlet of the respective low-pressure economizers 23a and 23b in the heat recovery steam generator 21 is raised, and the temperature of the water to be supplied to the first preheater 44c via the low-pressure heated water line 76 is also raised. Therefore, in a case where the calorific value for heating the ammonia in the preheater is small, when the water supply preheater 37 is provided as in the present embodiment, a sufficient amount of the heat can be supplied to the preheater. Therefore, in a case where the calorific value for heating the ammonia in the preheater is small as in the present embodiment, it is preferable to provide the water supply preheater 37.

Sixth Embodiment

Figure 12:
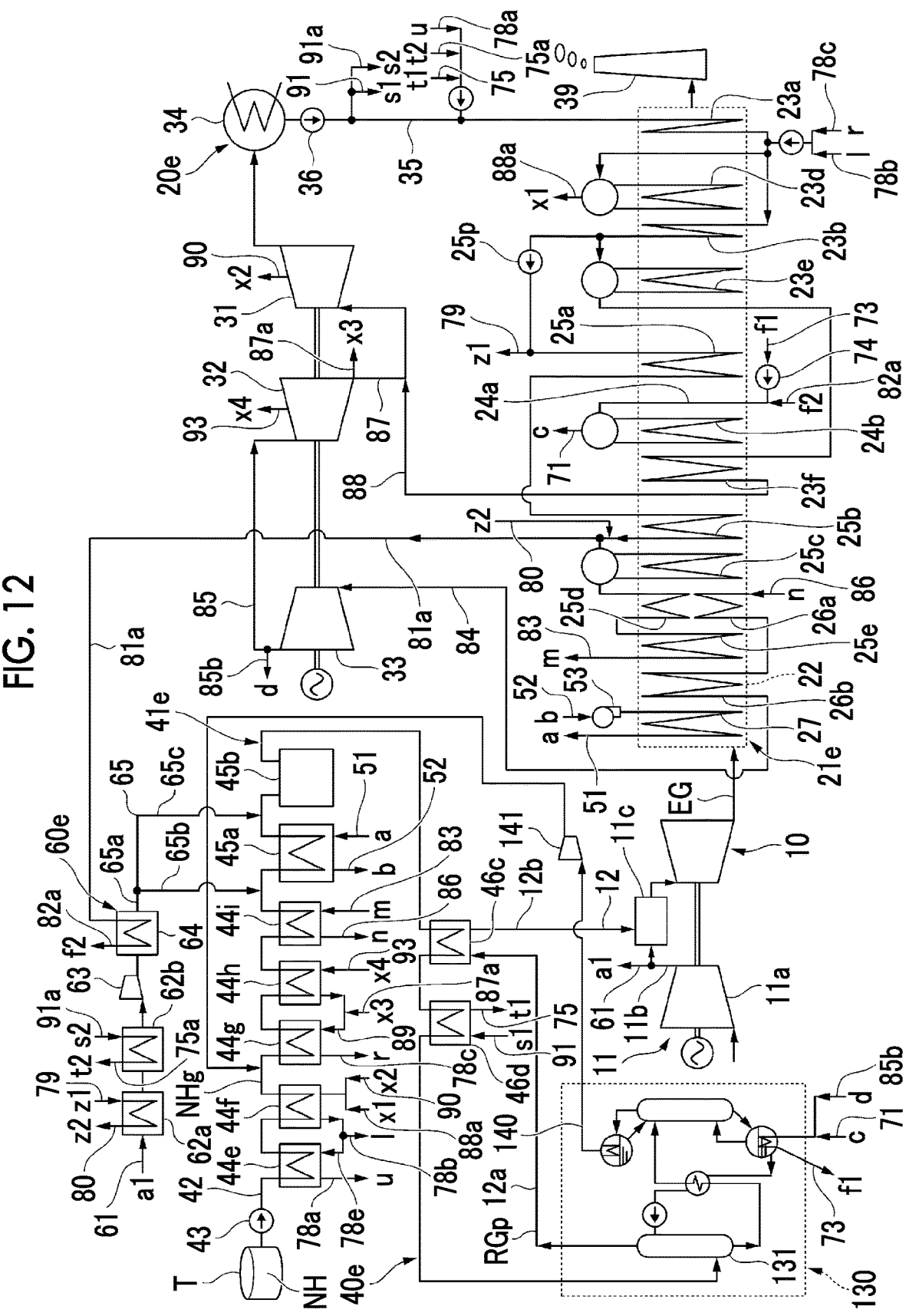
FIG. 12 is a system diagram of a raw material fluid treatment plant according to a sixth embodiment of the present invention.

A sixth embodiment of the raw material fluid treatment plant will be described with reference to FIG. 12.

The raw material fluid treatment plant of the present embodiment is a modification example of the raw material fluid treatment plant of the third embodiment. In the raw material fluid treatment plant of the present embodiment, as in the fifth embodiment, a portion of ammonia NH is subjected to the self-thermal decomposition reaction.

As in the above-described embodiment, the raw material fluid treatment plant of the present embodiment includes a raw material reaction apparatus 40e, the reaction gas utilization equipment 10, and an exhaust heat utilization equipment 20e.

As in the raw material reaction apparatus of the above-described embodiment, the raw material reaction apparatus 40e of the present embodiment has a raw material reaction device 41e and the residual raw material removal device 130. The raw material reaction device 41e of the present embodiment is different from the raw material reaction device 41b of the third embodiment. On the other hand, the residual raw material removal device 130 of the present embodiment is the same as the residual raw material removal device 130 of the above-described embodiment.

The reaction gas utilization equipment 10 of the present embodiment is the same as the reaction gas utilization equipment 10 of the third embodiment. In addition, the exhaust heat utilization equipment 20e of the present embodiment is basically the same as the exhaust heat utilization equipment 20b of the third embodiment. However, the raw material reaction device 41e is different from that of the third embodiment. In this relation, a line configuration connected to each device configuring the exhaust heat utilization equipment 20e is different from that of t third embodiment. In addition, the configuration of the heat recovery steam generator 21e is also different from the configuration of the third embodiment.

The heat recovery steam generator 21e of the present embodiment is basically the same as the heat recovery steam generator 21b of the third embodiment. However, the heat recovery steam generator 21e of the present embodiment has a first low-pressure evaporator 23d and a second low-pressure evaporator 23e, as the low-pressure evaporators. The first low-pressure evaporator 23d is disposed between the first low-pressure economizer 23a and the second low-pressure economizer 23b. The second low-pressure evaporator 23e is disposed between the second low-pressure economizer 23b and the first high-pressure economizer 25a. The first low-pressure evaporator 23d heats the water by exchanging heat between a portion of the water supplied from the first low-pressure economizer 23a and the exhaust gas EG. The second low-pressure economizer 23b heats the water by exchanging heat between the other portion of the water supplied from the first low-pressure economizer 23a and the exhaust gas EG. The second low-pressure evaporator 23e exchanges the heat between the heated water supplied from the second low-pressure economizer 23b and the exhaust gas EG, and heats the heated water into the steam. The steam is further superheated to obtain the low-pressure steam by the low-pressure superheater 23f.

As in the raw material reaction device 41b of the third embodiment, the raw material reaction device 41e of the present embodiment has the ammonia supply line 42, the raw material ammonia pump 43, the first preheater 44e, the second preheater 44f, the third preheater 44g, the fourth preheater 44h, the fifth preheater 44i, the reactors 45a and 45b, the first reaction gas cooler 46c, the second reaction gas cooler 46d, and the reaction gas line 47. However, as in the fifth embodiment, the reactors 45a and 45b of the present embodiment have the pre-reactor 45a and the post-reactor 45b. As in the fifth embodiment, the raw material reaction device 41e of the present embodiment further has an oxidizer injecting device 60e that injects the oxidizer into the ammonia.

The oxidizer in the present embodiment is the air as in the fifth embodiment. As in the fifth embodiment, the oxidizer injecting device 60e has the oxidizer receiving line 61, the oxidizer coolers 62a and 62b, the oxidizer compressor 63, the oxidizer heater 64, and the oxidizer injecting line 65. However, the oxidizer coolers 62a and 62b of the present embodiment have a first oxidizer cooler 62a and a second oxidizer cooler 62b.

One end of the oxidizer receiving line 61 is connected to the combustion air passage 11b of the gas turbine 11. The other end of the oxidizer receiving line 61 is connected to an inlet of the oxidizer compressor 63. The first oxidizer cooler 62a and the second oxidizer cooler 62b are provided in the oxidizer receiving line 61.

One end of the high-pressure water supply line 79 is connected to a medium inlet of the first oxidizer cooler 62a. The other end of the high-pressure water supply line 79 is connected to a discharge port of the high-pressure pump 25p in the heat recovery steam generator 21e. One end of the high-pressure water supply recovery line 80 is connected to a medium outlet of the first oxidizer cooler 62a. The other end of the high-pressure water supply line 79 is connected to an inlet of the high-pressure evaporator 25c in the heat recovery steam generator 21e. One end of the second branch water supply line 91a is connected to a medium inlet of the second oxidizer cooler 62b. The other end of the second branch water supply line 91a is connected to the water supply line 35. One end of the second water supply recovery line 75a is connected to a medium outlet of the second oxidizer cooler 62b. The other end of the second water supply recovery line 75a is located on the heat recovery steam generator 21e side in the water supply line 35 from a connection position between the second branch water supply line 91a and the water supply line 35.

One end of the low-temperature low-pressure steam line 88a and one end of the low-pressure extraction steam line 90 are connected to an inlet of the second heating medium of the second preheater 44f in the present embodiment. The other end of the low-temperature low-pressure steam line 88a is connected to an outlet of the first low-pressure evaporator 23d in the heat recovery steam generator 21e. The other end of the low-pressure extraction steam line 90 is connected to a casing of the low-pressure steam turbine 31. One end of the connection low-pressure heated water line 78e is connected to an outlet of the second heating medium of the second preheater 44f. The other end of the connection low-pressure heated water line 78e is connected to an inlet of the second heating medium of the first preheater 44e. One end of the second heated water recovery line 78b is further connected to a second heating medium outlet of the second preheater 44f. The other end of the second heated water recovery line 78b is connected to an inlet of the first low-pressure evaporator 23d and an inlet of the second low-pressure economizer 23b. One end of the first heated water recovery line 78a is connected to a second heating medium outlet of the first preheater 44e. The other end of the first heated water recovery line 78a is connected to the water supply line 35.

One end of the medium-pressure extraction steam line 93 is connected to an inlet of the second heating medium of the fourth preheater 44h. The other end of the medium-pressure extraction steam line 93 is connected to a casing of the medium-pressure steam turbine 32. One end of the connection medium-pressure steam line 89 is connected to an outlet of the second heating medium of the fourth preheater 44h. The other end of the connection medium-pressure steam line 89 is connected to an inlet of the second heating medium of the third preheater 44g. Furthermore, one end of the second medium-pressure exhaust steam line 87a is connected to an inlet of the second heating medium of the third preheater 44g. The other end of the second medium-pressure exhaust steam line 87a is connected to an outlet of the medium-pressure steam turbine 32. One end of the third heated water recovery line 78c is connected to a second heating medium outlet of the third preheater 44g. The other end of the third heated water recovery line 78c is connected to an inlet of the first low-pressure evaporator 23d and an inlet of the second low-pressure economizer 23b.

As in the third embodiment, one end of the high-pressure steam line 83 is connected to an inlet of the second heating medium of the fifth preheater 44i. The other end of the high-pressure steam line 83 is connected to an outlet of the second high-pressure superheater 25e. As in the third embodiment, one end of the high-pressure steam recovery line 86 is connected to an outlet of the second heating medium of the fifth preheater 44i. The other end of the high-pressure steam recovery line 86 is connected to an inlet of the first high-pressure reheater 26a.

As in the third embodiment, the liquid ammonia NH boosted by the raw material ammonia pump 43 flows into the first preheater 44e, and is preheated here by exchanging heat with the second heating medium. The second heating medium flowing into the first preheater 44e is the heated water flowing into the first preheater 44e from the second preheater 44f via the first connection heated water line 78e. The heated water cooled by exchanging heat with the liquid ammonia NH in the first preheater 44e flows into the water supply line 35 via the first heated water recovery line 78a.

The liquid ammonia NH preheated by the first preheater 44e flows into the second preheater 44f, and is further preheated here by exchanging heat with the second heating medium to obtain the gaseous ammonia NHg. The second heating medium flowing into the second preheater 44f is the low-temperature low-pressure steam flowing into the second preheater 44f from the first low-pressure evaporator 23d via the low-temperature low-pressure steam line 88a, and the low-pressure extraction steam flowing into the second preheater 44f from the low-pressure steam turbine 31 via the low-pressure extraction steam line 90. In the second preheater 44f, the ammonia has a phase change from the liquid to the gas at a constant temperature, and the water which is a heat exchange target exchanging heat with the ammonia also has a phase change from the gas to the liquid at a constant temperature. In this way, both the ammonia and the heat exchange target have the phase change at the constant temperature. Accordingly, as described above with reference to FIG. 8, the temperature difference between the two can be reduced, and the heat utilization efficiency can be improved. As described above, in the second preheater 44f, a portion of the heated water generated by exchanging heat with the liquid ammonia NH flows into the first preheater 44e via the connection low-pressure heated water line 78e. In addition, in the second preheater 44f, the remaining heated water generated by exchanging heat with the liquid ammonia NH flows into the first low-pressure evaporator 23d and the second low-pressure economizer 23b via the second heated water recovery line 78b.

The gaseous ammonia NHg generated in the second preheater 44f flows into the third preheater 44g, and is further preheated here by exchanging heat with the second heating medium. The second heating medium flowing into the third preheater 44g is the steam flowing into the third preheater 44g from the fourth preheater 44h via the connection medium-pressure steam line 89, and the steam flowing into the third preheater 44g from the medium-pressure steam turbine 32 via the second medium-pressure exhaust steam line 87a. The steam cooled by exchanging heat with the gaseous ammonia NHg in the third preheater 44g is condensed into the heated water. The heated water flows into the first low-pressure evaporator 23d and the second low-pressure economizer 23b via the third heated water recovery line 78c.

The gaseous ammonia NHg preheated by the third preheater 44g flows into the fourth preheater 44h, and is further preheated here by exchanging heat with the second heating medium. The second heating medium flowing into the fourth preheater 44h is the extracted medium-pressure steam extracted from the medium-pressure steam turbine 32 and flowing into the fourth preheater 44h via the medium-pressure extraction steam line 93. As described above, the steam cooled by exchanging heat with the gaseous ammonia NHg in the fourth preheater 44h flows into the third preheater 44g via the connection medium-pressure steam line 89.

The gaseous ammonia NHg preheated by the fourth preheater 44h flows into the fifth preheater 44i, and is further preheated here by exchanging heat with the second heating medium. As in the third embodiment, the second heating medium flowing into the fifth preheater 44i is the high-pressure steam flowing into the fifth preheater 44i from the second high-pressure superheater 25e via the high-pressure steam line 83. As in the third embodiment, the steam cooled by exchanging heat with the gaseous ammonia NHg in the fifth preheater 44i flows into the first high-pressure reheater 26a via the high-pressure steam recovery line 86.

Here, the heat recovery steam generator 21, the steam turbines 31, 32, and 33, the condenser 34, the water supply pump 36, and various pipes connecting all of these configure a Rankine cycle, which is a type of the first heat cycle. In addition, each of an intermediate stage of the medium-pressure steam turbine 32 and an outlet of the medium-pressure steam turbine 32 is a type of the first portion in the first heat cycle. The steam (first heat cycle medium) acquired from the locations is guided to the fourth preheater 44h and the third preheater 44g by the medium-pressure extraction steam line 93 and the second medium-pressure exhaust steam line 87a which are respectively types of the second heating medium line. The water generated by condensing each steam cooled by exchanging heat with the raw material fluid (here, the ammonia) in the fourth preheater 44h and the third preheater 44g is guided to an outlet (second portion) of the first low-pressure economizer 23a through which the water (first heat cycle medium) having the temperature lower than that of the first portion in the first heat cycle flows, by the third heated water recovery line 78c which is a type of the second heating medium recovery line. The low-pressure extraction steam line 90 which is a type of the second heating medium line guides a portion of the steam (first heat cycle medium) flowing in the intermediate stage (first portion in the first heat cycle) of the low-pressure steam turbine 31, to the second preheater 44f. In addition, the low-temperature low-pressure steam line 88a which is a type of the second heating medium line guides a portion of the steam generated by the first low-pressure evaporator 23d, to the second preheater 44f. The first heated water recovery line 78a which is a type of the second heating medium recovery line guides the water generated by condensing the steam cooled by exchanging heat with the raw material fluid (here, the ammonia) in the second preheater 44f and the first preheater 44e, to the water supply line 35 (second portion) through which the water (first heat cycle medium) having the temperature lower than that of the first portion flows. According to this configuration, the heat having a suitable temperature can be supplied to the preheater from the heat cycle without any excess or insufficiency, and can be used in preheating the raw material fluid. Therefore, in the present embodiment, the heat utilization efficiency is improved.

As the oxidizer, a portion of the combustion air supplied from the air compressor 11a of the gas turbine 11 flows into the first oxidizer cooler 62a and the second oxidizer cooler 62b via the oxidizer receiving line 61. As in the oxidizer cooler 62 of the fifth embodiment, the high-pressure water supplied from the high-pressure pump 25p of the heat recovery steam generator 21e flows into the first oxidizer cooler 62a via the high-pressure water supply line 79. The first oxidizer cooler 62a heats the high-pressure water supply while cooling the combustion air by exchanging heat between the combustion air serving as the oxidizer and the high-pressure water supply. As in the fifth embodiment, the heated high-pressure water supply flows into the high-pressure evaporator 25c of the heat recovery steam generator 21e via the high-pressure water supply recovery line 80. The combustion air cooled by the first oxidizer cooler 62a flows into the second oxidizer cooler 62b. The water supply also flows into the second oxidizer cooler 62b via the second branch water supply line 91a. The second oxidizer cooler 62b heats the water supply while cooling the combustion air by exchanging heat between the combustion air serving as the oxidizer and the water supply. The heated water supply flows into the water supply line 35 via the second water supply recovery line 75a.

The oxidizer compressor 63 compresses and boosts the combustion air cooled by the second oxidizer cooler 62b. In the present embodiment, the combustion air cooled by the first oxidizer cooler 62a is further cooled by the water supply in the second oxidizer cooler 62b. Accordingly, the temperature of the combustion air flowing into the oxidizer compressor 63 can be lowered than that in the fifth embodiment. Therefore, in the present embodiment, a driving force of the oxidizer compressor 63 can be suppressed, compared to the fifth embodiment. The combustion air compressed by the oxidizer compressor 63 flows into the oxidizer heater 64. As in the fifth embodiment, the high-pressure heated water supplied from the second high-pressure economizer 25b flows into the oxidizer heater 64 via the second high-pressure heated water line 81a. The oxidizer heater 64 cools the high-pressure heated water while heating the combustion air by exchanging heat between the combustion air serving as the oxidizer and the high-pressure heated water. As in the fifth embodiment, the high-pressure heated water cooled by the oxidizer heater 64 flows into the medium-pressure economizer 24a via the second high-pressure heated water recovery line 82a. In order to activate the reaction inside the pre-reactor 45a and the post-reactor 45b, the oxidizer heater 64 raises the temperature of the combustion air to the temperature close to, equal to or higher than the temperature of the oxidation target gas flowing into the respective reactors 45a and 45b.

The gaseous ammonia NHg supplied from the fifth preheater 44i and the combustion air supplied from the oxidizer injecting device 60e flow into the pre-reactor 45a. In the pre-reactor 45a, a portion of the gaseous ammonia NHg is subjected to the oxidation reaction (combustion) with the combustion air. The heat generated by the oxidation reaction heats the gaseous ammonia NHg. Furthermore, the gaseous ammonia NHg is heated by exchanging heat with the first heating medium heated by the first heating medium heater 27. Therefore, inside the pre-reactor 45a, the gaseous ammonia NHg is heated to the temperature higher than that inside the reactor 45 of the third embodiment, and the thermal decomposition reaction of the ammonia is promoted.

The reaction gas RG supplied from the pre-reactor 45a and the combustion air supplied from the oxidizer injecting device 60e flow into the post-reactor 45b. Inside the post-reactor 45b, a portion of the gaseous ammonia NHg contained in the reaction gas RG supplied from the pre-reactor 45a is subjected to the oxidation reaction (combustion) with the combustion air. The heat generated by the oxidation reaction heats the remaining gaseous ammonia NHg. Therefore, inside the post-reactor ammonia NHg contained in the reaction gas RG supplied from the pre-reactor 45a is heated, and the thermal decomposition reaction of the gaseous ammonia NHg is promoted.

As described above, in the present embodiment, as in the fifth embodiment, the oxidizer is injected into the respective reactors 45a and 45b so that a portion of the ammonia NH inside the respective reactors 45a and 45b is subjected to the oxidation reaction. In this manner, the environmental temperature of the thermal decomposition reaction inside the respective reactors 45a and 45b can be raised. Therefore, t embodiment, the concentration of the ammonia contained in the reaction gas RG flowing out from the respective reactors 45a and 45b can be lowered.

The reaction gas RG supplied from the post-reactor 45b flows into the residual raw material removal device 130 via the reaction gas line 47, the first reaction gas cooler 46c, and the second reaction gas cooler 46d, and as in the third embodiment, the residual ammonia contained in the reaction gas RG is removed.

Seventh Embodiment

Figure 13:
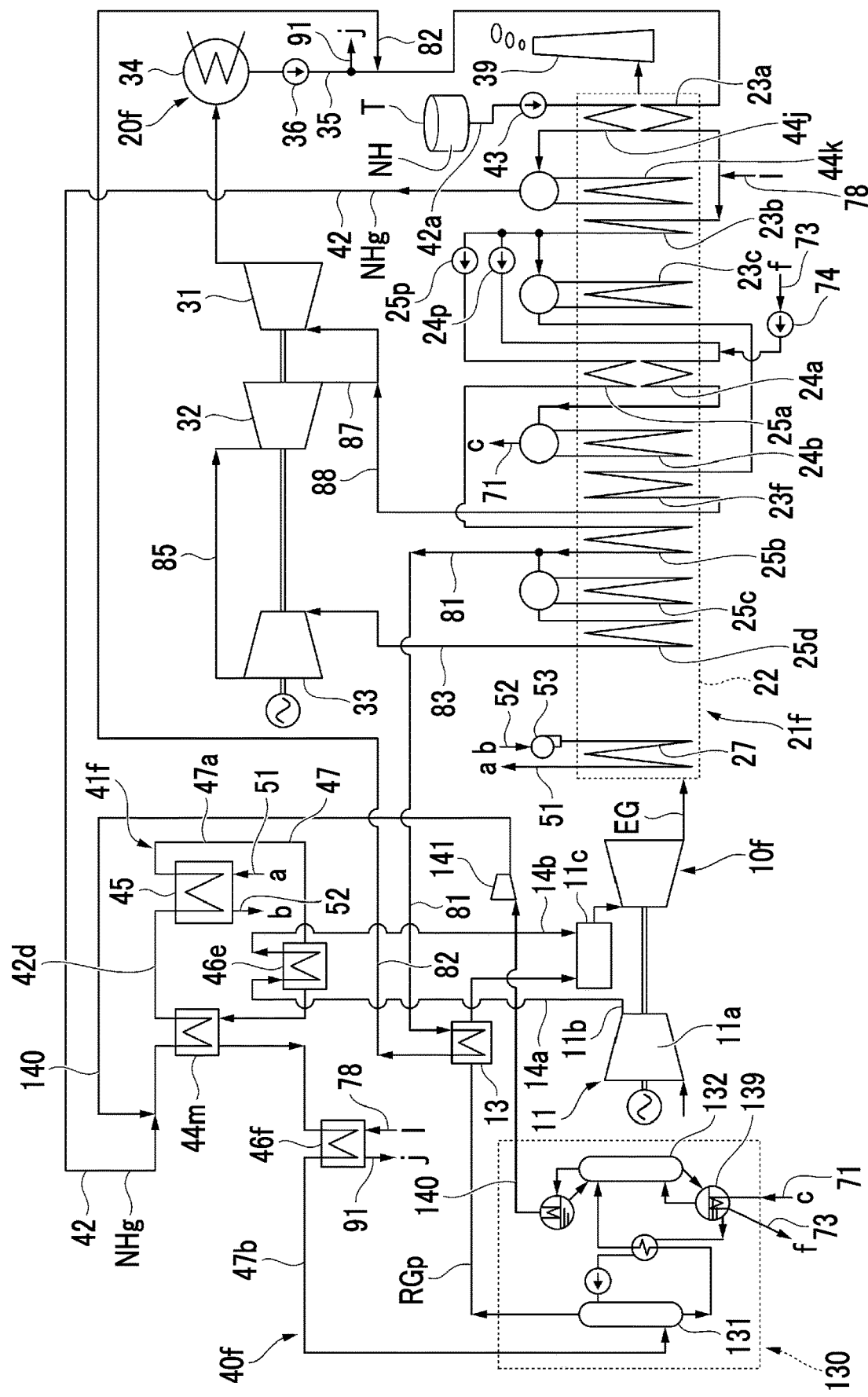
FIG. 13 is a system diagram of a raw material fluid treatment plant according to a seventh embodiment of the present invention.

A seventh embodiment of the raw material fluid treatment plant will be described with reference to FIG. 13.

The raw material fluid treatment plant of the present embodiment is a modification example of the raw material fluid treatment plant of the second embodiment. The raw material fluid treatment plant of the present embodiment is a plant in which the second heating medium serving as the heat exchange target when preheating the ammonia NH is the exhaust gas EG.

As in the above-described embodiment, the raw material fluid treatment plant of the present embodiment includes a raw material reaction apparatus 40f, a reaction gas utilization equipment 10f, and an exhaust heat utilization equipment 20f.

As in the raw material reaction apparatus of the above-described embodiment, the raw material reaction apparatus 40f of the present embodiment has a raw material reaction device 41f and the residual raw material removal device 130. The raw material reaction device 41f of the present embodiment is different from the raw material reaction device 41a of the second embodiment. On the other hand, the residual raw material removal device 130 of the present embodiment is the same as the residual raw material removal device 130 of the above-described embodiment.

The reaction gas utilization equipment 10f of the present embodiment is basically the same as the reaction gas utilization equipment of the above-described embodiment. As described above, the exhaust heat utilization equipment 20f of the present embodiment uses the exhaust gas EG as the second heating medium serving as the heat exchange target when preheating the ammonia NH. In this relation, the exhaust heat utilization equipment 20f of the present embodiment is different from the exhaust heat utilization equipment 20a of the second embodiment.

The raw material reaction device 41f of the present embodiment has the ammonia supply line 42, the raw material ammonia pump 43, a first preheater 44j, a second preheater 44k, a third preheater 44m, the reactor 45, a first reaction gas cooler 46e, a second reaction gas cooler 46f, and the reaction gas line 47.

The ammonia supply line 42 connects the ammonia tank T and the reactor 45 to each other. The first preheater 44j, the second preheater 44k, and the third preheater 44m are all provided in the ammonia supply line 42.

The first preheater 44j and the second preheater 44k of the present embodiment have a heat transfer tube. The heat transfer tube of the first preheater 44j and the heat transfer tube of the second preheater 44k are disposed inside the gas frame 22 of the heat recovery steam generator 21. The first preheater 44j is disposed at a position substantially the same as that of the first low-pressure economizer 23a in the flow direction of the exhaust gas EG. The second preheater 44k is disposed between the first low-pressure economizer 23a and the second low-pressure economizer 23b in the flow direction of the exhaust gas EG. Therefore, the second preheater 44k is disposed on the upstream side in the flow direction of the exhaust gas EG from the first preheater 44j. In addition, the first preheater 44j and the second preheater 44k are disposed on the downstream side from the low-pressure evaporator 23c which is the evaporator located on the most downstream side out of the plurality of evaporators. On the other hand, the first heating medium heater 27 is disposed on the upstream side from the high-pressure evaporator 25c which is the evaporator located on the most upstream side out of the plurality of evaporators. Therefore, all of the evaporators are disposed among the first preheater 44j, the second preheater 44k, and the first heating medium heater 27.

The ammonia NH flows inside the heat transfer tube of the first preheater 44j and inside the heat transfer tube of the second preheater 44k. In the present embodiment, the second heating medium exchanging heat with the ammonia NH inside the heat transfer tube is the exhaust gas EG flowing inside the gas frame 22. Therefore, a portion of the gas frame 22 configures the second heating medium line through which the second heating medium flows. In other words, the second heating medium line is configured to have a portion of the gas frame 22.

The reaction gas line 47 has a first reaction gas line 47a and a second reaction gas line 47b. One end of the first reaction gas line 47a is connected to a reaction gas outlet of the reactor 45. The other end of the first reaction gas line 47a is connected to an inlet of the second heating medium of the third preheater 44m. Therefore, in the present embodiment, the reaction gas RG is a type of the second heating medium. The first reaction gas cooler 46e is provided in the first reaction gas line 47a. One end of the second reaction gas line 47b is connected to an outlet of the second heating medium of the second preheater 44k, and the other end of the second reaction gas line 47b is connected to the residual raw material removal device 130. The second reaction gas cooler 46f is provided in the second reaction gas line 47b.

One end of a first combustion air line 14a is connected to an inlet of the third heating medium of the first reaction gas cooler 46e. Therefore, the third heating medium exchanging heat with the reaction gas RG in the first reaction gas cooler 46e is the combustion air. The other end of the first combustion air line 14a is connected to the combustion air passage 11b of the gas turbine 11. One end of the second combustion air line 14b is connected to an outlet of the third heating medium of the first reaction gas cooler 46e. The other end of the second combustion air line 14b is connected to the combustor 11c.

As described above, one end of the first combustion air line 14a is connected to an inlet of the first reaction gas cooler 46e, and the high-pressure steam line 83 is not connected thereto unlike the second embodiment. In the present embodiment, the outlet of the high-pressure superheater 25d and the inlet of the high-pressure steam turbine 33 are directly connected to each other by the high-pressure steam line 83.

The branch water supply line 91 branching from the water supply line 35 is connected to an inlet of the third heating medium of the second reaction gas cooler 46f. Therefore, the third heating medium exchanging heat with the reaction gas RG in the second reaction gas cooler 46f is the water supply. One end of the heated water recovery line 78 is connected to an outlet of the third heating medium of the second reaction gas cooler 46f. The other end of the heated water recovery line 78 is connected to an inlet of the second low-pressure economizer 23b.

The liquid ammonia NH boosted by the raw material ammonia pump 43 first flows into the first preheater 44j, and is preheated here by exchanging heat with the exhaust gas EG serving as the second heating medium. The liquid ammonia NH preheated by the first preheater 44j flows into the second preheater 44k, and is further preheated here by exchanging heat with the exhaust gas EG serving as the second heating medium. As a result, the liquid ammonia NH is vaporized to obtain the gaseous ammonia NHg.

The gaseous ammonia NHg generated by the second preheater 44k flows into the third preheater 44m. The reaction gas RG also flows into the third preheater 44m from the first reaction gas cooler 46e via the first reaction gas line 47a. The third preheater 44m cools the reaction gas RG while further preheating the gaseous ammonia NHg by exchanging heat between the gaseous ammonia NHg and the reaction gas RG. Therefore, the second preheater 44k functions as a preheater for preheating the ammonia, and also functions as a reaction gas cooler for cooling the reaction gas RG.

The gaseous ammonia NHg preheated by the third preheater 44m flows into the reactor 45. As in the second embodiment, the first heating medium flows into the reactor 45. In the reactor 45, the gaseous ammonia NHg is heated by exchanging heat between the first heating medium and the gaseous ammonia NHg. As a result, the gaseous ammonia NHg is subjected to the thermal decomposition reaction to obtain the reaction gas RG.

The reaction gas RG generated in the reactor 45 flows into the first reaction gas cooler 46e. The combustion air serving as the third heating medium flows into the first reaction gas cooler 46e from the air compressor 11a of the gas turbine 11 via the combustion air passage 11b and the first combustion air line 14a. The first reaction gas cooler 46e heats the combustion air while cooling the reaction gas RG by exchanging heat between the reaction gas RG and the combustion air. Therefore, the first reaction gas cooler 46e functions as a reaction gas cooler for cooling the reaction gas RG, and also functions as an air preheater for heating the combustion air. In addition to the gas turbine 11, the reaction gas utilization equipment 10f has the first reaction gas cooler 46e that also functions as the air preheater.

As described above, the reaction gas RG cooled by the first reaction gas cooler 46e flows into the third preheater 44m via the first reaction gas line 47a. As described above, the third preheater 44m further cools the reaction gas RG by exchanging heat with the ammonia NH.

The reaction gas RG cooled by the third preheater 44m flows into the second reaction gas cooler 46f via the second reaction gas line 47b. The water supply from the branch water supply line 91 flows into the second reaction gas cooler 46f, as the third heating medium. The second reaction gas cooler 46f heats the water supply while cooling the reaction gas RG by exchanging heat between the reaction gas RG and the water supply. The reaction gas RG cooled by the second reaction gas cooler 46f flows into the residual raw material removal device 130 via the second reaction gas line 47b, and here, the residual ammonia contained in the reaction gas RG is removed. In addition, the water supply heated by the second reaction gas cooler 46f flows into the second low-pressure economizer 23b via the heated water recovery line 78.

In the present embodiment, the exhaust gas EG from which a large amount of the heat is deprived by all of the evaporators and superheaters, that is, the heat of the low-temperature exhaust gas EG is utilized in preheating the ammonia NH. Therefore, in the present embodiment, the heat of the low-temperature exhaust gas EG can be effectively utilized.

In the present embodiment, the combustion air flowing into the combustor 11c is preheated by utilizing the heat of the reaction gas RG. Therefore, the temperature of the combustion air flowing into the combustor 11c is raised, and the efficiency of the gas turbine 11 can be improved.

Eighth Embodiment

An eighth embodiment of the raw material fluid treatment plant will be described with reference to FIGS. 14 and 15.

The raw material fluid treatment plant of the present embodiment is a modification example of the raw material fluid treatment plant of the fifth embodiment. In the raw material fluid treatment plant of the present embodiment, the second heating medium for preheating the ammonia NH and the third heating medium for cooling the reaction gas RG are changed from those in the fifth embodiment.

Figure 14:
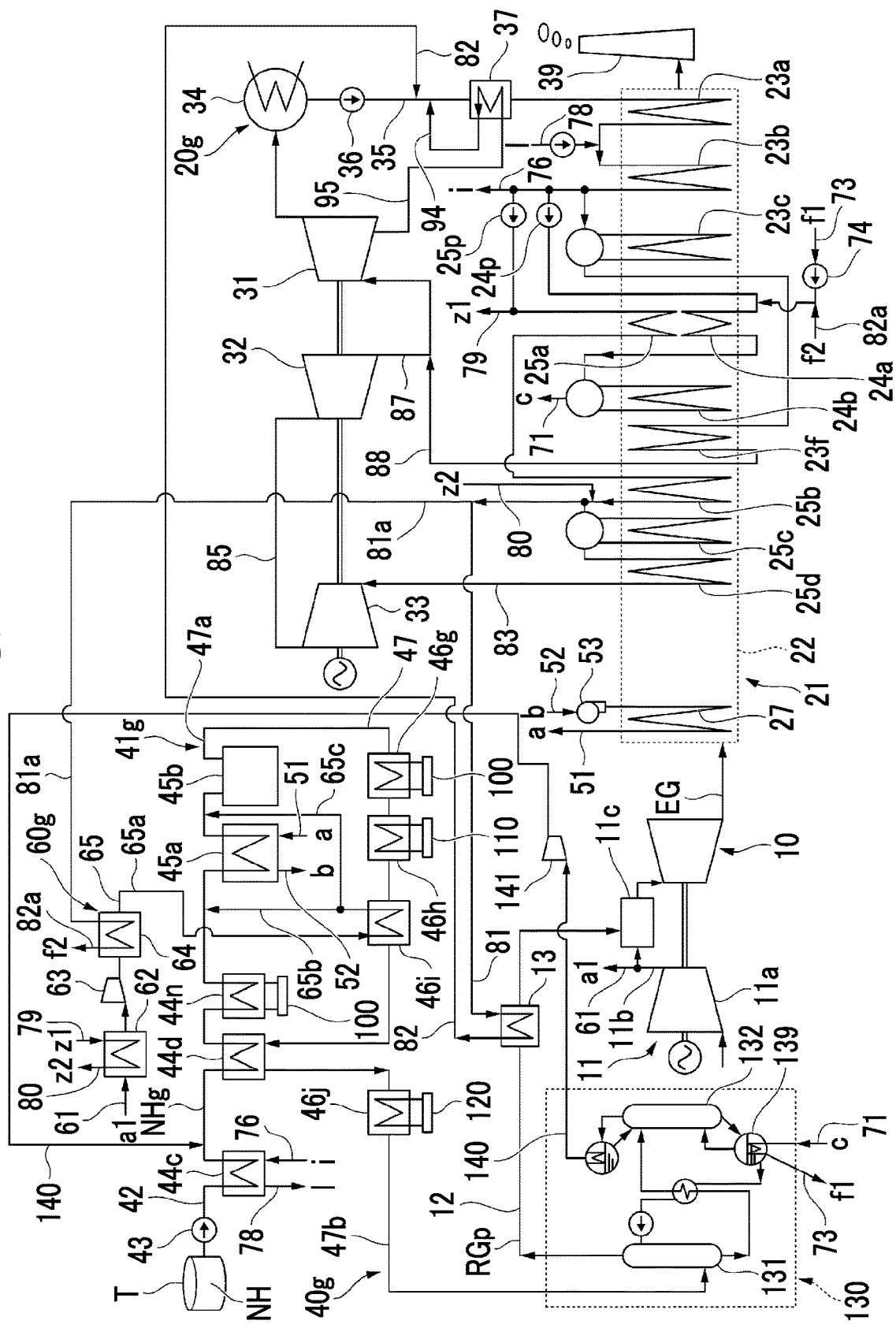
FIG. 14 is a system diagram of a raw material fluid treatment plant according to an eighth embodiment of the present invention.
Figure 15:
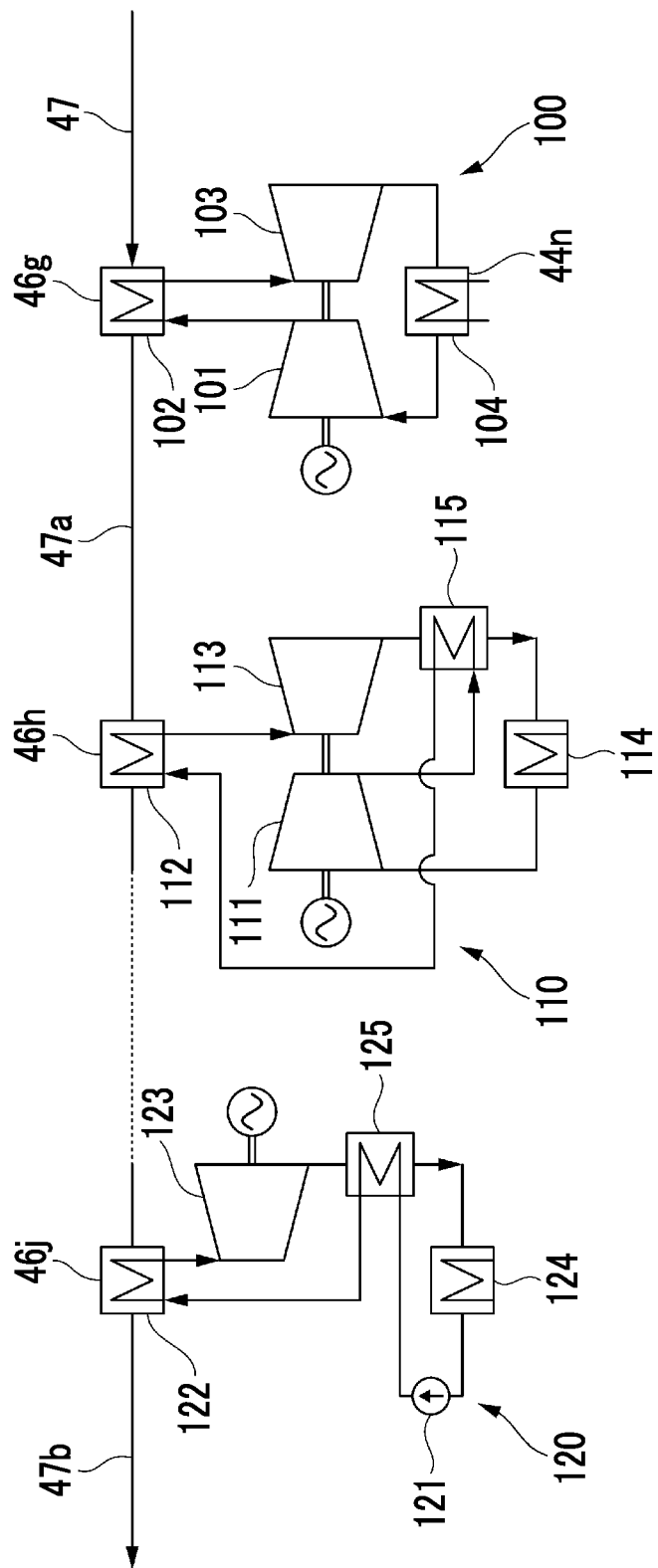
FIG. 15 is a system diagram of a Brayton cycle, a heat cycle, and a low-boiling point medium Rankine cycle according to the eighth embodiment of the present invention.

As in the above-described embodiment, the raw material fluid treatment plant of the present embodiment includes a raw material reaction apparatus 40g, the reaction gas utilization equipment 10, and an exhaust heat utilization equipment 20g, as illustrated in FIG. 14.

As in the raw material reaction apparatus 40 of the above-described embodiment, the raw material reaction apparatus 40 of the present embodiment has a raw material reaction device 41g and the residual raw material removal device 130. The raw material reaction device 41g of the present embodiment is different from the raw material reaction device 41d of the second embodiment in that the second heating medium and the third heating medium are changed from those in the fifth embodiment. On the other hand, the residual raw material removal device 130 of the present embodiment is the same as the residual raw material removal device 130 of the above-described embodiment.

The reaction gas utilization equipment 10 of the present embodiment is basically the same as the reaction gas utilization equipment of the above-described embodiment. The exhaust heat utilization equipment 20g of the present embodiment is basically the same as the exhaust heat utilization equipment 20d of the fifth embodiment. However, the exhaust heat utilization equipment 20g of the present embodiment is different from the exhaust heat utilization equipment 20d of the fifth embodiment in that an outlet of the high-pressure steam turbine 33 and an inlet of the medium-pressure steam turbine 32 are directly connected to each other by the high-pressure exhaust steam line 85.

The raw material reaction device 41g of the present embodiment has the ammonia supply line 42, the raw material ammonia pump 43, the first preheater 44c, the second preheater 44d, a third preheater 44n, the pre-reactor 45a, and the post-reactor 45b, a first reaction gas cooler 46g, a second reaction gas cooler 46h, a third reaction gas cooler 46i, a fourth reaction gas cooler 46j, the first reaction gas line 47a, the second reaction gas line 47b, an oxidizer injecting device 60g, a Brayton cycle 100, a heat cycle 110, and a Rankine cycle 120.

The first preheater 44c, the second preheater 44d, and the third preheater 44n are all provided in the ammonia supply line 42. As in the first preheater 44c of the second embodiment and the fifth embodiment, one end of the low-pressure heated water line 76 is connected to an inlet of the second heating medium of the first preheater 44c. The other end of the low-pressure heated water line 76 is connected to an outlet of the second low-pressure economizer 23b. As in the first preheater 44c of the second embodiment and the fifth embodiment, one end of the heated water recovery line 78 is connected to an outlet of the second heating medium of the first preheater 44c. The other end of the heated water recovery line 78 is connected to an inlet of the second low-pressure economizer 23b. As in the second preheater 44d of the second embodiment and the fifth embodiment, one end of the first reaction gas line 47a is connected to an inlet of the second heating medium of the second preheater 44d. The other end of the first reaction gas line 47a is connected to the post-reactor 45b. As in the second preheater 44d of the second embodiment and the fifth embodiment, one end of the second reaction gas line 47b is connected to an outlet of the second heating medium of the second preheater 44d. The other end of the second reaction gas line 47b is connected to the residual raw material removal device 130.

The third preheater 44n is a preheater newly added to the raw material reaction device 41d of the fifth embodiment. Both the inlet of the second heating medium and the outlet of the second heating medium of the third preheater 44n are connected to the Brayton cycle 100. The Brayton cycle 100 will be described in detail later.

The oxidizer injecting device 60g is basically the same as the oxidizer injecting device 60 of the fifth embodiment. However, the oxidizer injecting line 65 of the oxidizer injecting device 60g of the embodiment has a main oxidizer injecting line 65a, a first oxidizer injecting line 65b, and a second oxidizer injecting line 65c. One end of the main oxidizer injecting line 65a is connected to the oxidizer compressor 63. The other end of the main oxidizer injecting line 65a is connected to an inlet of the third heating medium of the third reaction gas cooler 46i. One end of the first oxidizer injecting line 65b and one end of the second oxidizer injecting line 65c are connected to an outlet of the third heating medium of the third reaction gas cooler 46i. As in the fifth embodiment, the other end of the first oxidizer injecting line 65b is connected to the pre-reactor 45a. In addition, as in the fifth embodiment, the other end of the second oxidizer injecting line 65c is connected to the post-reactor 45b. Therefore, as in the fifth embodiment, the oxidizer supplied from the oxidizer injecting device 60g is injected into the pre-reactor 45a and the post-reactor 45b.

The first reaction gas cooler 46g, the second reaction gas cooler 46h, and the third reaction gas cooler 46i are provided in the first reaction gas line 47a. Both the inlet of the third heating medium and the outlet the third heating medium of the first reaction gas cooler 46g are connected to the above-described Brayton cycle 100. Both the inlet of the third heating medium and the outlet of the third heating medium of the second reaction gas cooler 46h are connected to the heat cycle 110. The heat cycle 110 will be described in detail later.

As described above, the main oxidizer injecting line 65a is connected to the inlet of the third heating medium of the third reaction gas cooler 46i. The first oxidizer injecting line 65b and the second oxidizer injecting line 65c are connected to the outlet of the third heating medium of the third reaction gas cooler 46i. The third reaction gas cooler 46i cools the reaction gas RG while heating the oxidizer by exchanging heat between the oxidizer supplied from the main oxidizer injecting line 65a and the reaction gas RG flowing in the first reaction gas line 47a. Therefore, the third reaction gas cooler 46i functions as a reaction gas cooler for the reaction gas RG, and functions as an oxidizer heater for the oxidizer.

The fourth reaction gas cooler 46j is provided in the second reaction gas line 47b. Both the inlet of the third heating medium and the outlet of the third heating medium of the fourth reaction gas cooler 46j are connected to the Rankine cycle 120. The Rankine cycle 120 will be described in detail later.

For example, the Brayton cycle medium circulating inside the Brayton cycle 100 is the gas such as helium, argon, nitrogen, and the air. The Brayton cycle medium does not have a phase change in a process of circulating inside the Brayton cycle 100. The Brayton cycle 100 is a type of the heat cycle. As illustrated in FIG. 15, the Brayton cycle 100 has a medium compressor 101 that compresses the Brayton cycle medium, a medium heater 102 that heats the Brayton cycle medium compressed by the medium compressor 101, a medium turbine 103 driven by the Brayton cycle medium heated by the medium heater 102, and a medium cooler 104 that cools the Brayton cycle medium exhausted from the medium turbine 103 and causes the Brayton cycle medium to return to the medium compressor 101.

The medium heater 102 is the first reaction gas cooler 46g described above. The Brayton cycle medium compressed by the medium compressor 101 flows into the first reaction gas cooler 46g from the inlet of the third heating medium. The first reaction gas cooler 46g heats the Brayton cycle medium while cooling the reaction gas RG by exchanging heat between the reaction gas RG and the Brayton cycle medium. Therefore, the first reaction gas cooler 46g functions as a reaction gas cooler for the reaction gas RG, and functions as a medium heater for the Brayton cycle medium. The Brayton cycle medium heated by the first reaction gas cooler 46g flows out from the outlet of the third heating medium of the first reaction gas cooler 46g. This Brayton cycle medium flows into the medium turbine 103. The medium cooler 104 is the third preheater 44n described above. The Brayton cycle medium exhausted from the medium turbine 103 flows into the third preheater 44n from the inlet of the third heating medium. The third preheater 44n cools the Brayton cycle medium while heating the ammonia by exchanging heat between the ammonia and the Brayton cycle medium. Therefore, the third preheater 44n functions as a preheater for the ammonia, and functions as a medium cooler for the Brayton cycle medium.

The heat cycle medium circulating inside the heat cycle 110 is carbon dioxide, for example. The heat cycle 110 is the Rankine cycle when the heat cycle medium is condensed in a circulating process of the heat cycle medium, and is the Brayton cycle when the heat cycle medium is not condensed in the circulating process of the heat cycle medium. As illustrated in FIG. 15, the heat cycle 110 includes a medium booster 111 for increasing the pressure of the heat cycle medium, a medium heater 112 for heating the heat cycle medium boosted by the medium booster 111, a medium turbine 113 driven by a heat cycle medium heated in the medium heater 112, a medium cooler 114 that cools the heat cycle medium exhausted from the medium turbine 113 and returns the heat cycle medium to the medium booster 111, and a regenerative heat exchanger 115.

The regenerative heat exchanger 115 exchanges the heat between the heat cycle medium boosted by the medium booster 111 and the heat cycle medium exhausted from the medium turbine 113, and cools the heat cycle medium exhausted from the medium turbine 113 while heating the heat cycle medium boosted by the medium booster 111. The heat cycle medium heated by the regenerative heat exchanger 115 flows into the medium heater 112, and is further heated here. In addition, the heat cycle medium cooled by the regenerative heat exchanger 115 flows into the medium cooler 114, and is further cooled here. The medium heater 112 of the heat cycle is the second reaction gas cooler 46h described above. The heat cycle medium heated by the regenerative heat exchanger 115 after being boosted by the medium booster 111 flows into the second reaction gas cooler 46h from the inlet of the third heating medium. The second reaction gas cooler 46h heats the heat cycle medium while cooling the reaction gas RG by exchanging heat between the reaction gas RG and the heat cycle medium. Therefore, the second reaction gas cooler 46h functions as a reaction gas cooler for the reaction gas RG, and functions as a medium heater for the heat cycle medium.

The Rankine cycle medium circulating inside the Rankine cycle 120 is a low-boiling point medium having a boiling point lower than that of hexane, pentane, ammonia, or water. Therefore, this Rankine cycle 120 is a low-boiling point medium Rankine cycle. The low-boiling point medium Rankine cycle 120 is a type of the heat cycle. As illustrated in FIG. 15, the low-boiling point medium Rankine cycle 120 has a medium booster 121 that boosts the low-boiling point medium, a medium heater 122 that heats and vaporizes the low-boiling point medium boosted by the medium booster 121, a medium turbine 123 driven by the low-boiling point medium vaporized by the medium heater 122, a medium cooler 124 that causes the low-boiling point medium to return to the medium booster 121 while cooling and condensing the low-boiling point medium exhausted from the medium turbine 123, and a regenerative heat exchanger 125.

The regenerative heat exchanger 125 exchanges the heat between the low-boiling point medium boosted by the medium booster 121 and the low-boiling point medium exhausted from the medium turbine 123, and cools the low-boiling point medium exhausted from the medium turbine 123 while heating the low-boiling point medium boosted by the medium booster 121. The low-boiling point medium heated by the regenerative heat exchanger 125 flows into the medium heater 122, and is further heated and vaporized here. In addition, the low-boiling point medium cooled by the regenerative heat exchanger 125 flows into the medium cooler 124, and is further cooled and condensed here. The medium heater 122 of the low-boiling point medium Rankine cycle 120 is the fourth reaction gas cooler 46j described above. The low-boiling point medium heated by the regenerative heat exchanger 125 after being boosted by the medium booster 121 flows into the fourth reaction gas cooler 46j from the inlet of the third heating medium. The fourth reaction gas cooler 46j heats the low-boiling point medium while cooling the reaction gas RG by exchanging heat between the reaction gas RG and the low-boiling point medium. Therefore, the fourth reaction gas cooler 46j functions as a reaction gas cooler for the reaction gas RG, and functions as a medium heater for the low-boiling point medium.

In the present embodiment, the Brayton cycle 100 can be driven by the heat for heating the ammonia NH and the heat for cooling the reaction gas RG. Accordingly, the output of the plant can be increased. In addition, in the present embodiment, the heat cycle 110 or the low-boiling point medium Rankine cycle 120 can be driven by the heat for cooling the reaction gas RG. Accordingly, the output of the plant can be further increased.

In addition, in the present embodiment, in the third reaction gas cooler 46i, the oxidizer can be heated by exchanging heat with the reaction gas RG, and the temperature of the oxidizer can be raised. Therefore, in the present embodiment, the environmental temperature of the thermal decomposition reaction can be raised inside the respective reactors 45a and 45b, and the concentration of the residual ammonia contained in the reaction gas RG can be lowered.

The plant of the present embodiment is a plant in which one heat cycle 110 is added to the plant of the fifth embodiment in order to preheat the ammonia and cool the reaction gas RG, and two heat cycles 100 and 120 are added to the plant of the fifth embodiment in order to cool the reaction gas RG. However, only one or two of the above-described three heat cycles 100, 110, and 120 may be added.

Ninth Embodiment

Figure 16:
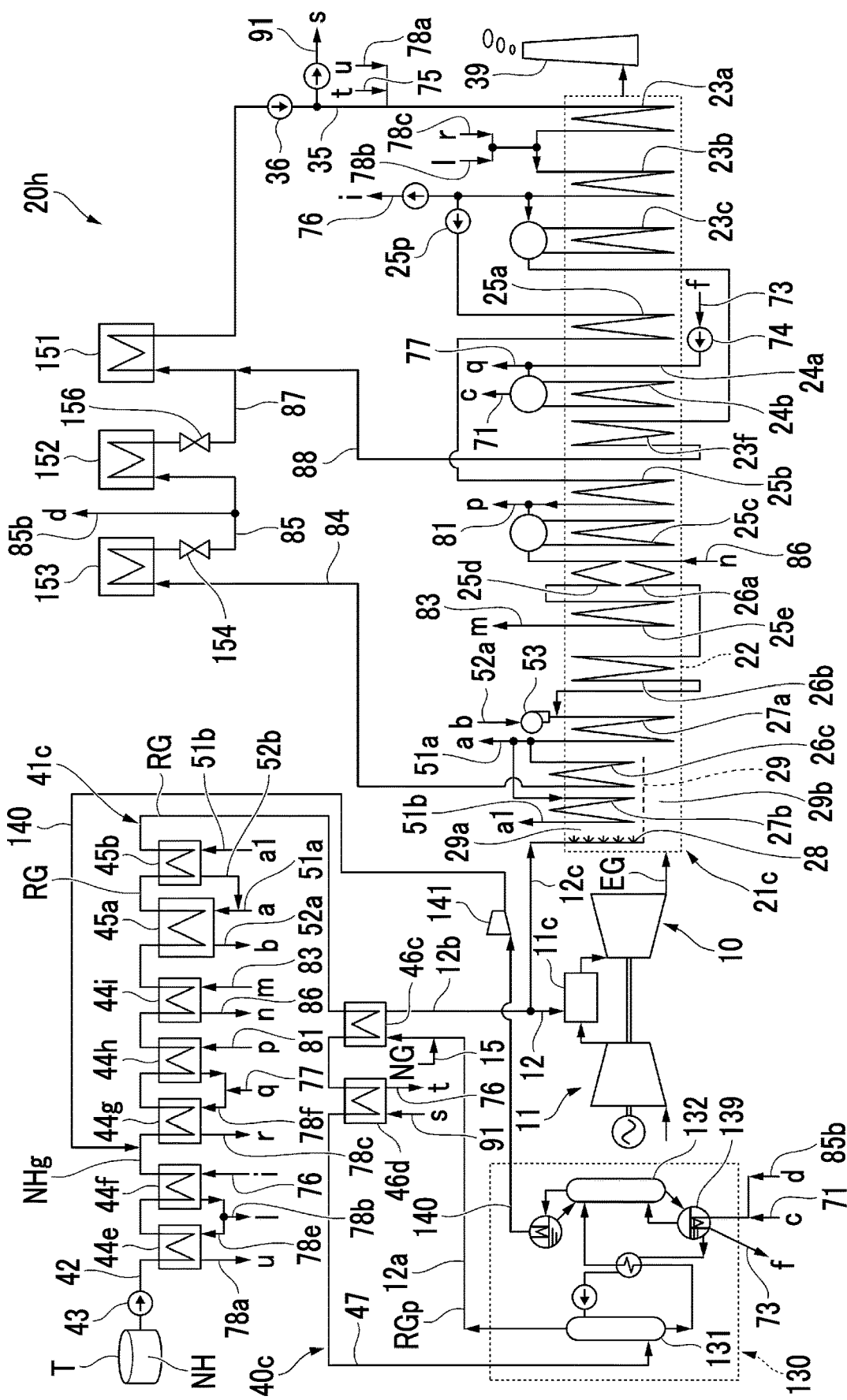
FIG. 16 is a system diagram of a raw material fluid treatment plant according to a ninth embodiment of the present invention.

A ninth embodiment of the raw material fluid treatment plant will be described with reference to FIG. 16.

The raw material fluid treatment plant of the present embodiment is a modification example of the raw material fluid treatment plant of the fourth embodiment described with reference to FIG. 9. The exhaust heat utilization equipment 20c of the treatment plant according to the fourth embodiment includes the heat recovery steam generator 21c, the steam turbines 31, 32, and 33 and the condenser 34 which serve as the steam utilization equipment utilizing the steam supplied from the heat recovery steam generator 21c. The exhaust heat utilization equipment 20h of the treatment plant in the present embodiment includes the heat recovery steam generator 21c the same as that in the fourth embodiment, and a plurality of steam utilization devices 151, 152, and 153 serving as the steam utilization equipment utilizing the steam supplied from the heat recovery steam generator 21c. That is, the exhaust heat utilization equipment 20h of the treatment plant in the present embodiment includes the plurality of steam utilization devices 151, 152, and 153 instead of the steam turbines 31, 32, and 33 and the condenser 34 of the treatment plant in the fourth embodiment.

In the present embodiment, the plurality of steam utilization devices 151, 152, and 153 have a high-pressure steam utilization device 153, a medium-pressure steam utilization device 152, and a low-pressure steam utilization device 151.

A steam inlet of the high-pressure steam utilization device 153 is connected to an outlet of the third high-pressure reheater 26c of the heat recovery steam generator 21c by the high-pressure reheat steam line 84. A steam outlet of the high-pressure steam utilization device 153 is connected to a steam inlet of the medium-pressure steam utilization device 152 by the high-pressure exhaust steam line 85. A pressure-reducing valve 154 is provided in the high-pressure exhaust steam line 85. In the high-pressure exhaust steam line 85, the second high-pressure exhaust steam line 85b branches from a position on the medium-pressure steam utilization device side from the pressure-reducing valve 154. As in the fourth embodiment, the second high-pressure exhaust steam line 85b is connected to the reboiler 139 of the residual raw material removal device 130. A steam outlet of the medium-pressure steam utilization device 152 is connected to a steam inlet of the low-pressure steam utilization device 151 by the medium-pressure exhaust steam line 87. A pressure-reducing valve 156 is provided in the medium-pressure exhaust steam line 87. In the medium-pressure exhaust steam line 87, one end of the low-pressure steam line 88 is connected to a position on the low-pressure steam utilization device side from the pressure-reducing valve 156. As in the fourth embodiment, the other end of the low-pressure steam line 88 is connected to an outlet of the low-pressure superheater 23f in the heat recovery steam generator 21c. An outlet of the low-pressure steam utilization device 151 is connected to the heat recovery steam generator 21c by the water supply line 35. In the low-pressure steam utilization device 151, the steam flowing from the steam inlet is condensed, and flows out from the outlet as the water in a liquid phase. In the present embodiment, the heat of condensation generated at this time is also utilized.

In the present embodiment, the heat recovery steam generator 21c and the plurality of steam utilization devices 151, 152, and 153 configure the exhaust heat utilization heat cycle.

As in the present embodiment, even when the plurality of steam utilization devices 151, 152, and 153 are provided instead of the steam turbines 31, 32, and 33 and the condenser 34, the heat can be recovered or the heat can be utilized in accordance with the temperature level by selecting the heat required for the reaction of the raw material fluid, the heat generated by the reaction, or the heat of the heat cycle medium (steam or water) flowing inside the exhaust heat utilization heat cycle.

Although the present embodiment is the modification example of the fourth embodiment, as in the present embodiment, in other embodiments and modification examples thereof, the plurality of steam utilization devices 151, 152, and 153 may be provided instead of the steam turbines 31, 32, and 33 and the condenser 34. Even in this case, as in the present embodiment, the heat can be recovered or the heat can be utilized in accordance with the temperature level by selecting the heat required for the reaction of the raw material fluid, the heat generated by the reaction, or the heat of the heat cycle medium flowing inside the exhaust heat utilization heat cycle. As described above, the heat cycle in the present invention or the exhaust heat utilization heat cycle is not limited to those which fetch the power, and may be a cycle for circulating the heating medium in order to utilize the heat.

Modification Example

In the plant (FIG. 5) of the second embodiment, the whole amount of the high-pressure steam supplied from the high-pressure superheater 25d is heated by the first reaction gas cooler 46a, and thereafter, is supplied to the high-pressure steam turbine 33. However, when a sufficient calorific value cannot be obtained by using only the exhaust heat of the first reaction gas cooler 46a, only a portion of the high-pressure steam supplied from the high-pressure superheater 25d may be heated by the first reaction gas cooler 46a, and thereafter, may be supplied to the high-pressure steam turbine 33. In this case, a third high-pressure superheater is provided at a position between the high-pressure superheater 25d and the first heating medium heater 27 inside the gas frame 22 of the heat recovery steam generator 21. In the steam flowing out from the high-pressure superheater 25d, a portion of the steam is supplied to the first reaction gas cooler 46a, and the remaining steam is supplied to the third high-pressure superheater to be superheated in the third high-pressure superheater. The steam superheated by the third high-pressure superheater merges with the second high-pressure steam line 83b via the third high-pressure steam line, is mixed with the steam heated by the first reaction gas cooler 46a, and is supplied to the high-pressure steam turbine 33.

In the second embodiment, as described above, the first high-pressure steam line 83a which is a type of the third heating medium line guides the whole amount of the steam flowing out from the outlet (first portion in the Rankine cycle) of the high-pressure superheater 25d, to the first reaction gas cooler 46a. In addition, the second high-pressure steam line 83b which is a type of the third heating medium recovery line guides the steam superheated by exchanging heat with the reaction gas in the first reaction gas cooler 46a, to the inlet of the high-pressure steam turbine 33 (second portion) through which the steam having the temperature higher than that of the outlet (first portion) of the high-pressure superheater 25d flows. However, as in the modification example of the second embodiment described above, the first high-pressure steam line 83a which is a type of the third heating medium line may guide a portion of the steam flowing out from the outlet (first portion in the Rankine cycle) of the high-pressure superheater 25d, to the first reaction gas cooler 46a. In a modification example of the second embodiment, the remaining high-pressure steam superheated by the high-pressure superheater 25 is further superheated by the third high-pressure superheater, and the steam is guided to the high-pressure steam turbine 33 via the third high-pressure steam line. In this modification example, the second high-pressure steam line 83b which is a type of the third heating medium recovery line guides the steam superheated by exchanging heat with the reaction gas in the first reaction gas cooler 46a, to the third high-pressure steam line (second portion) through which the steam having the temperature higher than the outlet (first portion) of the high-pressure superheater 25d flows. The steam superheated by the third high-pressure superheater and the steam superheated by the first reaction gas cooler 46a are supplied to the high-pressure steam turbine 33, as described above.

The plant of the fourth embodiment is a plant in which an assistant medium heating mechanism for heating the first heating medium by exchanging heat between the combustion gas formed by combusting the fuel supplied from the burner 28 and the first heating medium is added to the plant of the third embodiment. However, the assistant medium heating mechanism may be added to the plant of other embodiments.

The plant of the fifth embodiment is a plant in which the oxidizer injecting device 60 is added to the plant of the second embodiment. In addition, the plant of the sixth embodiment is a plant in which the oxidizer injecting device 60e is added to the plant of the third embodiment. However, the oxidizer injecting device may be added to the plant of other embodiments.

In each of the above-described embodiments, it is essential to heat the raw material fluid (ammonia) by exchanging heat with the first heating medium (steam) having the high temperature inside the reactor. However, as a method for heating the raw material fluid, it is not essential to adopt a method for heating the raw material fluid by exchanging heat with the first heating medium. For example, a method for heating the raw material fluid or the reaction gas may be adopted as follows. The oxidizer injecting device as installed in the plant of the fifth embodiment is provided, and the oxidizer is injected into the reactor 45 to oxidize the raw material fluid or the reaction gas. In addition, a method for heating the raw material fluid in the reactor by mixing the raw material fluid inside the reactor with a high-temperature medium may be adopted. Even when any heating method is adopted, the reaction gas in the outlet of the reactor can be heated to the high-temperature, and the heat is exchanged between the reaction gas and the fuel or the heat cycle medium. In this manner, the temperature of the fuel or the heat cycle medium can be raised, and the efficiency of the plant can be improved.

The plant of the eighth embodiment is a plant in which the above-described three heat cycles 100, 110, and 120 are added to the plant of the fifth embodiment. However, at least one of the three heat cycles 100, 110, and 120 may be added to the other plant.

The plants of the fifth embodiment and the eighth embodiment include the water supply preheater 37. On the other hand, the plants of the first to fourth embodiments, the sixth embodiment, and the seventh embodiment do not include the water supply preheater 37. However, the water supply preheater 37 may be added to the plants of the first to fourth embodiments, the sixth embodiment, and the seventh embodiment.

In each of the above-described embodiments, as a method for removing the residual ammonia from the reaction gas RG, a method for bringing the reaction gas RG and the water into contact with each other is adopted for the absorption tower 131. However, a pressure swing adsorption method (PSA) may be adopted as the method for removing the residual ammonia from the reaction gas RG.

In a case where the concentration of the residual ammonia contained in the reaction gas RG is low, even when the reaction gas RG is supplied to the gas turbine 11 as the fuel, the concentration of NOx contained in the exhaust gas EG generated by combusting the fuel does not increase so much. In a case where the concentration of NOx is equal to or smaller than a regulation value, the residual raw material removal device 130 in the raw material reaction apparatus 40 in each of the above-described embodiments can be omitted. When the residual raw material removal device 130 can be omitted, equipment cost can be suppressed. In addition, when the residual raw material removal device 130 can be omitted, it is not necessary to cool the reaction gas RG in order to promote the removal of the ammonia in the residual raw material removal device 130, and it is not necessary to heat and supply the reaction gas RG supplied from the residual raw material removal device 130 to the gas turbine 11. Therefore, when the residual raw material removal device 130 can be omitted, the thermal energy utilized for cooling and heating the reaction gas RG can be effectively utilized for driving the steam turbines 31, 32, and 33, for example.

The above-described reaction gas utilization equipment of the present embodiment is the gas turbine equipment. However, when the raw material fluid can be reacted and the reaction gas obtained by the reaction can be utilized, the present invention is not limited to the gas turbine equipment. For example, the reaction gas utilization equipment may be a reciprocating gas engine equipment, a fuel cell equipment, or a boiler equipment. In addition, the reaction gas utilization equipment may utilize the reaction gas as a raw material for chemical synthesis. Furthermore, the obtained reaction gas may be used by being stored or transported.

The exhaust gas generation equipment of each of the above-described embodiments is the gas turbine equipment. However, the exhaust gas generation equipment is not limited to the gas turbine equipment as long as the equipment is operated to generate the exhaust gas. For example, the exhaust gas generation equipment may be the reciprocating gas engine equipment, the fuel cell equipment, or the boiler equipment. In addition, the exhaust gas generation equipment utilizes the reaction gas or the treated reaction gas, and the exhaust gas generation equipment may also serve as the reaction gas utilization equipment. In this case, fuels such as natural gas, petroleum, and coal other than the reaction gas or the treated reaction gas may be supplied to the exhaust gas generation equipment. In this case, the exhaust gas generation equipment may utilize the reaction gas and treated reaction gas in combination with the fuels such as natural gas, petroleum, and coal. Only the fuels of natural gas, petroleum, and coal other than the reaction gas or the treated reaction gas may be supplied to the exhaust gas generation equipment. In this case, the exhaust gas generation equipment is not the reaction gas utilization equipment.

In the plant of the above-described embodiments, the boilers of the reaction gas utilization equipment and the exhaust heat utilization equipment exist separately from each other. However, the boilers of the reaction gas utilization equipment and the exhaust heat utilization equipment may be configured to include a general boiler that combusts the fuel to utilize the heat of the exhaust gas generated as a result.

The raw material fluid of each of the above-described embodiments is the liquid ammonia. However, for example, the raw material fluid may be methanol or dimethyl ether, as long as the reaction gas obtained by the reaction such as the thermal decomposition reaction can be utilized for any type of the reaction gas utilization equipment. The methanol is decomposed into hydrogen and carbon monoxide through the thermal decomposition reaction. In addition, in the methanol and the dimethyl ether, hydrogen and carbon dioxide are generated by a steam reforming reaction accompanied by an endothermic reaction. When the steam reforming reaction is performed, the steam required for the reaction may be used from the outlet of the exhaust heat utilization equipment, for example, the high-pressure superheater provided in the respective embodiments.

INDUSTRIAL APPLICABILITY

When the raw material fluid is reacted, the thermal efficiency of the plant can be improved by suppressing the thermal energy loss of the heat source such as the exhaust gas.

REFERENCE SIGNS LIST 10, 10d, 10f: reaction gas utilization equipment
11: gas turbine
11a: air compressor
11b: combustion air passage
11c: combustor
11d: turbine
12: fuel line
12a: first fuel line
12b: second fuel line
12c: branch fuel line
13: fuel preheater
13a: first fuel preheater
13b: second fuel preheater
14a: first combustion air line
14b: second combustion air line
15: natural gas line
20, 20a, 20b, 20c, 20e, 20f, 20h: exhaust heat utilization equipment
21, 21b, 21c, 21e, 21f: heat recovery steam generator
22: gas frame
23a: first low-pressure economizer
23b: second low-pressure economizer
23c: low-pressure evaporator
23d: first low-pressure evaporator
23e: second low-pressure evaporator
23f: low-pressure superheater
24a: medium-pressure economizer
24b: medium-pressure evaporator
24p: medium-pressure pump
25a: first high-pressure economizer
25b: second high-pressure economizer
25c: high-pressure evaporator
25d: high-pressure superheater (first high-pressure superheater)
25e: second high-pressure superheater
25p: high-pressure pump
26a: first high-pressure reheater
26b: second high-pressure reheater
26c: third high-pressure reheater
27: first heating medium heater
27a: first low-temperature heating medium heater
27b: first high-temperature heating medium heater
28: burner
29: partition member
29a: first exhaust gas flow path
29b: second exhaust gas flow path
31: low-pressure steam turbine
32: medium-pressure steam turbine
33: high-pressure steam turbine
34: condenser
35: water supply line
36: water supply pump
37: water supply preheater
39: chimney
40, 40a, 40b, 40c, 40d, 40e, 40f, 40g: raw material reaction apparatus
41, 41a, 41b, 41c, 41d, 41e, 41f, 41g: raw material reaction device
42: ammonia supply line
42a: first ammonia supply line
42b: second ammonia supply line
42c: third ammonia supply line
42d: fourth ammonia supply line
42e: fifth ammonia supply line
42f: sixth ammonia supply line
43: raw material ammonia pump
44: preheater
44a, 44c, 44e, 44j: first preheater
44b, 44d, 44f, 44k: second preheater
44g, 44m, 44n: third preheater
44h: fourth preheater
44i: fifth preheater
45: reactor
45a: pre-reactor
45b: post-reactor
46: reaction gas cooler
46a, 46c, 46e, 46g: first reaction gas cooler
46b, 46d, 46f, 46h: second reaction gas cooler
46i: third reaction gas cooler
46j: fourth reaction gas cooler
47: reaction gas line
47a: first reaction gas line
47b: second reaction gas line
47c: third reaction gas line
51: first heating medium line
51a: first low-temperature heating medium line
51b: first high-temperature heating medium line
52: first heating medium recovery line
52a: first low-temperature heating medium recovery line
52b: first high-temperature heating medium recovery line
53: first heating medium booster
55: heating medium replenishment line
56: heating medium replenishment valve
60, 60e, 60g: oxidizer injecting device
61: oxidizer receiving line
62: oxidizer cooler
62a: first oxidizer cooler
62b: second oxidizer cooler
63: oxidizer compressor
64: oxidizer heater
65: oxidizer injecting line
65a: main oxidizer injecting line
65b, 65d: first oxidizer injecting line
65c, 65e: second oxidizer injecting line
71: first reboiler medium line
72: second reboiler medium line
73: reboiler medium recovery line
74: reboiler medium booster
75: water supply recovery line
75a: second water supply recovery line
76: low-pressure heated water line
77: medium-pressure heated water line 78: heated water recovery line
78a: first heated water recovery line
78b: second heated water recovery line
78c: third heated water recovery line
78d: connection low-pressure heated water line
78e: first connection heated water line (connection low-pressure heated water line)
78f: second connection heated water line
79: high-pressure water supply line
80: high-pressure water supply recovery line
81: high-pressure heated water line
81a: second high-pressure heated water line
82: high-pressure heated water recovery line
82a: second high-pressure heated water recovery line
83: high-pressure steam line
83a: first high-pressure steam line
83b: second high-pressure steam line
84: high-pressure reheat steam line
85: high-pressure exhaust steam line
85a: first high-pressure exhaust steam line
85b: second high-pressure exhaust steam line
85c: third high-pressure exhaust steam line
86: high-pressure steam recovery line
87: medium-pressure exhaust steam line
87a: second medium-pressure exhaust steam line
88: low-pressure steam line
88a: low-temperature low-pressure steam line
89: connection medium-pressure steam line
90: low-pressure extraction steam line
91: branch water supply line
91a: second branch water supply line
92: connection water supply line
93: medium-pressure extraction steam line
94: extraction steam recovery line
95: extraction steam line
100: Brayton cycle
101: medium compressor
102: medium heater
103: medium turbine
104: medium cooler
110: heat cycle
120: low-boiling point medium Rankine cycle
111, 121: medium booster
112, 122: medium heater
113, 123: medium turbine
114, 124: medium cooler
115, 125: regenerative heat exchanger
130: residual raw material removal device
131: absorption tower
132: regeneration tower
133: ammonia water line
134: water line
135: water supply pump
136: heat exchanger
137: water circulation line
138: condenser
139: reboiler
140: recovery ammonia line
141: recovery ammonia booster
151: low-pressure steam utilization device
152: medium-pressure steam utilization device
153: high-pressure steam utilization device
154, 156: pressure-reducing valve
T: ammonia tank
EG: exhaust gas
NH: raw material fluid (ammonia)
NHg: gaseous ammonia (or gas phase ammonia)
RG: reaction gas
RGp: treated reaction gas
NG: natural gas

The invention claimed is:

1. A raw material fluid treatment plant comprising:
a raw material reaction apparatus that is configured to generate a reaction gas by reacting a raw material fluid,
wherein the raw material reaction apparatus includes
a preheater that is configured to preheat the raw material fluid,
a reactor that is configured to generate the reaction gas by reacting the raw material fluid,
a first heat transfer medium line through which a first heat transfer medium is configured to flow,
a second heat transfer medium line through which a second heat transfer medium is configured to flow, and
an exhaust gas generation equipment that is configured to generate an exhaust gas, and
an exhaust heat utilization equipment,
the reactor is a heat exchanger that is configured to react the raw material fluid by exchanging heat between the raw material fluid and the first heat transfer medium,
the preheater is a heat exchanger that is configured to heat the raw material fluid by exchanging heat between the raw material fluid and the second heat transfer medium, and is configured to supply the raw material fluid preheated by the preheater to the reactor,
the exhaust heat utilization equipment has
a gas frame through which the exhaust gas is configured to flow,
a first heat transfer medium heater provided inside the gas frame, and being configured to heat the first heat transfer medium by exchanging heat between the first heat transfer medium and the exhaust gas, and
a second heat transfer medium heater disposed on a downstream side of a flow of the exhaust gas from the first heat transfer medium heater inside the gas frame, and being configured to heat the second heat transfer medium by exchanging heat between the second heat transfer medium and the exhaust gas,
the first heat transfer medium line is connected to the reactor such that the first heat transfer medium line is configured to guide the first heat transfer medium heated by the first heat transfer medium heater to the reactor, and
the second heat transfer medium line is connected to the preheater such that the second heat transfer medium line is configured to guide the second heat transfer medium heated by the second heat transfer medium heater to the preheater.

2. The raw material fluid treatment plant according to claim 1,
wherein a product of constant pressure specific heat and a flow rate of the first heat transfer medium flowing in the first heat transfer medium line is larger than a product of constant pressure specific heat and a flow rate of the second heat transfer medium flowing in the second heat transfer medium line.

3. The raw material fluid treatment plant according to claim 1,
wherein the first heat transfer medium line is configured to guide the first heat transfer medium heated by the first heat transfer medium heater to the reactor, and
the preheater is disposed on a downstream side of a flow of the exhaust gas from the first heat transfer medium heater inside the gas frame, and is a heat exchanger configured to heat the raw material fluid by exchanging heat between the raw material fluid and the exhaust gas serving as the second heat transfer medium, and the second heat transfer medium line is configured to include a portion of the gas frame.

4. The raw material fluid treatment plant according to claim 1, wherein the reactor has a pre-reactor that is configured to generate the reaction gas by reacting the raw material fluid, and a post-reactor that is configured to react the raw material fluid contained in a gas from the pre-reactor, wherein the pre-reactor is configured to exchange heat between a first low-temperature heat transfer medium which is a type of the first heat transfer medium and the raw material fluid, the post-reactor is configured to exchange heat between a first high-temperature heat transfer medium which is a type of the first heat transfer medium and the gas from the pre-reactor, the first heat transfer medium line has a first low-temperature heat transfer medium line through which the first low-temperature heat transfer medium is configured to flow and a first high-temperature heat transfer medium line through which the first high-temperature heat transfer medium is configured to flow, the first low-temperature heat transfer medium line is connected to the pre-reactor, and is configured to guide the first low-temperature heat transfer medium to the pre-reactor, and the first high-temperature heat transfer medium line is connected to the post-reactor, and is configured to guide the first high-temperature heat transfer medium to the post-reactor.

5. The raw material fluid treatment plant according to claim 4, wherein a product of constant pressure specific heat and a flow rate of the first low-temperature heat transfer medium flowing in the first low-temperature heat transfer medium line is larger than a product of constant pressure specific heat and a flow rate of the first high-temperature heat transfer medium flowing in the first high-temperature heat transfer medium line.

6. The raw material fluid treatment plant according to claim 4, wherein the raw material reaction apparatus includes a first high-temperature heat transfer medium recover line configured to recover the first high-temperature heat transfer medium after heat exchanging in the post-reactor, wherein the first high-temperature heat transfer medium recover line is connected in the middle of the first low-temperature heat transfer medium line, and is configured to send the first high-temperature heat transfer medium recovered to the first low-temperature heat transfer medium line.

7. The raw material fluid treatment plant according to claim 4, wherein:

the first heat transfer medium heater has a first low-temperature heat transfer medium heater that is configured to heat a first low-temperature heat transfer medium by exchanging heat between the first low-temperature heat transfer medium which is a type of the first heat transfer medium and the exhaust gas, and a first high-temperature heat transfer medium heater that is configured to heat the first high-temperature heat transfer medium by exchanging heat between a first high-temperature heat transfer medium which is a type of the first heat transfer medium and the exhaust gas, the first high-temperature heat transfer medium heater is disposed on an upstream side of a flow of the exhaust gas from the first low-temperature heat transfer medium heater inside the gas frame, the first heat transfer medium line has a first low-temperature heat transfer medium line through which the first low-temperature heat transfer medium is configured to flow and a first high-temperature heat transfer medium line through which the first high-temperature heat transfer medium is configured to flow, the first low-temperature heat transfer medium line is connected to the first low-temperature heat transfer medium heater, and is configured to guide the first low-temperature heat transfer medium heated by the exhaust gas to the pre-reactor, and the first high-temperature heat transfer medium line is connected to the first high-temperature heat transfer medium heater, and is configured to guide the first high-temperature heat transfer medium heated by the exhaust gas to the post-reactor.

* * * * *